United States Patent
Fujii et al.

(10) Patent No.: US 11,225,540 B2
(45) Date of Patent: Jan. 18, 2022

(54) COPOLYMER AND OPTICAL FILM USING SAME

(71) Applicant: TOSOH CORPORATION, Shunan (JP)

(72) Inventors: Yasuyoshi Fujii, Mie (JP); Saki Ito, Mie (JP)

(73) Assignee: TOSOH CORPORATION, Shunan (JP)

( * ) Notice: Subject to any disclaimer, the term of this patent is extended or adjusted under 35 U.S.C. 154(b) by 220 days.

(21) Appl. No.: 16/467,414

(22) PCT Filed: Dec. 4, 2017

(86) PCT No.: PCT/JP2017/043504
§ 371 (c)(1),
(2) Date: Jun. 6, 2019

(87) PCT Pub. No.: WO2018/105561
PCT Pub. Date: Jun. 14, 2018

(65) Prior Publication Data
US 2020/0095358 A1    Mar. 26, 2020

(30) Foreign Application Priority Data

| Dec. 7, 2016 | (JP) | JP2016-237864 |
| Jul. 13, 2017 | (JP) | JP2017-137230 |
| Jul. 13, 2017 | (JP) | JP2017-137231 |
| Nov. 20, 2017 | (JP) | JP2017-222844 |
| Nov. 21, 2017 | (JP) | JP2017-223986 |

(51) Int. Cl.
*C08F 226/06* (2006.01)
*C08F 212/08* (2006.01)
(Continued)

(52) U.S. Cl.
CPC .......... *C08F 226/06* (2013.01); *C08F 212/08* (2013.01); *C08F 220/14* (2013.01);
(Continued)

(58) Field of Classification Search
CPC .... C08F 212/06; C08F 212/08; C08F 212/10; C08F 212/12; C08F 212/14; C08F 212/16; C08F 212/18; C08F 212/20; C08F 212/22; C08F 212/24; C08F 212/26; C08F 212/28; C08F 212/30; C08F 220/02; C08F 220/04; C08F 220/06; C08F 220/08; C08F 220/10; C08F 220/12; C08F 220/14; C08F 220/16; C08F 220/18; C08F 220/1802; C08F 220/1803; C08F 220/1804; C08F 220/1806; C08F 220/1807; C08F 220/1808; C08F 220/1809; C08F 220/1811; C08F 220/1812; C08F 220/1818; C08F 220/26; C08F 220/28; C08F 220/281; C08F 220/282; C08F 220/283; C08F 220/285; C08F 220/286; C08F 220/287; C08F 220/288; C08F 220/30; C08F 220/301; C08F 220/302; C08F 220/303; C08F 220/305; C08F 220/306; C08F 220/307; C08F 220/308; C08F 220/34; C08F 220/343; C08F 220/346; C08F 220/36; C08F 220/365; C08F 220/42; C08F 220/44; C08F 220/46; C08F 220/48; C08F 220/50; C08F 220/52; C08F 220/54; C08F 220/56; C08F 220/58; C08F 220/585; C08F 220/60; C08F 220/603; C08F 220/606; C08F 220/62; C08F 220/64; C08F 220/66; C08F 220/68; C08F 220/70; C08F 226/00; C08F 226/02; C08F 226/04; C08F 226/06; C08F 226/08; C08F 226/10; C08F 226/12; C08J 5/18; C08L 25/00; C08L 25/02; C08L 25/04; C08L 25/06; C08L 25/08; C08L 25/10; C08L 25/12; C08L 25/14; C08L 25/16; C08L 25/18; C08L 33/00; C08L 33/02; C08L 33/04; C08L 33/06; C08L 33/062; C08L 33/064; C08L 33/066;
(Continued)

(56) References Cited

U.S. PATENT DOCUMENTS 5,245,456 A     9/1993   Yoshimi et al.
2007/0298247 A1  12/2007  Makita et al.
(Continued)

FOREIGN PATENT DOCUMENTS

JP    53-20334     2/1978
JP    59-2038 A    1/1984
(Continued)

OTHER PUBLICATIONS

Kharas, Characterization of Copolymers of N-Vinyl-2-Pyrrolidone with 2-Phenyl-1,1-Dicyanoethene, Journal of Applied Polymer Science, 35, 2173-2181, 1988. (Year: 1988).*
(Continued)

*Primary Examiner* — Christopher M Rodd
(74) *Attorney, Agent, or Firm* — Oblon, McClelland, Maier & Neustadt, L.L.P.

(57) ABSTRACT

A novel copolymer suitable for an optical film which is excellent in optical characteristics and has high retardation even in a thin film state, and an optical film containing the same are provided. A copolymer excellent in optical characteristics and easy to form a composite with a different polymer, and an optical film composed of the same are also provided.

14 Claims, No Drawings

(51) Int. Cl.

| | |
|---|---|
| *C08F 220/14* | (2006.01) |
| *C08F 224/00* | (2006.01) |
| *C08F 226/12* | (2006.01) |
| *C08L 25/08* | (2006.01) |
| *C08L 33/10* | (2006.01) |
| *C08L 37/00* | (2006.01) |
| *C08L 39/04* | (2006.01) |
| *C09D 125/08* | (2006.01) |
| *C09D 133/10* | (2006.01) |
| *C09D 137/00* | (2006.01) |
| *C09D 139/04* | (2006.01) |
| *G02B 1/04* | (2006.01) |
| *G02B 5/30* | (2006.01) |
| *G02F 1/13363* | (2006.01) |

(52) U.S. Cl.
CPC .......... *C08F 224/00* (2013.01); *C08F 226/12* (2013.01); *C08L 25/08* (2013.01); *C08L 33/10* (2013.01); *C08L 37/00* (2013.01); *C08L 39/04* (2013.01); *C09D 125/08* (2013.01); *C09D 133/10* (2013.01); *C09D 137/00* (2013.01); *C09D 139/04* (2013.01); *G02B 1/04* (2013.01); *G02B 5/3083* (2013.01); *G02F 1/13363* (2013.01); *G02F 2413/13* (2013.01); *G02F 2413/14* (2013.01)

(58) Field of Classification Search
CPC ........ C08L 33/068; C08L 33/08; C08L 33/10; C08L 33/12; C08L 33/14; C08L 33/16; C08L 33/18; C08L 33/20; C08L 33/22; C08L 33/24; C08L 33/26; C08L 37/00; C08L 39/00; C08L 39/02; C08L 39/04; C08L 39/06; C08L 39/08; C09D 125/00; C09D 125/02; C09D 125/04; C09D 125/06; C09D 125/08; C09D 125/10; C09D 125/12; C09D 125/14; C09D 125/16; C09D 125/18; C09D 133/00; C09D 133/02; C09D 133/04; C09D 133/06; C09D 133/062; C09D 133/068; C09D 133/10; C09D 133/12; C09D 133/14; C09D 133/16; C09D 133/18; C09D 133/20; C09D 133/22; C09D 133/24; C09D 133/26; C09D 137/00; C09D 139/00; C09D 139/02; C09D 139/04; C09D 139/06; C09D 139/08; C09J 125/00; C09J 125/02; C09J 125/04; C09J 125/06; C09J 125/08; C09J 125/10; C09J 125/12; C09J 125/14; C09J 125/16; C09J 125/18; C09J 133/00; C09J 133/02; C09J 133/04; C09J 133/06; C09J 133/062; C09J 133/068; C09J 133/08; C09J 133/10; C09J 133/12; C09J 133/14; C09J 133/16; C09J 133/18; C09J 133/20; C09J 133/22; C09J 133/24; C09J 133/26; C09J 139/00; C09J 139/02; C09J 139/04; C09J 139/06; C09J 139/08; G02B 1/04; G02B 1/041; G02B 1/043; G02B 1/045; G02B 1/046; G02B 1/048; G02B 1/10; G02B 1/11; G02B 1/111; G02B 1/113; G02B 1/115; G02B 1/116; G02B 1/118; G02B 1/12; G02B 1/14; G02B 1/16; G02B 1/18; G02B 5/3083; G02B 1/3091; G02F 1/13363; G02F 1/133631; G02F 1/133632; G02F 1/133633; G02F 1/133634; G02F 1/133635; G02F 1/133637; G02F 1/13368; G02F 2413/13; G02F 2413/14
See application file for complete search history.

(56) References Cited

U.S. PATENT DOCUMENTS

| | | |
|---|---|---|
| 2008/0068545 A1 | 3/2008 | Doi et al. |
| 2013/0102751 A1 | 4/2013 | Makita et al. |
| 2015/0232599 A1 | 8/2015 | Kitagawa et al. |
| 2015/0291751 A1 | 10/2015 | Kitagawa et al. |
| 2016/0115333 A1 | 4/2016 | Ito et al. |
| 2017/0002421 A1 | 8/2017 | Ito et al. |
| 2017/0242174 A1 | 8/2017 | Ito et al. |

FOREIGN PATENT DOCUMENTS

| | | |
|---|---|---|
| JP | 2-129211 A | 5/1990 |
| JP | 5-297223 A | 11/1993 |
| JP | 5-323120 A | 12/1993 |
| JP | 6-88909 A | 3/1994 |
| JP | 2818983 B2 | 10/1998 |
| JP | 2005-156862 A | 6/2005 |
| JP | 2006-193616 A | 7/2006 |
| JP | A2008-064817 | 3/2008 |
| JP | 2008-112141 A | 5/2008 |
| JP | 2008-129465 A | 6/2008 |
| JP | 2012-32784 A | 2/2012 |
| JP | 2012-92089 A | 5/2012 |
| JP | A2016-079377 | 5/2016 |
| WO | WO 2012/005120 A1 | 1/2012 |
| WO | WO 2014/013982 A1 | 1/2014 |
| WO | WO 2014/084178 A1 | 6/2014 |
| WO | WO 2014/196552 A1 | 12/2014 |
| WO | WO 2016/060115 A1 | 4/2016 |

OTHER PUBLICATIONS

G. B. Kharas et al., "Copolymerization of methyl-α-Cyanocinnamatewith N-Vinyl Pyrrolidone", Polymer Bulletin, vol. 12, No. 1, XP055706889, Dec. 31, 1984, pp. 65-70.
Naeem M. El-Sawy et al., "Chemical Modification on Radiation Copolymerization of N-Vinyl-2-Pyrrolidone/2-(4-Methoxy-Benzylidi ne )-Malononitrile with Some Organic Compounds and Their Biological Activity", Polymer-Plastics Technology and Engineering, vol. 52, No. 13, XP055491700, Jan. 1, 2013, pp. 1330-1337.
International Search Report dated Mar. 6, 2018 in PCT/JP2017/043505 filed Dec. 4, 2017.
Naeem M. El-Sawy, et al., "Chemical Modification of Radiation Copolymerized of [N-Vinyl-2-Pyrrolidone/2-(4-Methoxy-Benzylidine)-Malononitrile] with Some Organic Compounds and Their Biological Activity," Third International Conference on Radiation Sciences and Applications, vol. 5, No. 2, Nov. 2012, pp. 448-462.
Gregory B. Kharas, "Copolymerization of N-Vinyl-2-pyrrolidone and 2-Phenyl-1,1-dicyanoethene," Journal of Applied Polymer Science, vol. 35, 1988, pp. 733-741.
Notice of Reasons for Refusal dated Jul. 6, 2021 in Japanese Patent Application No. 2017-137230 (with English language translation), 8 pages.
Notice of Reasons for Refusal dated Oct. 26, 2021 in Japanese Patent Application JP2017-222844 (w/English translation).
Notice of Reasons for Refusal dated Oct. 26, 2021 in Japanese Patent Application JP2017-223986 (w/English translation).

* cited by examiner

COPOLYMER AND OPTICAL FILM USING SAME

TECHNICAL FIELD

The present invention relates to a novel copolymer and an optical film using the same, and more particularly, relates to a novel copolymer suitable for an optical film having high retardation even in a thin film, in particular, an optical compensation film for a liquid crystal display device or a retardation film of a circularly polarizing plate for an organic EL.

BACKGROUND ART

A liquid crystal display has been used as the most important display device in the multimedia society over a wide range, including a smart phone, a computer monitor, a laptop computer, and a television set.

In a liquid crystal display, many optical films are used so as to enhance the display characteristics, and particularly, a retardation film fulfills a great role in, for example, improving the contrast or compensating the color tone when the display is viewed from the front or oblique direction. As conventional retardation films, polycarbonates and cyclic polyolefins are used, and all of these polymers are polymers having positive birefringence. Here, the positive and negative of birefringence are defined as follows.

The optical anisotropy of a polymer film molecularly oriented by stretching or the like can be represented by a refractive index ellipsoid with the refractive index in the fast axis direction in the film plane being nx, the refractive index in the film in-plane direction orthogonal to it being ny, and the refractive index in the thickness direction of the film being nz, in the case where the film is stretched.

That is, in uniaxial stretching of a polymer having negative birefringence, the refractive index in the stretching axis direction is small (fast axis: stretching direction), and in uniaxial stretching of a polymer having positive birefringence, the refractive index in the axial direction orthogonal to the stretching axis is small (fast axis: direction perpendicular to the stretching direction).

Many polymers have positive birefringence. The polymer having negative birefringence includes an acrylic resin and a polystyrene, but the acrylic resin has a small retardation and is insufficient in the characteristic as a retardation film. The polystyrene is not used at present, because it has a problem on retardation stability, such as occurrence of a change in the retardation with a slight stress due to its large photoelastic coefficient in a low temperature region, and a problem in practical use, such as low heat resistance.

A stretched film of a polymer exhibiting negative birefringence has a high refractive index in the thickness direction of the film, and becomes an unconventional retardation film. Therefore, the film is useful as a retardation film for compensating the viewing angle characteristics of polarizers or displays such as a super twisted nematic type liquid crystal display (STN-LCD), a vertical alignment type liquid crystal display (VA-LCD), an in-plane switching type liquid crystal display (IPS-LCD), and a reflection type liquid crystal display (reflection LCD). There is a strong market demand for retardation films having negative birefringence.

Methods for producing a film in which the refractive index in the thickness direction of the film is increased using a polymer having positive birefringence have been proposed. One of the methods is a processing method where a heat-shrinkable film is adhered to one side or both sides of a polymer film, and the laminate is heat-stretched to apply a shrinking force in the film thickness direction of the polymer film (see, for example, Patent Documents 1 to 3). Further, a method of uniaxially stretching a polymer film in a plane while applying an electric field to the film has been proposed (see, for example, Patent Document 4).

In addition, a retardation film composed of fine particles having negative optical anisotropy and a transparent polymer has been proposed (see, for example, Patent Document 5).

However, the methods proposed in Patent Documents 1 to 4 have a problem of poor productivity because the production processes are very complicated. Further, control of the uniformity of the retardation and the like is also extremely difficult as compared with the control by conventional stretching.

The retardation film obtained in Patent Document 5 is a retardation film that exhibits negative birefringence by adding fine particles having negative optical anisotropy, and in view of simplification and economical efficiency of the production method, there is a demand for a retardation film that does not require the addition of the fine particles.

Moreover, fumarate diester-based copolymers and films composed of them have been proposed (see, for example, Patent Documents 6 to 12).

The fumarate diester-based copolymers and the films composed thereof proposed in Patent Documents 6 to 12 have high retardation but, at present, a film having high retardation even in a thinner film state is required.

Furthermore, there has been proposed a single-film type optical compensation film material formed by composite formation of a positive birefringence material and a negative birefringence material (see, for example, Patent Documents 13 and 14), and in order to achieve higher performance in optical characteristics, there is a demand for a polymeric material that is capable of composite formation and exhibits negative birefringence.

RELATED ART

Patent Document

Patent Document 1: Japanese Patent No. 2818983
Patent Document 2: JP-A-H5-297223
Patent Document 3: JP-A-H5-323120
Patent Document 4: JP-A-H6-88909
Patent Document 5: JP-A-2005-156862
Patent Document 6: JP-A-2008-112141
Patent Document 7: JP-A-2012-032784
Patent Document 8: WO2012/005120
Patent Document 9: JP-A-2008-129465
Patent Document 10: JP-A-2006-193616
Patent Document 11: WO2014/013982
Patent Document 12: WO2014/084178
Patent Document 13: WO2014/196552
Patent Document 14: WO2016/060115

SUMMARY OF INVENTION

Problems to be Solved by the Invention

The present invention is made in view of the above problems and an objective thereof is to provide a novel copolymer suitable for an optical film which is excellent in optical characteristics and has high retardation even in a thin film state, and an optical film containing the same. Another object of the present invention is to provide a copolymer excellent in optical characteristics and easy to form a composite with a different polymer, and an optical film composed of the same.

Means for Solving the Problems

As a result of extensive studies for solving the above problems, the present inventors have found that a specific copolymer can solve the above problems, and have accomplished the present invention.

That is, the present invention resides in the following [1] to [14].

[1] A copolymer comprising a residue unit A represented by the general formula (1) and a residue unit B represented by the general formula (2):

[Chem 1]

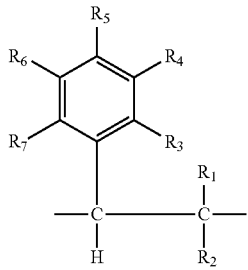

(1)

wherein $R_1$ and $R_2$ each independently represent hydrogen (provided that the case where $R_1$ and $R_2$ are both hydrogen is excluded), a cyano group, an ester group ($—C(=O)OX_1$), an amide group ($—C(=O)N(X_2)(X_3)$), or an acyl group ($—C(=O)X_4$) (where $X_1$ to $X_3$ each independently represent a linear alkyl group having 1 to 12 carbon atoms, a branched alkyl group having 1 to 12 carbon atoms, or a cyclic alkyl group having 3 to 6 carbon atoms, and $X_4$ represents a linear alkyl group having 1 to 12 carbon atoms, a branched alkyl group having 1 to 12 carbon atoms, or a cyclic group having 3 to 14 carbon atoms); $R_3$ to $R_7$ each independently represent hydrogen, a linear alkyl group having 1 to 12 carbon atoms, a branched alkyl group having 1 to 12 carbon atoms, a cyclic group having 3 to 14 carbon atoms, a halogen, a hydroxy group, a carboxy group, a nitro group, a cyano group, an alkoxy group ($—OX_5$), an ester group ($—C(=O)OX_6$), an amide group ($—C(=O)N(X_7)(X_8)$), an acyl group ($—C(=O)X_9$), an amino group ($—N(X_{10})(X_{11})$), or a sulfonic acid group ($—SOOX_{12}$) (where $X_5$ to $X_8$ each independently represent a linear alkyl group having 1 to 12 carbon atoms, a branched alkyl group having 1 to 12 carbon atoms, or a cyclic alkyl group having 3 to 6 carbon atoms, and $X_9$ to $X_{12}$ each independently represent hydrogen, a linear alkyl group having 1 to 12 carbon atoms, a branched alkyl group having 1 to 12 carbon atoms, or a cyclic alkyl group having 3 to 6 carbon atoms); and adjacent substituents among $R_3$ to $R_7$ may form a fused ring structure each other,

[Chem 2]

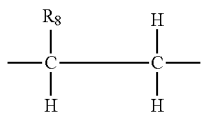

(2)

wherein $R_8$ represents an m-membered heterocyclic residue containing one or more heteroatoms or a 5-membered or 6-membered ring residue containing no heteroatom (provided that, when $R_8$ is a 6-membered ring residue containing no heteroatom, at least one of $R_3$ to $R_7$ in the general formula (1) represents a hydroxy group), and m represents an integer of 5 to 10; and the m-membered heterocyclic residue, the 5-membered ring residue, and the 6-membered ring residue may form a fused ring structure.

[2] The copolymer according to the above [1], wherein $R_1$ is selected from the group consisting of a cyano group, an ester group, an amide group, and an acyl group.

[3] The copolymer according to the above [1] or [2], wherein $R_2$ is a cyano group.

[4] The copolymer according to any one of the above [1] to [3], wherein $R_8$ is a 5-membered heterocyclic residue or a 6-membered heterocyclic residue containing at least one nitrogen atom or oxygen atom as a heteroatom (the 5-membered heterocyclic residue and the 6-membered heterocyclic residue may form a fused ring structure with another cyclic structure).

[5] The copolymer according to the above [1], wherein the residue unit A represented by the general formula (1) is one or more selected from the group consisting of an α-cyano-cinnamate ester residue unit, a benzalmalononitrile residue unit, a nitrobenzalmalononitrile residue unit, a cinnamonitrile residue unit, a chalcone residue unit, an alkoxychalcone residue unit, a benzylidenemalonate diester residue unit, and an N,N-dialkylcinnamamide residue unit.

[6] The copolymer according to any one of the above [1] to [4], wherein any one or more of $R_3$ to $R_7$ in the residue unit A represented by the general formula (1) is a hydroxy group.

[7] The copolymer according to any one of the above [1] to [6] comprising the residue unit A represented by the general formula (1), wherein the residue unit B is a residue unit represented by the general formula (3) and/or the general formula (4):

[Chem 3]

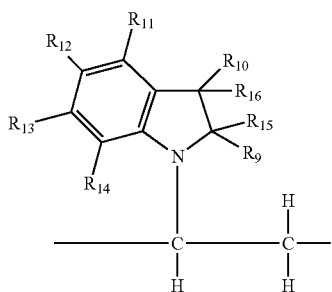

(3)

wherein $R_9$ to $R_{16}$ each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group ($—OX_{13}$), an ester group ($—C(=O)OX_{14}$ or $—CO(=O)—X_{15}$), an amide group ($—C(=O)N(X_{16})(X_{17})$ or $—NX_{18}C(=O)X_{19}$), an acyl group ($—C(=O)X_{20}$), or an amino group ($—N(X_{21})(X_{22})$) (where $X_{13}$ to $X_{15}$ each independently represent a linear alkyl group having 1 to 12 carbon atoms, a branched alkyl group having 1 to 12 carbon atoms, or a cyclic group having 3 to 14 carbon atoms, $X_{16}$ to $X_{22}$ each independently represent hydrogen, a linear alkyl group having 1 to 12 carbon atoms, a branched alkyl group having 1 to 12 carbon atoms, or a cyclic group having 3 to 14 carbon atoms); adjacent substituents among $R_9$ to $R_{16}$ may form a fused ring structure each other; and $R_9$ and $R_{15}$, and, $R_{10}$ and $R_{16}$ may consist of the same atoms and may form a ring structure,

[Chem 4]

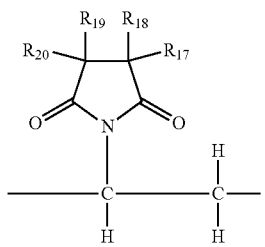

(4)

wherein $R_{17}$ to $R_{20}$ each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group (—$OX_{23}$), an ester group (—C(=O)$OX_{24}$ or —CO(=O)—$X_{25}$), an amide group (—C(=O)N($X_{26}$)($X_{27}$) or —N$X_{28}$C(=O)$X_{29}$), an acyl group (—C(=O)$X_{30}$), or an amino group (—N($X_{31}$)($X_{32}$)) (where $X_{23}$ to $X_{25}$ each independently represent a linear alkyl group having 1 to 12 carbon atoms, a branched alkyl group having 1 to 12 carbon atoms, or a cyclic group having 3 to 14 carbon atoms, $X_{26}$ to $X_{32}$ each independently represent hydrogen, a linear alkyl group having 1 to 12 carbon atoms, a branched alkyl group having 1 to 12 carbon atoms, or a cyclic group having 3 to 14 carbon atoms); adjacent substituents among $R_{17}$ to $R_{20}$ may form a fused ring structure each other; and $R_{17}$ and $R_{18}$, and, $R_{19}$ and $R_{20}$ may consist of the same atoms and may form a ring structure.

[8] The copolymer according to any one of the above [1] to [7], wherein a molar ratio A/B of the residue unit A represented by the general formula (1) to the residue unit B represented by the general formula (2) falls within the range of 0.05 to 6.

[9] The copolymer according to any one of the above [1] to [8], wherein a number-average molecular weight of the copolymer is 3,000 to 500,000 in terms of standard polystyrene when the residue unit B is a residue unit B other than the general formula (4) or in terms of standard pullulan when the residue unit B is a residue unit represented by the general formula (4).

[10] A process for producing the copolymer according to any one of the above [1] to [9], comprising conducting polymerization using a monomer represented by the general formula (5):

[Chem 5]

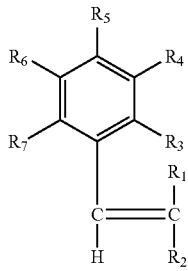

(5)

wherein $R_1$ and $R_2$ each independently represent hydrogen (provided that the case where $R_1$ and $R_2$ are both hydrogen is excluded), a cyano group, an ester group (—C(=O)$OX_1$), an amide group (—C(=O)N($X_2$)($X_3$)), or an acyl group (—C(=O)$X_4$) (where $X_1$ to $X_3$ each independently represent a linear alkyl group having 1 to 12 carbon atoms, a branched alkyl group having 1 to 12 carbon atoms, or a cyclic alkyl group having 3 to 6 carbon atoms, and $X_4$ represents a linear alkyl group having 1 to 12 carbon atoms, a branched alkyl group having 1 to 12 carbon atoms, or a cyclic group having 3 to 14 carbon atoms); $R_3$ to $R_7$ each independently represent hydrogen, a linear alkyl group having 1 to 12 carbon atoms, a branched alkyl group having 1 to 12 carbon atoms, a cyclic group having 3 to 14 carbon atoms, a halogen, a hydroxy group, a carboxy group, a nitro group, a cyano group, an alkoxy group (—$OX_5$), an ester group (—C(=O)$OX_6$), an amide group (—C(=O)N($X_7$)($X_8$)), an acyl group (—C(=O)$X_9$), an amino group (—N($X_{10}$)($X_{11}$)), or a sulfonic acid group (—SOO$X_{12}$) (where $X_5$ to $X_8$ each independently represent a linear alkyl group having 1 to 12 carbon atoms, a branched alkyl group having 1 to 12 carbon atoms, or a cyclic alkyl group having 3 to 6 carbon atoms, $X_9$ to $X_{12}$ each independently represent hydrogen, a linear alkyl group having 1 to 12 carbon atoms, a branched alkyl group having 1 to 12 carbon atoms, or a cyclic alkyl group having 3 to 6 carbon atoms); and adjacent substituents among $R_3$ to $R_7$ may form a fused ring structure each other.

[11] An optical film comprising the copolymer according to any one of the above [1] to [9].

[12] A retardation film using the optical film according to the above [11], wherein in the case where the refractive index in the fast axis direction in the film plane is nx, the refractive index in the film in-plane direction orthogonal to it is ny, and the refractive index in the thickness direction of the film is nz, the relationship among them is nx≅ny<nz.

[13] A resin composition comprising the copolymer according to any one of the above [1] to [9] and a resin having positive intrinsic birefringence.

[14] An optical compensation film using the resin composition according to the above [13], wherein an in-plane retardation (Re) represented by the following formula (b) is 50 to 500 nm, an Nz coefficient represented by the following formula (c) is 0≤Nz≤1.0, and a ratio Re(450)/Re(550) of the in-plane retardation (Re) at a light wavelength of 450 nm to the in-plane retardation (Re) at a light wavelength of 550 nm is 0.60<Re(450)/Re(550)<1.10:

$Re=(nx-ny)\times d$ (b)

$Nz=(nx-nz)/(nx-ny)$ (c)

wherein nx represents a refractive index in the stretching axis direction in the film plane, ny represents a refractive index in the direction perpendicular to the stretching axis in the film plane, nz represents a refractive index of out-of-plane (thickness direction) of the film, and d represents film thickness.

Hereinafter, the copolymer suitable for the retardation film of the present invention will be described in detail.

The copolymer of the present invention is a copolymer comprising a residue unit A represented by the general formula (1) and a residue unit B represented by the general formula (2). The copolymer is characterized in that high retardation is exhibited even in a thin film because the copolymer comprises the residue unit A and the residue unit B.

[Chem 6]

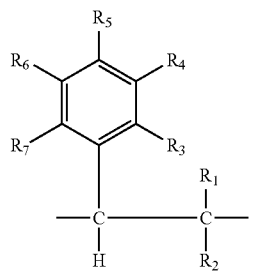

(1)

wherein $R_1$ and $R_2$ each independently represent hydrogen (provided that the case where $R_1$ and $R_2$ are both hydrogen is excluded), a cyano group, an ester group (—C(=O)OX$_1$), an amide group (—C(=O)N(X$_2$)(X$_3$)), or an acyl group (—C(=O)X$_4$) (where $X_1$ to $X_3$ each independently represent a linear alkyl group having 1 to 12 carbon atoms, a branched alkyl group having 1 to 12 carbon atoms, or a cyclic alkyl group having 3 to 6 carbon atoms, and $X_4$ represents a linear alkyl group having 1 to 12 carbon atoms, a branched alkyl group having 1 to 12 carbon atoms, or a cyclic group having 3 to 14 carbon atoms); $R_3$ to $R_7$ each independently represent hydrogen, a linear alkyl group having 1 to 12 carbon atoms, a branched alkyl group having 1 to 12 carbon atoms, a cyclic group having 3 to 14 carbon atoms, a halogen, a hydroxy group, a carboxy group, a nitro group, a cyano group, an alkoxy group (—OX$_5$), an ester group (—C(=O)OX$_6$), an amide group (—C(=O)N(X$_7$)(X$_8$)), an acyl group (—C(=O)X$_9$), an amino group (—N(X$_{10}$)(X$_{11}$)), or a sulfonic acid group (—SOOX$_{12}$) (where $X_5$ to $X_8$ each independently represent a linear alkyl group having 1 to 12 carbon atoms, a branched alkyl group having 1 to 12 carbon atoms, or a cyclic alkyl group having 3 to 6 carbon atoms, $X_9$ to $X_{12}$ each independently represent hydrogen, a linear alkyl group having 1 to 12 carbon atoms, a branched alkyl group having 1 to 12 carbon atoms, or a cyclic alkyl group having 3 to 6 carbon atoms); and adjacent substituents among $R_3$ to $R_7$ may form a fused ring structure each other,

[Chem 7]

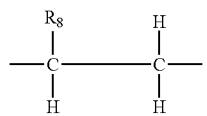

(2)

wherein $R_8$ represents an m-membered heterocyclic residue containing one or more heteroatoms or a 5-membered or 6-membered ring residue containing no heteroatom (provided that, when $R_8$ is a 6-membered ring residue containing no heteroatom, at least one of $R_3$ to $R_7$ in the general formula (1) represents a hydroxy group), and m represents an integer of 5 to 10; and the m-membered heterocyclic residue, the 5-membered ring residue, and the 6-membered ring residue may form a fused ring structure.

$R_1$ and $R_2$ in the general formula (1) of the present invention each independently represent hydrogen (provided that the case where $R_1$ and $R_2$ are both hydrogen is excluded), a cyano group, an ester group (—C(=O)OX$_1$), an amide group (—C(=O)N(X$_2$)(X$_3$)), or an acyl group (—C(=O)X$_4$) (where $X_1$ to $X_3$ each independently represent a linear alkyl group having 1 to 12 carbon atoms, a branched alkyl group having 1 to 12 carbon atoms, or a cyclic alkyl group having 3 to 6 carbon atoms, and $X_4$ represents a linear alkyl group having 1 to 12 carbon atoms, a branched alkyl group having 1 to 12 carbon atoms, or a cyclic group having 3 to 14 carbon atoms).

Examples of the linear alkyl group having 1 to 12 carbon atoms in $X_1$ to $X_4$ include a methyl group, an ethyl group, an n-propyl group, an n-butyl group, an n-pentyl group, an n-hexyl group, and the like. Examples of the branched alkyl group having 1 to 12 carbon atoms include an isopropyl group, a sec-butyl group, a tert-butyl group, an isobutyl group, and the like. Examples of the cyclic alkyl group having 3 to 6 carbon atoms in $X_1$ to $X_3$ include a cyclopropyl group, a cyclobutyl group, a cyclohexyl group, and the like. Examples of the cyclic group having 3 to 14 carbon atoms in $X_4$ include a cyclopropyl group, a cyclobutyl group, a cyclohexyl group, a phenyl group, a naphthyl group, and the like.

As $R_1$ in the general formula (1) of the present invention, since higher retardation is expressed, preferred are a cyano group; ester groups such as a methyl ester group, an ethyl ester group, an n-propyl ester group, an isopropyl ester group, and an isobutyl ester group; amide groups such as a dimethylamide group, a diethylamide group, a di-n-propylamide group, and a diisopropylamide group; acyl groups such as an acetyl group, a propionyl group, and a benzoyl group, more preferred are a cyano group, a methyl ester group, an ethyl ester group, an n-propyl ester group, an isopropyl ester group, an isobutyl ester group, a dimethylamide group, a diethylamide group, a di-n-propylamide group, a diisopropylamide group, and a benzoyl group, and particularly preferred are a cyano group, a methyl ester group, an ethyl ester group, an n-propyl ester group, an isopropyl ester group, and an isobutyl ester group.

As $R_2$ in the general formula (1) of the present invention, since higher retardation is expressed, preferred are hydrogen; a cyano group; ester groups such as a methyl ester group, an ethyl ester group, an n-propyl ester group, an isopropyl ester group, and an isobutyl ester group; more preferred are hydrogen, a cyano group, a methyl ester group, an ethyl ester group, an n-propyl ester group, an isopropyl ester group, and an isobutyl ester group, and particularly preferred are a cyano group and an isobutyl ester group.

$R_3$ to $R_7$ in the general formula (1) of the present invention each independently represent hydrogen, a linear alkyl group having 1 to 12 carbon atoms, a branched alkyl group having 1 to 12 carbon atoms, a cyclic alkyl group having 3 to 6 carbon atoms, a halogen, a hydroxy group, a carboxy group, a nitro group, a cyano group, an alkoxy group (—OX$_5$), an ester group (—C(=O)OX$_6$), an amide group (—C(=O)N(X$_7$)(X$_8$)), an acyl group (—C(=O)X$_9$), an amino group (—N($X_{10}$)($X_{11}$)), or a sulfonyl group (—SOO$X_{12}$) (where $X_5$ to $X_8$ each independently represent a linear alkyl group having 1 to 12 carbon atoms, a branched alkyl group having 1 to 12 carbon atoms, or a cyclic alkyl group having 3 to 6 carbon atoms, and $X_9$ to $X_{12}$ each independently represent hydrogen, a linear alkyl group having 1 to 12 carbon atoms, a branched alkyl group having 1 to 12 carbon atoms, or a cyclic alkyl group having 3 to 6 carbon atoms); and adjacent substituents among $R_3$ to $R_7$ may form a fused ring structure each other.

Examples of the linear alkyl group having 1 to 12 carbon atoms in $R_3$ to $R_7$ include a methyl group, an ethyl group, an n-propyl group, an n-butyl group, an n-pentyl group, and an n-hexyl group. Examples of the branched alkyl group having 1 to 12 carbon atoms include an isopropyl group, an isobutyl group, a sec-butyl group, a tert-butyl group, and the like. Examples of the cyclic alkyl group having 3 to 6 carbon atoms include a cyclopropyl group, a cyclobutyl group, a cyclohexyl group, and the like.

Examples of the halogen in $R_3$ to $R_7$ include fluorine, chlorine, bromine, and the like.

Examples of the linear alkyl group having 1 to 12 carbon atoms in $X_5$ to $X_{12}$ include a methyl group, an ethyl group, an n-propyl group, an n-butyl group, an n-pentyl group, an n-hexyl group, and the like. Examples of the branched alkyl group having 1 to 12 carbon atoms include an isopropyl group, an isobutyl group, a sec-butyl group, a tert-butyl group, and the like. Examples of the cyclic alkyl group having 3 to 6 carbon atoms in include a cyclopropyl group, a cyclobutyl group, a cyclohexyl group, and the like.

As $R_3$ to $R_7$ in the general formula (1) of the present invention, since higher retardation is expressed, preferred are a methyl group, an ethyl group, an n-propyl group, an isopropyl group, an n-butyl group, a sec-butyl group, a tert-butyl group, an isobutyl group, a cyclohexyl group, a fluorine atom, a chlorine atom, a bromine atom, a hydroxy group, a carboxy group, a formyl group, a cyano group, a nitro group, a methoxy group, an ethoxy group, an n-propoxy group, an isopropoxy group, a methyl ester group, an ethyl ester group, an n-propyl ester group, an isopropyl ester group, a dimethylamide group, a diethylamide group, a di-n-propylamide group, a diisopropylamide group, an acetyl group, a propionyl group, a butyryl group, an isobutyryl group, a dimethylamino group, a diethylamino group, a di-n-propylamino group, a diisopropylamino group, a sulfonic acid group, a methylsulfonyl group, an ethylsulfonyl group, an n-propylsulfonyl group, and an isopropylsulfonyl group.

Specific examples of the residue unit A represented by the general formula (1) include a methyl α-cyanocinnamate residue unit, a methyl 2-methyl-α-cyanocinnamate residue unit, a methyl 3-methyl-α-cyanocinnamate residue unit, a methyl 4-methyl-α-cyanocinnamate residue unit, a methyl 2-ethyl-α-cyanocinnamate residue unit, a methyl 3-ethyl-α-cyanocinnamate residue unit, a methyl 4-ethyl-α-cyanocinnamate residue unit, a methyl 2-fluoro-α-cyanocinnamate residue unit, a methyl 3-fluoro-α-cyanocinnamate residue unit, a methyl 4-fluoro-α-cyanocinnamate residue unit, a methyl 2-chloro-α-cyanocinnamate residue unit, a methyl 3-chloro-α-cyanocinnamate residue unit, a methyl 4-chloro-α-cyanocinnamate residue unit, a methyl 2-bromo-α-cyanocinnamate residue unit, a methyl 3-bromo-α-cyanocinnamate residue unit, a methyl 4-bromo-α-cyanocinnamate residue unit, a methyl 2-hydroxy-α-cyanocinnamate residue unit, a methyl 3-hydroxy-α-cyanocinnamate residue unit, a methyl 4-hydroxy-α-cyanocinnamate residue unit, a methyl 2,3-dihydroxy-α-cyanocinnamate residue unit, a methyl 3,4-dihydroxy-α-cyanocinnamate residue unit, a methyl 2-carboxy-α-cyanocinnamate residue unit, a methyl 3-carboxy-α-cyanocinnamate residue unit, a methyl 4-carboxy-α-cyanocinnamate residue unit, a methyl 2,3-dicarboxy-α-cyanocinnamate residue unit, a methyl 3,4-dicarboxy-α-cyanocinnamate residue unit, a methyl 2-carboxy-3-hydroxy-α-cyanocinnamate residue unit, a methyl 3-carboxy-2-hydroxy-α-cyanocinnamate residue unit, a methyl 3-carboxy-4-hydroxy-α-cyanocinnamate residue unit, a methyl 4-carboxy-3-hydroxy-α-cyanocinnamate residue unit, a methyl 2-carboxy-4-hydroxy-α-cyanocinnamate residue unit, a methyl 4-carboxy-2-hydroxy-α-cyanocinnamate residue unit, a methyl 2-cyano-α-cyanocinnamate residue unit, a methyl 3-cyano-α-cyanocinnamate residue unit, a methyl 4-cyano-α-cyanocinnamate residue unit, a methyl 2-nitro-α-cyanocinnamate residue unit, a methyl 3-nitro-α-cyanocinnamate residue unit, a methyl 4-nitro-α-cyanocinnamate residue unit, a methyl 2-methoxy-α-cyanocinnamate residue unit, a methyl 3-methoxy-α-cyanocinnamate residue unit, a methyl 4-methoxy-α-cyanocinnamate residue unit, a methyl 2-ethoxy-α-cyanocinnamate residue unit, a methyl 3-ethoxy-α-cyanocinnamate residue unit, a methyl 4-ethoxy-α-cyanocinnamate residue unit, a methyl 2-dimethylamino-α-cyanocinnamate residue unit, a methyl 3-dimethylamino-α-cyanocinnamate residue unit, a methyl 4-dimethylamino-α-cyanocinnamate residue unit, a methyl 2-diethylamino-α-cyanocinnamate residue unit, a methyl 3-diethylamino-α-cyanocinnamate residue unit, a methyl 4-diethylamino-α-cyanocinnamate residue unit, an ethyl α-cyanocinnamate residue unit, an ethyl 2-methyl-α-cyanocinnamate residue unit, an ethyl 3-methyl-α-cyanocinnamate residue unit, an ethyl 4-methyl-α-cyanocinnamate residue unit, an ethyl 2-ethyl-α-cyanocinnamate residue unit, an ethyl 3-ethyl-α-cyanocinnamate residue unit, an ethyl 4-ethyl-α-cyanocinnamate residue unit, an ethyl 2-fluoro-α-cyanocinnamate residue unit, an ethyl 3-fluoro-α-cyanocinnamate residue unit, an ethyl 4-fluoro-α-cyanocinnamate residue unit, an ethyl 2-chloro-α-cyanocinnamate residue unit, an ethyl 3-chloro-α-cyanocinnamate residue unit, an ethyl 4-chloro-α-cyanocinnamate residue unit, an ethyl 2-bromo-α-cyanocinnamate residue unit, an ethyl 3-bromo-α-cyanocinnamate residue unit, an ethyl 4-bromo-α-cyanocinnamate residue unit, an ethyl 2-hydroxy-α-cyanocinnamate residue unit, an ethyl 3-hydroxy-α-cyanocinnamate residue unit, an ethyl 4-hydroxy-α-cyanocinnamate residue unit, an ethyl 2,3-dihydroxy-α-cyanocinnamate residue unit, an ethyl 3,4-dihydroxy-α-cyanocinnamate residue unit, an ethyl 2-carboxy-α-cyanocinnamate residue unit, an ethyl 3-carboxy-α-cyanocinnamate residue unit, an ethyl 4-carboxy-α-cyanocinnamate residue unit, an ethyl 2,3-dicarboxy-α-cyanocinnamate residue unit, an ethyl 3,4-dicarboxy-α-cyanocinnamate residue unit, an ethyl 2-carboxy-3-hydroxy-α-cyanocinnamate residue unit, an ethyl 3-carboxy-2-hydroxy-α-cyanocinnamate residue unit, an ethyl 3-carboxy-4-hydroxy-α-cyanocinnamate residue unit, an ethyl 4-carboxy-3-hydroxy-α-cyanocinnamate residue unit, an ethyl 2-carboxy-4-hydroxy-α-cyanocinnamate residue unit, an ethyl 4-carboxy-2-hydroxy-α-cyanocinnamate residue unit, an ethyl 2-cyano-α-cyanocinnamate residue unit, an ethyl 3-cyano-α-cyanocinnamate residue unit, an ethyl 4-cyano-α-cyanocinnamate residue unit, an ethyl 2-nitro-α-cyanocinnamate residue unit, an ethyl 3-nitro-α-cyanocinnamate residue unit, an ethyl 4-nitro-α-cyanocinnamate residue unit, an ethyl 2-methoxy-α-cyanocinnamate residue unit, an ethyl 3-methoxy-α-cyanocinnamate residue unit, an ethyl 4-methoxy-α-cyanocinnamate residue unit, an ethyl 2-ethoxy-α-cyanocinnamate residue unit, an ethyl 3-ethoxy-α-cyanocinnamate residue unit, an ethyl 4-ethoxy-α-cyanocinnamate residue unit, an ethyl 2-dimethylamino-α-cyanocinnamate residue unit, an ethyl 3-dimethylamino-α-cyanocinnamate residue unit, an ethyl 4-dimethylamino-α-cyanocinnamate residue unit, an ethyl 2-diethylamino-α-cyanocinnamate residue unit, an ethyl 3-diethylamino-α-cyanocinnamate residue unit, an ethyl 4-diethylamino-α-cyanocinnamate residue unit, an n-propyl α-cyanocinnamate residue unit, an n-propyl 2-methyl-α-cyanocinnamate residue unit, an n-propyl 3-methyl-α-cyanocinnamate residue unit, an n-propyl 4-methyl-α-cyanocinnamate residue unit, an n-propyl 2-ethyl-α-cyanocinnamate residue unit, an n-propyl 3-ethyl-α-cyanocinnamate residue unit, an n-propyl 4-ethyl-α-cyanocinnamate residue unit, an n-propyl 2-fluoro-α-cyanocinnamate residue unit, an n-propyl 3-fluoro-α-cyanocinnamate residue unit, an n-propyl 4-fluoro-α-cyanocinnamate residue unit, an n-propyl 2-chloro-α-cyanocinnamate residue unit, an n-propyl 3-chloro-α-cyanocinnamate residue unit, an n-propyl 4-chloro-α-cyanocinnamate residue unit, an n-propyl 2-bromo-α-cyanocinnamate residue unit, an n-propyl 3-bromo-α-cyanocinnamate residue unit, an n-propyl 4-bromo-α-cyanocinnamate residue unit, an n-propyl 2-hydroxy-α-cyanocinnamate residue unit, an n-propyl 3-hydroxy-α-cyanocinnamate residue unit, an n-propyl 4-hydroxy-α-cyanocinnamate residue unit, an n-propyl 2,3-dihydroxy-α-cyanocinnamate residue unit, an n-propyl 3,4-dihydroxy-α-cyanocinnamate residue unit, an n-propyl 2-carboxy-α-cyanocinnamate residue unit, an n-propyl 3-carboxy-α-cyanocinnamate residue unit, an n-propyl 4-carboxy-α-cyanocinnamate residue unit, an n-propyl 2,3-dicarboxy-α-cyanocinnamate residue unit, an n-propyl 3,4-dicarboxy-α-cyanocinnamate residue unit, an n-propyl 2-carboxy-3-hydroxy-α-cyanocinnamate residue unit, an n-propyl 3-carboxy-2-hydroxy-α-cyanocinnamate residue unit, an n-propyl 3-carboxy-4-hydroxy-α-cyanocinnamate residue unit, an n-propyl 4-carboxy-3-hydroxy-α-cyanocinnamate residue unit, an n-propyl 2-carboxy-4-hydroxy-α-cyanocinnamate residue unit, an n-propyl 4-carboxy-2-hydroxy-α-cyanocinnamate residue unit, an n-propyl 2-cyano-α-cyanocinnamate residue unit, an n-propyl 3-cyano-α-cyanocinnamate residue unit, an n-propyl 4-cyano-α-cyanocinnamate residue unit, an n-propyl 2-nitro-α-cyanocinnamate residue unit, an n-propyl 3-nitro-α-cyanocinnamate residue unit, an n-propyl 4-nitro-α-cyanocinnamate residue unit, an n-propyl 2-methoxy-α-cyanocinnamate residue unit, an n-propyl 3-methoxy-α-cyanocinnamate residue unit, an n-propyl 4-methoxy-α-cyanocinnamate residue unit, an n-propyl 2-ethoxy-α-cyanocinnamate residue unit, an n-propyl 3-ethoxy-α-cyanocinnamate residue unit, an n-propyl 4-ethoxy-α-cyanocinnamate residue unit, an n-propyl 2-dimethylamino-α-cyanocinnamate residue unit, an n-propyl 3-dimethylamino-α-cyanocinnamate residue unit, an n-propyl 4-dimethylamino-α-cyanocinnamate residue unit, an n-propyl 2-diethylamino-α-cyanocinnamate residue unit, an n-propyl 3-diethylamino-α-cyanocinnamate residue unit, an n-propyl 4-diethylamino-α-cyanocinnamate residue unit, an isopropyl α-cyanocinnamate residue unit, an isopropyl 2-methyl-α-cyanocinnamate residue unit, an isopropyl 3-methyl-α-cyanocinnamate residue unit, an isopropyl 4-methyl-α-cyanocinnamate residue unit, an isopropyl 2-ethyl-α-cyanocinnamate residue unit, an isopropyl 3-ethyl-α-cyanocinnamate residue unit, an isopropyl 4-ethyl-α-cyanocinnamate residue unit, an isopropyl 2-fluoro-α-cyanocinnamate residue unit, an isopropyl 3-fluoro-α-cyanocinnamate residue unit, an isopropyl 4-fluoro-α-cyanocinnamate residue unit, an isopropyl 2-chloro-α-cyanocinnamate residue unit, an isopropyl 3-chloro-α-cyanocinnamate residue unit, an isopropyl 4-chloro-α-cyanocinnamate residue unit, an isopropyl 2-bromo-α-cyanocinnamate residue unit, an isopropyl 3-bromo-α-cyanocinnamate residue unit, an isopropyl 4-bromo-α-cyanocinnamate residue unit, an isopropyl 2-hydroxy-α-cyanocinnamate residue unit, an isopropyl 3-hydroxy-α-cyanocinnamate residue unit, an isopropyl 4-hydroxy-α-cyanocinnamate residue unit, an isopropyl 2,3-dihydroxy-α-cyanocinnamate residue unit, an isopropyl 3,4-dihydroxy-α-cyanocinnamate residue unit, an isopropyl 2-carboxy-α-cyanocinnamate residue unit, an isopropyl 3-carboxy-α-cyanocinnamate residue unit, an isopropyl 4-carboxy-α-cyanocinnamate residue unit, an isopropyl 2,3-dicarboxy-α-cyanocinnamate residue unit, an isopropyl 3,4-dicarboxy-α-cyanocinnamate residue unit, an isopropyl 2-carboxy-3-hydroxy-α-cyanocinnamate residue unit, an isopropyl 3-carboxy-2-hydroxy-α-cyanocinnamate residue unit, an isopropyl 3-carboxy-4-hydroxy-α-cyanocinnamate residue unit, an isopropyl 4-carboxy-3-hydroxy-α-cyanocinnamate residue unit, an isopropyl 2-carboxy-4-hydroxy-α-cyanocinnamate residue unit, an isopropyl 4-carboxy-2-hydroxy-α-cyanocinnamate residue unit, an isopropyl 2-cyano-α-cyanocinnamate residue unit, an isopropyl 3-cyano-α-cyanocinnamate residue unit, an isopropyl 4-cyano-α-cyanocinnamate residue unit, an isopropyl 2-nitro-α-cyanocinnamate residue unit, an isopropyl 3-nitro-α-cyanocinnamate residue unit, an isopropyl 4-nitro-α-cyanocinnamate residue unit, an isopropyl 2-methoxy-α-cyanocinnamate residue unit, an isopropyl 3-methoxy-α-cyanocinnamate residue unit, an isopropyl 4-methoxy-α-cyanocinnamate residue unit, an isopropyl 2-ethoxy-α-cyanocinnamate residue unit, an isopropyl 3-ethoxy-α-cyanocinnamate residue unit, an isopropyl 4-ethoxy-α-cyanocinnamate residue unit, an isopropyl 2-dimethylamino-α-cyanocinnamate residue unit, an isopropyl 3-dimethylamino-α-cyanocinnamate residue unit, an isopropyl 4-dimethylamino-α-cyanocinnamate residue unit, an isopropyl 2-diethylamino-α-cyanocinnamate residue unit, an isopropyl 3-diethylamino-α-cyanocinnamate residue unit, an isopropyl 4-diethylamino-α-cyanocinnamate residue unit, an isobutyl α-cyanocinnamate residue unit, an isobutyl 2-methyl-α-cyanocinnamate residue unit, an isobutyl 3-methyl-α-cyanocinnamate residue unit, an isobutyl 4-methyl-α-cyanocinnamate residue unit, an isobutyl 2-ethyl-α-cyanocinnamate residue unit, an isobutyl 3-ethyl-α-cyanocinnamate residue unit, an isobutyl 4-ethyl-α-cyanocinnamate residue unit, an isobutyl 2-fluoro-α-cyanocinnamate residue unit, an isobutyl 3-fluoro-α-cyanocinnamate residue unit, an isobutyl 4-fluoro-α-cyanocinnamate residue unit, an isobutyl 2-chloro-α-cyanocinnamate residue unit, an isobutyl 3-chloro-α-cyanocinnamate residue unit, an isobutyl 4-chloro-α-cyanocinnamate residue unit, an isobutyl 2-bromo-α-cyanocinnamate residue unit, an isobutyl 3-bromo-α-cyanocinnamate residue unit, an isobutyl 4-bromo-α-cyanocinnamate residue unit, an isobutyl 2-hydroxy-α-cyanocinnamate residue unit, an isobutyl 3-hydroxy-α-cyanocinnamate residue unit, an isobutyl 4-hydroxy-α-cyanocinnamate residue unit, an isobutyl 2,3-dihydroxy-α-cyanocinnamate residue unit, an isobutyl 3,4-dihydroxy-α-cyanocinnamate residue units, an isobutyl 2-carboxy-α-cyanocinnamate residue unit, an isobutyl 3-carboxy-α-cyanocinnamate residue unit, an isobutyl 4-carboxy-α-cyanocinnamate residue unit, an isobutyl 2,3-dicarboxy-α-cyanocinnamate residue unit, an isobutyl 3,4-dicarboxy-α-cyanocinnamate residue unit, an isobutyl 2-carboxy-3-hydroxy-α-cyanocinnamate residue unit, an isobutyl 3-carboxy-2-hydroxy-α-cyanocinnamate residue unit, an isobutyl 3-carboxy-4-hydroxy-α-cyanocinnamate residue unit, an isobutyl 4-carboxy-3-hydroxy-α-cyanocinnamate residue unit, an isobutyl 2-carboxy-4-hydroxy-α-cyanocinnamate residue unit, an isobutyl 4-carboxy-2-hydroxy-α-cyanocinnamate residue unit, an isobutyl 2-cyano-α-cyanocinnamate residue unit, an isobutyl 3-cyano-α-cyanocinnamate residue unit, an isobutyl 4-cyano-α-cyanocinnamate residue unit, an isobutyl 2-nitro-α-cyanocinnamate residue unit, an isobutyl 3-nitro-α-cyanocinnamate residue unit, an isobutyl 4-nitro-α-cyanocinnamate residue unit, an isobutyl 2-methoxy-α-cyanocinnamate residue unit, an isobutyl 3-methoxy-α-cyanocinnamate residue unit, an isobutyl 4-methoxy-α-cyanocinnamate residue unit, an isobutyl 2-ethoxy-α-cyanocinnamate residue unit, an isobutyl 3-ethoxy-α-cyanocinnamate residue unit, an isobutyl 4-ethoxy-α-cyanocinnamate residue unit, an isobutyl 2-dimethylamino-α-cyanocinnamate residue unit, an isobutyl 3-dimethylamino-α-cyanocinnamate residue unit, an isobutyl 4-dimethylamino-α-cyanocinnamate residue unit, an isobutyl 2-diethylamino-α-cyanocinnamate residue unit, an isobutyl 3-diethylamino-α-cyanocinnamate residue unit, an isobutyl 4-diethylamino-α-cyanocinnamate residue unit, a benzalmalononitrile residue unit, a 2-methylbenzalmalononitrile residue unit, a 3-methylbenzalmalononitrile residue unit, a 4-methylbenzalmalononitrile residue unit, a 2-ethylbenzalmalononitrile residue unit, a 3-ethylbenzalmalononitrile residue unit, a 4-ethylbenzalmalononitrile residue unit, a 2-fluorobenzalmalononitrile residue unit, a 3-fluorobenzaalononitrile residue unit, a 4-fluorobenzalmalononitrile residue unit, a 2-chlorobenzalmalononitrile residue unit, a 3-chlorobenzalmalononitrile residue unit, a 4-chlorobenzalmalononitrile residue unit, a 2-bromobenzalmalononitrile residue unit, a 3-bromobenzalmalononitrile residue unit, a 4-bromobenzalmalononitrile residue unit, a 2-hydroxybenzalmalononitrile residue units, a 3-hydroxybenzalmalononitrile residue units, a 4-hydroxybenzalmalononitrile residue units, a 2,3-dihydroxybenzalmalononitrile residue unit, a 3,4-dihydroxybenzalmalononitrile residue unit, a 2-carboxybenzalmalononitrile residue unit, a 3-carboxybenzalmalononitrile residue unit, a 4-carboxybenzalmalononitrile residue unit, a 2,3-dicarboxybenzalmalononitrile residue unit, a 3,4-dicarboxybenzalmalononitrile residue unit, a 2-carboxy-3-hydroxy-benzalmalononitrile residue unit, a 3-carboxy-2-hydroxy-benzalmalononitrile residue unit, a 3-carboxy-4-hydroxy-benzalmalononitrile residue unit, a 4-carboxy-3-hydroxy-benzalmalononitrile residue unit, a 2-carboxy-4-hydroxy-benzalmalononitrile residue unit, a 4-carboxy-2-hydroxy-benzalmalononitrile residue unit a 2-cyanobenzalmalononitrile residue unit, a 3-cyanobenzalmalononitrile residue unit, a 4-cyanobenzalmalononitrile residue unit, a 2-nitrobenzalmalononitrile residue unit, a 3-nitrobenzalmalononitrile residue unit, a 4-nitrobenzalmalononitrile residue unit, a 2-methoxybenzalmalononitrile residue unit, a 3-methoxybenzalmalononitrile residue unit, a 4-methoxybenzalmalononitrile residue unit, a 2-ethoxybenzalmalononitrile residue unit, a 3-ethoxybenzalmalononitrile residue unit, a 4-ethoxybenzalmalononitrile residue unit, a 2-dimethylaminobenzalmalononitrile residue unit, a 3-dimethylaminobenzalmalononitrile residue unit, a 4-dimethylaminobenzalmalononitrile residue unit, a 2-diethylaminobenzalmalononitrile residue unit, a 3-diethylaminobenzalmalononitrile residue unit, a 4-diethylaminobenzalmalononitrile residue unit, a cinnamonitrile residue unit, a 2-methylcinnamonitrile residue unit, a 3-methylcinnamonitrile residue unit, a 4-methylcinnamonitrile residue unit, a 2-ethylcinnamonitrile residue unit, a 3-ethylcinnamonitrile residue unit, a 4-ethylcinnamonitrile residue unit, a 2-fluorocinnamonitrile residue unit, a 3-fluorocinnamonitrile residue unit, a 4-fluorocinnamonitrile residue unit, a 2-chlorocinnamonitrile residue unit, a 3-chlorocinnamonitrile residue unit, a 4-chlorocinnamonitrile residue unit, a 2-bromocinnamonitrile residue unit, a 3-bromocinnamonitrile residue unit, a 4-bromocinnamonitrile residue unit, a 2-hydroxycinnamonitrile residue unit, a 3-hydroxycinnamonitrile residue unit, a 4-hydroxycinnamonitrile residue unit, a 2-methoxycinnamonitrile residue unit, a 3-methoxycinnamonitrile residue unit, a 4-methoxycinnamonitrile residue unit, a 2-ethoxycinnamonitrile residue unit, a 3-ethoxycinnamonitrile residue unit, a 4-ethoxycinnamonitrile residue unit, a chalcone residue unit, a 2-methylchalcone residue unit, a 3-methylchalcone residue unit, a 4-methylchalcone residue unit, a 2-ethylchalcone residue unit, a 3-ethylchalcone residue unit, a 4-ethylchalcone residue unit, a 2-hydroxychalcone residue unit, a 3-hydroxychalcone residue unit, a 4-hydroxychalcone residue unit, a 2-methoxychalcone residue unit, a 3-methoxychalcone residue unit, a 4-methoxychalcone residue unit, a 2-ethoxychalcone residue unit, a 3-ethoxychalcone residue unit, a 4-ethoxychalcone residue unit, a dimethyl benzylidenemalonate residue unit, a diethyl benzylidenemalonate residue unit, a di-n-propyl benzylidenemalonate residue unit, a diisopropyl benzylidenemalonate residue unit, an N,N-dimethylcinnamamide residue unit, an N,N-diethylcinnamamide residue unit, an N,N-di-n-propylcinnamamide residue unit, an N,N-diisopropylcinnamamide residue unit, and the like. In the present invention, the residue unit A represented by the general formula (1) may be contained singly or two or more thereof may be contained.

Of these, since high retardation is expressed, preferred are α-cyanocinnamate ester residue units such as a methyl α-cyanocinnamate residue unit, an ethyl α-cyanocinnamate residue unit, an n-propyl α-cyanocinnamate residue unit, and an isopropyl α-cyanocinnamate residue unit; hydroxy-α-cyanocinnamate ester residue units such as a methyl 4-hydroxy-α-cyanocinnamate residue unit, an ethyl 4-hydroxy-α-cyanocinnamate residue unit, a methyl 2,3-dihydroxy-α-cyanocinnamate residue unit, and an ethyl 2,3-dihydroxy-α-cyanocinnamate residue unit; carboxy-α-cyanocinnamate ester residue units such as a methyl 4-carboxy-α-cyanocinnamate residue unit, an ethyl 4-carboxy-α-cyanocinnamate residue unit, a methyl 2,3-dicarboxy-α-cyanocinnamate residue unit, and an ethyl 2,3-dicarboxy-α-cyanocinnamate residue unit; carboxy-hydroxy-α-cyanocinnamate ester residue units such as a methyl 2-carboxy-3-hydroxy-α-cyanocinnamate residue unit and an ethyl 2-carboxy-3-hydroxy-α-cyanocinnamate residue unit; a benzalmalononitrile residue unit; a nitrobenzalmalononitrile residue unit; hydroxybenzalmalononitrile residue units such as a 4-hydroxybenzalmalononitrile residue unit and a 2,3-dihydroxybenzalmalononitrile residue unit; carboxybenzalmalononitrile residue units such as a 4-carboxybenzalmalononitrile residue unit and a 2,3-dicarboxybenzalmalononitrile residue unit; carboxy-hydroxybenzalmalononitrile residue units such as a 2-carboxy-3-hydroxybenzalmalononitrile residue unit; cinnamonitrile residue units; a chalcone residue unit; alkoxychalcone residue units such as a 2-methoxychalcone residue unit, a 3-methoxychalcone residue unit, a 4-methoxychalcone residue unit, a 2-ethoxychalcone residue unit, a 3-ethoxychalcone residue unit, and a 4-ethoxychalcone residue unit;

benzylidenemalonate diester residue units such as a dimethyl benzylidenemalonate residue unit, a diethyl benzylidenemalonate residue unit, a di-n-propyl benzylidenemalonate residue unit, and a diisopropyl benzylidenemalonate residue unit; an N,N-dimethylcinnamamide residue unit, an N,N-diethylcinnamamide residue unit, an N,N-di-n-propylcinnamamide residue unit, and an N,N-diisopropylcinnamamide residue unit. More preferred are α-cyanocinnamate ester residue units such as a methyl α-cyanocinnamate residue unit, an ethyl α-cyanocinnamate residue unit, an n-propyl α-cyanocinnamate residue unit, and an isopropyl α-cyanocinnamate residue unit; and a benzalmalononitrile residue unit.

$R_8$ in the general formula (2) of the present invention represents an m-membered heterocyclic residue containing one or more heteroatoms or a 5-membered or 6-membered ring residue containing no heteroatom (provided that, when $R_8$ is a 6-membered ring residue containing no heteroatom, at least one of $R_3$ to $R_7$ in the general formula (1) represents a hydroxy group), and m represents an integer of 5 to 10. The m-membered heterocyclic residue, the 5-membered ring residue, and the 6-membered ring residue may form a fused ring structure together with another ring structure. Since higher retardation is expressed, $R_8$ in the general formula (2) of the present invention is preferably a 5-membered heterocyclic residue or a 6-membered heterocyclic residue containing one or more heteroatoms, and is more preferably a 5-membered heterocyclic residue or a 6-membered heterocyclic residue containing one or more nitrogen atoms or oxygen atoms. Here, the heteroatom includes when $R_8$ in the general formula (2) of the present invention is the m-membered heterocyclic residue, for example, a nitrogen atom, an oxygen atom, a sulfur atom, and the like. In addition, when $R_8$ is a 6-membered ring residue containing no heteroatom, a copolymer in which any one or more of $R_3$ to $R_7$ in the general formula (1) is a hydroxy group exerts the effect of the present invention and is included in the present invention.

Specific examples of the residue unit B represented by the general formula (2) include a 1-vinylpyrrole residue unit, a 2-vinylpyrrole residue unit, a 1-vinylindole residue unit, a 9-vinylcarbazole residue unit, a 2-vinylquinoline residue unit, a 4-vinylquinoline residue unit, a 1-vinylisoquinoline residue unit, a 2-vinylpyridine residue unit, a 3-vinylpyridine residue unit, a 4-vinylpyridine residue unit, a 1-vinylimidazole residue unit, a 2-vinylimidazole residue unit, a 4-vinylimidazole residue unit, a 5-vinyl-2-pyrazoline residue unit, a 2-vinylpyrazine residue unit, a vinyl-s-triazine residue unit, a 10-vinyl-9-hydroacridine residue unit, a 1-vinyltetrazole residue unit, a 5-vinyltetrazole residue unit, an N-vinylpyrrolidone residue unit, an N-vinyl-s-caprolactam residue unit, an N-vinylsuccinimide residue unit, an N-vinylphthalimide residue unit, an N-vinylsaccharin residue unit, a 2-vinylfuran residue unit, a 3-vinylfuran residue unit, a 2-vinylbenzofuran residue unit, a 2-vinylthiophene residue unit, a 3-vinylthiophene residue unit, a 2-vinylbenzothiophene residue unit, a 2-vinylbenzoxazole residue unit, an N-vinyloxazolidone residue unit, a 2-vinylthiazole residue unit, a 2-vinylbenzothiazole residue unit, a styrene residue unit, a 2-vinylnaphthalene residue unit, etc., and substituent-added products thereof. In the present invention, the residue unit B represented by the general formula (2) may be contained singly or two or more thereof may be contained.

Of these, since high retardation is expressed, preferred are a 1-vinylpyrrole residue unit, a 2-vinylpyrrole residue unit, a 1-vinylindole residue unit, a 9-vinylcarbazole residue unit, a 2-vinylquinoline residue unit, a 4-vinylquinoline residue unit, an N-vinylphthalimide residue unit, an N-vinylsuccinimide residue unit, a 2-vinylfuran residue unit, a 2-vinylbenzofuran residue unit, a styrene residue unit, and a 2-vinylnaphthalene residue unit. More preferred are a 9-vinylcarbazole residue unit and an N-vinylphthalimide residue unit.

The copolymer of the present invention is not particularly limited as long as it contains the residue unit A represented by the general formula (1) and the residue unit B represented by the general formula (2). However, since a film excellent in retardation is easily obtained when formed into a thin film, preferred are an α-cyanocinnamate ester-1-vinylpyrrole copolymer, an α-cyanocinnamate ester-2-vinylpyrrole copolymer, an α-cyanocinnamate ester-1-vinylindole copolymer, an α-cyanocinnamate ester-9-vinylcarbazole copolymer, an α-cyanocinnamate ester-2-vinylquinoline copolymer, an α-cyanocinnamate ester-4-vinylquinoline copolymer, an α-cyanocinnamate ester-N-vinylphthalimide copolymer, an α-cyanocinnamate ester-N-vinylsuccinimide copolymer, an α-cyanocinnamate ester-2-vinylfuran copolymer, an α-cyanocinnamate ester-2-vinylbenzofuran copolymer, a 4-hydroxy-α-cyanocinnamate ester-styrene copolymer, a 4-hydroxy-α-cyanocinnamate ester-2-vinylnaphthalene copolymer, a 4-hydroxy-α-cyanocinnamate ester-1-vinylindole copolymer, a 4-hydroxy-α-cyanocinnamate ester-9-vinylcarbazole copolymer, a 4-hydroxy-α-cyanocinnamate ester-N-vinylsuccinimide copolymer, a 4-hydroxy-α-cyanocinnamate ester-N-vinylphthalimide copolymer, a 4-hydroxy-αx-cyanocinnamate ester-2-vinylfuran copolymer, a 4-hydroxy-α-cyanocinnamate ester-2-vinylbenzofuran copolymer, a 2,3-dihydroxy-α-cyanocinnamate ester-styrene copolymer, a 2,3-dihydroxy-α-cyanocinnamate ester-2-vinylnaphthalene copolymer, a 2,3-dihydroxy-α-cyanocinnamate ester-1-vinylindole copolymer, a 2,3-dihydroxy-α-cyanocinnamate ester-9-vinylcarbazole copolymer, a 2,3-dihydroxy-α-cyanocinnamate ester-N-vinylsuccinimide copolymer, a 2,3-dihydroxy-α-cyanocinnamate ester-N-vinylphthalimide copolymer, a 2,3-dihydroxy-α-cyanocinnamate ester-2-vinylfuran copolymer, a 2,3-dihydroxy-α-cyanocinnamate ester-2-vinylbenzofuran copolymer, a 2,4-dihydroxy-α-cyanocinnamate ester-styrene copolymer, a 2,4-dihydroxy-α-cyanocinnamate ester-2-vinylnaphthalene copolymer, a 2,4-dihydroxy-α-cyanocinnamate ester-1-vinylindole copolymer, a 2,4-dihydroxy-α-cyanocinnamate-9-vinylcarbazole copolymer, a 2,4-dihydroxy-α-cyanocinnamate-N-vinylsuccinimide copolymer, a 2,4-dihydroxy-α-cyanocinnamate-N-vinylphthalimide copolymer, a 2,4-dihydroxy-α-cyanocinnamate ester-2-vinylfuran copolymer, a 2,4-dihydroxy-α-cyanocinnamate ester-2-vinylbenzofuran copolymer, a 3,4-dihydroxy-α-cyanocinnamate-styrene copolymer, a 3,4-dihydroxy-α-cyanocinnamate ester-2-vinylnaphthalene copolymer, a 3,4-dihydroxy-α-cyanocinnamate ester-1-vinylindole copolymer, a 3,4-dihydroxy-α-cyanocinnamate ester-9-vinylcarbazole copolymer, a 3,4-dihydroxy-α-cyanocinnamate ester-N-vinylsuccinimide copolymer, a 3,4-dihydroxy-α-cyanocinnamate ester-N-vinylphthalimide copolymer, a 3,4-dihydroxy-α-cyanocinnamate ester-2-vinylfuran copolymer, a 3,4-dihydroxy-α-cyanocinnamate ester-2-vinylbenzofuran copolymer, a 4-carboxy-α-cyanocinnamate ester-1-vinylindole copolymer, a 4-carboxy-α-cyanocinnamate ester-9-vinylcarbazole copolymer, a 4-carboxy-α-cyanocinnamate ester-N-vinylsuccinimide copolymer, a 4-carboxy-α-cyanocinnamate ester-N-vinylphthalimide copolymer, a 4-carboxy-α-cyanocinnamate ester-2-vinylfuran copolymer, a 4-carboxy-α-cyanocinnamate ester-2-vinylbenzofuran copolymer, a 2,3- dicarboxy-α-cyanocinnamate ester-1-vinylindole copolymer, a 2,3-dicarboxy-α-cyanocimiamate-9-vinylcarbazole copolymer, a 2,3-dicarboxy-α-cyanocinnamate-N-vinyl succinimide copolymer, a 2,3-dicarboxy-α-cyanocinnamate ester-N-vinylphthalimide copolymer, a 2,3-dicarboxy-α-cyanocinnamate ester-2-vinylfuran copolymer, a 2,3-dicarboxy-α-cyanocinnamate ester-2-vinylbenzofuran copolymer, a 2,4-dicarboxy-α-cyanocinnamate ester-1-vinylindole copolymer, a 2,4-dicarboxy-α-cyanocinnamate ester-9-vinylcarbazole copolymer, a 2,4-dicarboxy-α-cyanocinnamate ester-N-vinylsuccinimide copolymer, a 2,4-dicarboxy-α-cyanocinnamate ester-N-vinylphthalimide copolymer, a 2,4-dicarboxy-α-cyanocinnamate ester-2-vinylfuran copolymer, a 2,4-dicarboxy-α-cyanocinnamate ester-2-vinylbenzofuran copolymer, a 3,4-dicarboxy-α-cyanocinnamate ester-1-vinylindole copolymer, a 3,4-dicarboxy-α-cyanocinnamate-9-vinylcarbazole copolymer, a 3,4-dicarboxy-α-cyanocinnamate-N-vinylsuccinimide copolymer, a 3,4-dicarboxy-α-cyanocinnamate ester-N-vinylphthalimide copolymer, a 3,4-dicarboxy-α-cyanocinnamate ester-2-vinylfuran copolymer, a 3,4-dicarboxy-α-cyanocinnamate ester-2-vinylbenzofuran copolymer, a benzalmalononitrile-1-vinylpyrrole copolymer, a benzalmalononitrile-2-vinylpyrrole copolymer, a benzalmalononitrile-1-vinylindole copolymer, a benzalmalononitrile-9-vinylcarbazole copolymer, a benzalmalononitrile-2-vinylquinoline copolymer, a benzalmalononitrile-4-vinylquinoline copolymer, a benzalmalononitrile-N-vinylphthalimide copolymer, a benzalmalononitrile-N-vinylsuccinimide copolymer, a benzalmalononitrile-2-vinylfuran copolymer, a benzalmalononitrile-2-vinylbenzofuran copolymer, a 4-nitrobenzalmalononitrile-1-vinylpyrrole copolymer, a 4-nitrobenzalmalononitrile-2-vinylpyrrole copolymer, a 4-nitrobenzalmalononitrile-1-vinylindole copolymer, a 4-nitrobenzalmalononitrile-9-vinylcarbazole copolymer, a 4-nitrobenzalmalononitrile-2-vinylquinoline copolymer, a 4-nitrobenzalmalononitrile-4-vinylquinoline copolymer, a 4-nitrobenzalmalononitrile-N-vinylphthalimide copolymer, a 4-nitrobenzalmalononitrile-N-vinylsuccinimide copolymer, a 4-nitrobenzalmalononitrile-2-vinylfuran copolymer, a 4-nitrobenzalmalononitrile-2-vinylbenzofuran copolymer, a 4-hydroxybenzalmalononitrile-styrene copolymer, a 4-hydroxybenzalmalononitrile-2-vinylnaphthalene copolymer, a 4-hydroxybenzalmalononitrile-1-vinylindole copolymer, a 4-hydroxybenzalmalononitrile-9-vinylcarbazole copolymer, a 4-hydroxybenzalmalononitrile-N-vinylsuccinimide copolymer, a 4-hydroxybenzalmalononitrile-N-vinylphthalimide copolymer, a 4-hydroxybenzalmalononitrile-2-vinylfuran copolymer, a 4-hydroxybenzalmalononitrile-2-vinylbenzofuran copolymer, a 2,3-dihydroxybenzalmalononitrile-styrene copolymer, a 2,3-dihydroxybenzalmalononitrile-2-vinylnaphthalene copolymer, a 2,3-dihydroxybenzalmalononitrile-1-vinylindole copolymer, a 2,3-dihydroxybenzalmalononitrile-9-vinylcarbazole copolymer, a 2,3-dihydroxybenzalmalononitrile-N-vinylsuccinimide copolymer, a 2,3-dihydroxybenzalmalononitrile-N-vinylphthalimide copolymer, a 2,3-dihydroxybenzalmalononitrile-2-vinylfuran copolymer, a 2,3-dihydroxybenzalmalononitrile-2-vinylbenzofuran copolymer, a 2,4-dihydroxybenzalmalononitrile-styrene copolymer, a 2,4-dihydroxybenzalmalononitrile-2-vinylnaphthalene copolymer, a 2,4-dihydroxybenzalmalononitrile-1-vinylindole copolymer, a 2,4-dihydroxybenzalmalononitrile-9-vinylcarbazole copolymer, a 2,4-dihydroxybenzalmalononitrile-N-vinylsuccinimide copolymer, a 2,4-dihydroxybenzalmalononitrile-N-vinylphthalimide copolymer, a 2,4-dihydroxybenzalmalononitrile-2-vinylfuran copolymer, a 2,4-dihydroxybenzalmalononitrile-2-vinylbenzofuran copolymer, a 3,4-dihydroxybenzalmalononitrile-styrene copolymer, a 3,4-dihydroxybenzalmalononitrile-2-vinylnaphthalene copolymer, a 3,4-dihydroxybenzalmalononitrile-1-vinylindole copolymer, a 3,4-Dihydroxybenzalmalononitrile-9-vinylcarbazole copolymer, a 3,4-dihydroxybenzalmalononitrile-N-vinylsuccinimide copolymer, a 3,4-dihydroxybenzalmalononitrile-N-vinylphthalimide copolymer, a 3,4-dihydroxybenzalmalononitrile-2-vinylfuran copolymer, a 3,4-dihydroxybenzalmalononitrile-2-vinylbenzofuran copolymer, a 4-carboxybenzalmalononitrile-1-vinylindole copolymer, a 4-carboxybenzalmalononitrile-9-vinylcarbazole copolymer, a 4-carboxybenzalmalononitrile-N-vinylsuccinimide copolymer, a 4-carboxybenzalmalononitrile-N-vinylphthalimide copolymer, a 4-carboxybenzalmalononitrile-2-vinyl furan copolymer, a 4-carboxybenzalmalononitrile-2-vinylbenzofuran copolymer, a 2,3-dicarboxybenzalmalononitrile-1-vinylindole copolymer, a 2,3-dicarboxy benzalmalononitrile-9-vinylcarbazole copolymer, a 2,3-a dicarboxybenzalmalononitrile-N-vinyl succinimide copolymer, a 2,3-dicarboxybenzalmalononitrile-N-vinylphthalimide copolymer, a 2,3-dicarboxybenzalmalonitrile-2-vinylfuran copolymer, a 2,3-dicarboxybenzalmalononitrile-2-vinylbenzofuran copolymer, a 2,4-dicarboxybenzalmalononitrile-1-vinylindole copolymer, a 2,4-dicarboxybenzalmalononitrile-9-vinylcarbazole copolymer, a 2,4-dicarboxybenzalmalononitrile-N-vinylsuccinimide copolymer, a 2,4-dicarboxybenzalmalononitrile-N-vinylphthalimide copolymer, a 2,4-dicarboxybenzalmalononitrile-2-vinylfuran copolymer, a 2,4-dicarboxybenzalmalononitrile-2-vinylbenzofuran copolymer, a 3,4-dicarboxybenzalmalononitrile-1-vinylindole copolymer, a 3,4-dicarboxybenzalmalononitrile-9-vinylcarbazole copolymer, a 3,4-dicarboxybenzalmalononitrile-N-vinylsuccinimide copolymer, a 3,4-dicarboxybenzalmalononitrile-N-vinylphthalimide copolymer, a 3,4-dicarboxybenzalmalononitrile-2-vinylfuran copolymer, a 3,4-dicarboxybenzalmalononitrile-2-vinylbenzofuran copolymer, a 4-carboxy-3-hydroxy-benzalmalononitrile-styrene copolymer, a 4-carboxy-3-hydroxy-benzalmalononitrile-2-vinylnaphthalene copolymer, a 4-carboxy-3-hydroxy-benzalmalononitrile-1-vinylindole copolymer, a 4-carboxy-3-hydroxy-benzalmalononitrile-9-vinylcarbazole copolymer, a 4-carboxy-3-hydroxy-benzalmalononitrile-N-vinylsuccinimide copolymer, a 4-carboxy-3-hydroxy-benzalmalononitrile-N-vinylphthalimide copolymer, a 4-carboxy-3-hydroxy-benzalmalononitrile-2-vinylfuran copolymer, a 4-carboxy-3-hydroxy-benzalmalononitrile-2-vinylbenzofuran copolymer, a cinnamonitrile-1-vinylpyrrole copolymer, a cinnamonitrile-2-vinylpyrrole copolymer, a cinnamonitrile-1-vinylindole copolymer, a cinnamonitrile-9-vinylcarbazole copolymer, a cinnamonitrile-2-vinylquinoline copolymer, a cinnamonitrile-4-vinylquinoline copolymer, a cinnamonitrile-N-vinylphthalimide copolymer, a cinnamonitrile-N-vinylsuccinimide copolymer, a cinnamonitrile-2-vinylfuran copolymer, a cinnamonitrile-2-vinylbenzofuran copolymer, a chalcone-1-vinylpyrrole copolymer, a chalcone-2-vinylpyrrole copolymer, a chalcone-1-vinylindole copolymer, a chalcone-9-vinylcarbazole copolymer, a chalcone-2-vinylquinoline copolymer, a chalcone-4-vinylquinoline copolymer, a chalcone-N-vinylphthalimide copolymer, a chalcone-N-vinylsuccinimide copolymer, a chalcone-2-vinylfuran copolymer, a chalcone 2-vinylbenzofuran copolymer, a 4-methoxychalcone-1-vinylpyrrole copolymer, a 4-methoxychalcone-2-vinylpyrrole copolymer, a 4-methoxychalcone-1-vinylindole copolymer, a 4-methoxychalcone-9-vinylcarbazole copolymer, a 4-methoxychalcone-2-vinylquinoline copolymer, a 4-methoxychalcone-4-vinylquinoline copolymer, a 4-methoxychalcone-N-vinylphthalimide copolymer, a 4-methoxychalcone-N-vinylsuccinimide copolymer, a 4-methoxychalcone-2-vinylfuran copolymer, a 4-methoxychalcone-2-vinylbenzofuran copolymer, a 4-ethoxychalcone-1-vinylpyrrole copolymer, a 4-ethoxychalcone-2-vinylpyrrole copolymer, a 4-ethoxychalcone-1-vinylindole copolymer, a 4-ethoxychalcone-9-vinylcarbazole copolymer, a 4-ethoxychalcone-2-vinylquinoline copolymer, a 4-ethoxychalcone-4-vinylquinoline copolymer, a 4-ethoxychalcone-N-vinylphthalimide copolymer, a 4-ethoxychalcone-N-vinylsuccinimide copolymer, a 4-ethoxychalcone-2-vinylfuran copolymer, a 4-ethoxychalcone-2-vinylbenzofuran copolymer, a dimethyl benzylidenemalonate-1-vinylpyrrole copolymer, a dimethyl benzylidenemalonate-2-vinylpyrrole copolymer, a dimethyl benzylidenemalonate-1-vinylindole copolymer, a dimethyl benzylidenemalonate-9-vinylcarbazole copolymer, a dimethyl benzylidenemalonate-2-vinylquinoline copolymer, a dimethyl benzylidenemalonate-4-vinylquinoline copolymer, a dimethyl benzylidenemalonate-N-vinylphthalimide copolymer, a dimethyl benzylidenemalonate-N-vinylsuccinimide copolymer, a dimethyl benzylidenemalonate-2-vinylfuran copolymer, a dimethyl benzylidenemalonate-2-vinylbenzofuran copolymer, a diethyl benzylidenemalonate-1-vinylpyrrole copolymer, a diethyl benzylidenemalonate-2-vinylpyrrole copolymer, a diethyl benzylidenemalonate-1-vinylindole copolymer, a diethyl benzylidenemalonate-9-vinylcarbazole copolymer, a diethyl benzylidenemalonate 2-vinylquinoline copolymer, a diethyl benzylidenemalonate-4-vinylquinoline copolymer, a diethyl benzylidenemalonate-N-vinylphthalimide copolymer, a diethyl benzylidenemalonate-N-vinylsuccinimide copolymer, a diethyl benzylidenemalonate-2-vinylfuran copolymer, a diethyl benzylidenemalonate-2-vinylbenzofuran copolymer, an N,N-dimethylcinnamamide-1-vinylpyrrole copolymer, an N,N-dimethylcinnamamide-2-vinylpyrrole copolymer, an N,N-dimethylcinnamamide-1-vinylindole copolymer, an N,N-dimethylcinnamamide-9-vinylcarbazole copolymer, an N,N-dimethylcinnamamide-2-vinylquinoline copolymer, an N,N-dimethylcinnamamide-4-vinylquinoline copolymer, an N,N-dimethylcinnamamide-N-vinylphthalimide copolymer, an N,N-dimethylcinnamamide-N-vinylsuccinimide copolymer, an N,N-dimethylcinnamamide-2-vinylfuran copolymer, an N,N-dimethylcinnamamide-2-vinylbenzofuran copolymer, an N,N-diethylcinnamamide-1-vinylpyrrole copolymer, an N,N-diethylcinnamamide-2-vinylpyrrole copolymer, an N,N-diethylcinnamamide-1-vinylindole copolymer, an N,N-diethylcinnamamide-9-vinylcarbazole copolymer, an N,N-diethylcinnamamide-2-vinylquinoline copolymer, an N,N-diethylcinnamamide-4-vinylquinoline copolymer, an N,N-diethylcinnamamide-N-vinylphthalimide copolymer, an N,N-diethylcinnamamide-N-vinylsuccinimide copolymer, an N,N-diethylcinnamamide-2-vinylfuran copolymer, and an N,N-diethylcinnamamide-2-vinylbenzofuran copolymer.

Further, when any one or more of $R_3$ to $R_7$ in the general formula (1) is a hydroxy group, the copolymer of the present invention becomes suitable for expressing good compatibility and facilitating composite formation with a different polymer.

In addition, for exhibiting good optical characteristics, it is preferred that the copolymer of the present invention contains the residue unit A represented by the general formula (1) and further the residue unit B is a residue unit represented by the general formula (3) and/or the general formula (4).

[Chem 8]

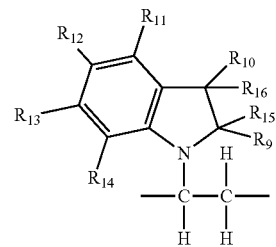

(3)

wherein $R_9$ to $R_{16}$ each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group ($—OX_{13}$), an ester group ($—C(=O)OX_{14}$ or $—CO(=O)—X_{15}$), an amide group ($—C(=O)N(X_{16})(X_{17})$ or $—NX_{18}C(=O)X_{19}$), an acyl group ($—C(=O)X_{20}$), or an amino group ($—N(X_{21})(X_{22})$) (where $X_{13}$ to $X_{15}$ each independently represent a linear alkyl group having 1 to 12 carbon atoms, a branched alkyl group having 1 to 12 carbon atoms, or a cyclic group having 3 to 14 carbon atoms, $X_{16}$ to $X_{22}$ each independently represent hydrogen, a linear alkyl group having 1 to 12 carbon atoms, a branched alkyl group having 1 to 12 carbon atoms, or a cyclic group having 3 to 14 carbon atoms); adjacent substituents among $R_9$ to $R_{16}$ may form a fused ring structure each other; and $R_9$ and $R_{15}$, and, $R_{10}$ and $R_{16}$ may consist of the same atoms and may form a ring structure,

[Chem 9]

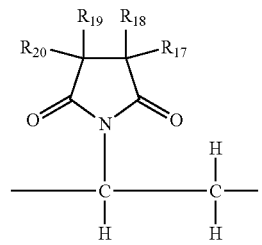

(4)

wherein $R_{17}$ to $R_{20}$ each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group ($—OX_{23}$), an ester group ($—C(=O)OX_{24}$ or $—CO(=O)—X_{25}$), an amide group ($—C(=O)N(X_{26})(X_{27})$ or $—NX_{28}C(=O)X_{29}$), an acyl group ($—C(=O)X_{30}$), or an amino group ($—N(X_{31})(X_{32})$) (where $X_{23}$ to $X_{25}$ each independently represent a linear alkyl group having 1 to 12 carbon atoms, a branched alkyl group having 1 to 12 carbon atoms, or a cyclic group having 3 to 14 carbon atoms, $X_{26}$ to $X_{32}$ each independently represent hydrogen, a linear alkyl group having 1 to 12 carbon atoms, a branched alkyl group having 1 to 12 carbon atoms, or a cyclic group having 3 to 14 carbon atoms); adjacent substituents among $R_{17}$ to $R_{20}$ may form a fused ring structure each other; and $R_{17}$ and $R_{18}$, and $R_{19}$ and $R_{20}$, may consist of the same atoms and may form a ring structure.

$R_9$ to $R_{16}$ in the general formula (3) in the present invention each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group (—$OX_{13}$), an ester group (—C(=O)$OX_{14}$ or —CO(=O)—$X_{15}$), an amide group (—C(=O)N($X_{16}$)($X_{17}$) or —$NX_{18}$C(=O)$X_{19}$), an acyl group (—C(=O)$X_{20}$), or an amino group (—N($X_{21}$)($X_{22}$)) (where $X_{13}$ to $X_{15}$ each independently represent a linear alkyl group having 1 to 12 carbon atoms, a branched alkyl group having 1 to 12 carbon atoms, or a cyclic group having 3 to 14 carbon atoms, $X_{16}$ to $X_{22}$ each independently represent hydrogen, a linear alkyl group having 1 to 12 carbon atoms, a branched alkyl group having 1 to 12 carbon atoms, or a cyclic group having 3 to 14 carbon atoms). Moreover, adjacent substituents among $R_9$ to $R_{16}$ may form a fused ring structure each other, and $R_9$ and $R_{15}$ and, $R_{10}$ and $R_{16}$ may consist of the same atoms and may form a ring structure.

Examples of the halogen in $R_9$ to $R_{16}$ include fluorine, chlorine, bromine, and the like, examples of the linear alkyl group having 1 to 12 carbon atoms include linear alkyl groups having 1 to 12 carbon atoms such as a methyl group, an ethyl group, a propyl group, a butyl group, a pentyl group, and a hexyl group, examples of the branched alkyl group having 1 to 12 carbon atoms include branched alkyl groups having 1 to 12 carbon atoms such as an isopropyl group, an isobutyl group, a sec-butyl group, and a tert-butyl group, and examples of the cyclic group having 3 to 14 carbon atoms include cyclic groups having 3 to 14 carbon atoms such as a cyclopropyl group, a cyclobutyl group, a cyclopentyl group, a cyclohexyl group, a phenyl group, a naphthyl group, an anthryl group, a furyl group, a pyranyl group, a pyrrolyl group, an imidazolyl group, a pyridyl group, an indolyl group, and a carbazolyl group. Specific examples of the alkoxy group include a methoxy group, an ethoxy group, and the like, specific examples of the ester groups include a methyloxycarbonyl group, an ethyloxycarbonyl group, an acetoxy group, and a propoxy group, and the like, specific examples of the amide group include a dimethylamide group, a diethylamide group, and the like, specific examples of the acyl group include an acetyl group, a propionyl group, a benzoyl group, and the like, and specific examples of the amino group include a dimethylamino group, a diethylamino group, and the like.

Examples of the linear alkyl group having 1 to 12 carbon atoms in $X_{13}$ to $X_{22}$ include a methyl group, an ethyl group, an n-propyl group, an n-butyl group, an n-pentyl group, an n-hexyl group, and the like, examples of the branched alkyl group having 1 to 12 carbon atoms include an isopropyl group, a sec-butyl group, a tert-butyl group, an isobutyl group, and the like, and examples of the cyclic group having 3 to 14 carbon atoms include a cyclopropyl group, a cyclobutyl group, a cyclohexyl group, a phenyl group, a naphthyl group, and the like.

Specific examples of the residue unit represented by the general formula (3) include indole residue units such as an N-vinylindole residue unit, an N-methyl-3-vinylindole residue unit, 9-vinylcarbazole residue units such as a 9-vinylcarbazole residue unit, 3-methyl-N-vinylcarbazole residue unit, 3-chloro-N-vinylcarbazole residue unit, and the like. Of these, for exhibiting higher negative retardation and higher compatibility with different polymers, 9-vinylcarbazole residue units are preferable, and a 9-vinylcarbazole residue unit is more preferable.

$R_{17}$ to $R_{20}$ in the general formula (4) in the present invention each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group (—$OX_{23}$), an ester group (—C(=O)$OX_{24}$ or —CO(=O)—$X_{25}$), an amide group (—C(=O)N($X_{26}$)($X_{27}$) or —$NX_{28}$C(=O)$X_{29}$), an acyl group (—C(=O)$X_{30}$), or an amino group (—N($X_{31}$)($X_{32}$)) (where $X_{23}$ to $X_{25}$ each independently represent a linear alkyl group having 1 to 12 carbon atoms, a branched alkyl group having 1 to 12 carbon atoms, or a cyclic group having 3 to 14 carbon atoms, $X_{26}$ to $X_{32}$ each independently represent hydrogen, a linear alkyl group having 1 to 12 carbon atoms, a branched alkyl group having 1 to 12 carbon atoms, or a cyclic group having 3 to 14 carbon atoms). Moreover, adjacent substituents among $R_{17}$ to $R_{20}$ may form a fused ring structure each other, and $R_{17}$ and $R_{18}$, and, $R_{19}$ and $R_{20}$ may consist of the same atoms and may form a ring structure.

Examples of the halogen in $R_{17}$ to $R_{20}$ include fluorine, chlorine, bromine, and the like, examples of the linear alkyl group having 1 to 12 carbon atoms include linear alkyl groups having 1 to 12 carbon atoms such as a methyl group, an ethyl group, a propyl group, a butyl group, a pentyl group, and a hexyl group, examples of the branched alkyl group having 1 to 12 carbon atoms include branched alkyl groups having 1 to 12 carbon atoms such as an isopropyl group, an isobutyl group, a sec-butyl group, and a tert-butyl group, and examples of the cyclic group having 3 to 14 carbon atoms include cyclic groups having 3 to 14 carbon atoms such as a cyclopropyl group, a cyclobutyl group, a cyclopentyl group, a cyclohexyl group, a phenyl group, a naphthyl group, an anthryl group, a furyl group, a pyranyl group, a pyrrolyl group, an imidazolyl group, a pyridyl group, an indolyl group, and a carbazolyl group. Specific examples of the alkoxy group include a methoxy group, an ethoxy group, and the like, specific examples of the ester groups include a methyloxycarbonyl group, an ethyloxycarbonyl group, an acetoxy group, and a propoxy group, and the like, specific examples of the amide group include a dimethylamide group, a diethylamide group, and the like, specific examples of the acyl group include an acetyl group, a propionyl group, a benzoyl group, and the like, and specific examples of the amino group include a dimethylamino group, a diethylamino group, and the like.

Examples of the linear alkyl group having 1 to 12 carbon atoms in $X_{23}$ to $X_{32}$ include a methyl group, an ethyl group, an n-propyl group, an n-butyl group, an n-pentyl group, an n-hexyl group, and the like, examples of the branched alkyl group having 1 to 12 carbon atoms include an isopropyl group, a sec-butyl group, a tert-butyl group, an isobutyl group, and the like, and examples of the cyclic group having 3 to 14 carbon atoms include a cyclopropyl group, a cyclobutyl group, a cyclohexyl group, a phenyl group, a naphthyl group, and the like.

Specific examples of the residue unit represented by the general formula (4) include N-vinylsuccinimide residue units such as an N-vinylsuccinimide residue unit, N-vinylphthalimide residue units such as an N-vinylphthalimide residue unit, a 4-methylphthalimide residue unit, a 4-chloromethylphthalimide residue unit, and a 4-nitrophthalimide residue unit, N-vinylnaphthalenedicarboximides residue units such as an N-vinyl-2,3-naphthalenedicarboximide residue unit and an N-vinyl-1,8-naphthalenedicarboximide residue unit. Of these, for exhibiting higher negative retardation and higher compatibility with different polymers, N-vinylphthalimide residue units are preferable, and an N-vinylphthalimide residue unit is more preferable.

The copolymer of the present invention may contain other monomer residue units unless it exceeds the scope of the present invention. Examples of the other monomer residue units include one or two or more selected from styrene residue units such as a styrene residue unit and an α-methylstyrene residue unit; (meth)acrylic acid residue units; (meth)acrylate ester residue units such as a methyl (meth)acrylate residue unit, ethyl (meth)acrylate residue unit, and a butyl (meth)acrylate residue unit; vinyl ester residue units such as a vinyl acetate residue unit and a vinyl propionate residue unit; acrylonitrile residue units; methacrylonitrile residue units; vinyl ether residue units such as a methyl vinyl ether residue unit, an ethyl vinyl ether residue unit, and a butyl vinyl ether residue unit; a diethyl fumarate residue unit, fumarate ester residue units; N-substituted maleimide residue units such as an N-methylmaleimide residue unit, an N-cyclohexylmaleimide residue unit, and an N-phenylmaleimide residue unit; olefin residue units such as an ethylene residue unit and a propylene residue unit; and the like.

With regard to the composition of the copolymer of the present invention, since retardation characteristics become excellent when formed into a retardation film, the molar ratio A/B of the residue unit A represented by the general formula (1) to the residue unit B represented by the general formula (2) is preferably 0.05 to 6, more preferably 0.1 to 3, particularly preferably 0.18 to 2, and most preferably 0.25 to 1.

Among the copolymers of the present invention, with regard to copolymers in which the residue unit B is a residue unit B other than the residue unit represented by the general formula (4), since mechanical properties become excellent, the number-average molecular weight in terms of standard polystyrene obtained from the elution curve measured by gel permeation chromatography (GPC) is preferably 3,000 to 500,000, more preferably 5,000 to 400,000 and particularly preferably 10,000 to 300,000. Among the copolymers of the present invention, with regard to copolymers having the residue unit B that is the residue unit represented by the general formula (4), since mechanical properties become excellent, the number-average molecular weight in terms of standard pullulan obtained from the elution curve measured by gel permeation chromatography (GPC) is preferably 3,000 to 500,000, more preferably 5,000 to 400,000 and particularly preferably 10,000 to 300,000.

The production method of the polymer of the present invention is not particularly limited but includes, for example, a production method of polymerization using a monomer represented by the general formula (5).

[Chem 10]

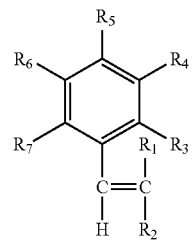

(5)

wherein R1 and R2 each independently represent hydrogen (provided that the case where R1 and R2 are both hydrogen is excluded), a cyano group, an ester group (—C(=O)OX1), an amide group (—C(=O)N(X2)(X3)), or an acyl group (—C(=O)X4) (where X1 to X3 each independently represent a linear alkyl group having 1 to 12 carbon atoms, a branched alkyl group having 1 to 12 carbon atoms, or a cyclic alkyl group having 3 to 6 carbon atoms, and X4 represents a linear alkyl group having 1 to 12 carbon atoms, a branched alkyl group having 1 to 12 carbon atoms, or a cyclic group having 3 to 14 carbon atoms); R3 to R7 each independently represent hydrogen, a linear alkyl group having 1 to 12 carbon atoms, a branched alkyl group having 1 to 12 carbon atoms, a cyclic group having 3 to 14 carbon atoms, a halogen, a hydroxy group, a carboxy group, a nitro group, a cyano group, an alkoxy group (—OX5), an ester group (—C(=O)OX6), an amide group (—C(=O)N(X7)(X8)), an acyl group (—C(=O)X9), an amino group (—N(X10)(X11)), or a sulfonic acid group (—SOOX12) (where X5 to X8 each independently represent a linear alkyl group having 1 to 12 carbon atoms, a branched alkyl group having 1 to 12 carbon atoms, or a cyclic alkyl group having 3 to 6 carbon atoms, X9 to X12 each independently represent hydrogen, a linear alkyl group having 1 to 12 carbon atoms, a branched alkyl group having 1 to 12 carbon atoms, or a cyclic alkyl group having 3 to 6 carbon atoms). Moreover, adjacent substituents among R3 to R7 may form a fused ring structure each other.

Specific examples of the monomer in the general formula (5) of the present invention include methyl α-cyanocinnamate, methyl 2-methyl-α-cyanocinnamate, methyl 3-methyl-α-cyanocinnamate, methyl 4-methyl-α-cyanocinnamate, methyl 2-ethyl-α-cyanocinnamate, methyl 3-ethyl-α-cyanocinnamate, methyl 4-ethyl-α-cyanocinnamate, methyl 2-fluoro-α-cyanocinnamate, methyl 3-fluoro-α-cyanocinnamate, methyl 4-fluoro-α-cyanocinnamate, methyl 2-chloro-α-cyanocinnamate, methyl 3-chloro-α-cyanocinnamate, methyl 4-chloro-α-cyanocinnamate, methyl 2-bromo-α-cyanocinnamate, methyl 3-bromo-α-cyanocinnamate, methyl 4-bromo-α-cyanocinnamate, methyl 2-hydroxy-α-cyanocinnamate, methyl 3-hydroxy-α-cyanocinnamate, methyl 4-hydroxy-α-cyanocinnamate, methyl 2,3-dihydroxy-α-cyanocinnamate, methyl 3,4-dihydroxy-α-cyanocinnamate, methyl 2-carboxy-α-cyanocinnamate, methyl 3-carboxy-α-cyanocinnamate, methyl 4-carboxy-α-cyanocinnamate, methyl 2,3-dicarboxy-α-cyanocinnamate, methyl 3,4-dicarboxy-α-cyanocinnamate, methyl 2-carboxy-3-hydroxy-α-cyanocinnamate, methyl 3-carboxy-2-hydroxy-α-cyanocinnamate, methyl 3-carboxy-4-hydroxy-α-cyanocinnamate, methyl 4-carboxy-3-hydroxy-α-cyanocinnamate, methyl 2-carboxy-4-hydroxy-α-cyanocinnamate, methyl 4-carboxy-2-hydroxy-α-cyanocinnamate, methyl 2-cyano-α-cyanocinnamate, methyl 3-cyano-α-cyanocinnamate, methyl 4-cyano-α-cyanocinnamate, methyl 2-nitro-α-cyanocinnamate, methyl 3-nitro-α-cyanocinnamate, methyl 4-nitro-α-cyanocinnamate, methyl 2-methoxy-α-cyanocinnamate, methyl 3-methoxy-α-cyanocinnamate, methyl 4-methoxy-α-cyanocinnamate, methyl 2-ethoxy-α-cyanocinnamate, methyl 3-ethoxy-α-cyanocinnamate, methyl 4-ethoxy-α-cyanocinnamate, methyl 2-dimethylamino-α-cyanocinnamate, methyl 3-dimethylamino-α-cyanocinnamate, methyl 4-dimethylamino-α-cyanocinnamate, methyl 2-diethylamino-α-cyanocinnamate, methyl 3-diethylamino-α-cyanocinnamate, methyl 4-diethylamino-α-cyanocinnamate, ethyl α-cyanocinnamate, ethyl 2-methyl-α-cyanocinnamate, ethyl 3-methyl-α-cyanocinnamate, ethyl 4-methyl-α-cyanocinnamate, ethyl 2-ethyl-α-cyanocinnamate, ethyl 3-ethyl-α-cyanocinnamate, ethyl 4-ethyl-α-cyanocinnamate residue, ethyl 2-fluoro-α-cyanocinnamate, ethyl 3-fluoro-α-cyanocinnamate, ethyl 4-fluoro-α-cyanocinnamate, ethyl 2-chloro-α-cyanocinnamate, ethyl 3-chloro-α-cyanocinnamate, ethyl 4-chloro-α-cyanocinnamate, ethyl 2-bromo-α-cyanocinnamate, ethyl 3-bromo-α-cyanocinnamate, ethyl 4-bromo-α-cyanocinnamate, ethyl 2-hydroxy-α-cyanocinnamate, ethyl 3-hydroxy-α-cyanocinnamate, ethyl 4-hydroxy-α-cyanocinnamate, ethyl 2,3-dihydroxy-α-cyanocinnamate, ethyl 3,4-dihydroxy-α-cyanocinnamate, ethyl 2-carboxy-α-cyanocinnamate, ethyl 3-carboxy-α-cyanocinnamate, ethyl 4-carboxy-α-cyanocinnamate, ethyl 2,3-dicarboxy-α-cyanocinnamate, ethyl 3,4-dicarboxy-α-cyanocinnamate, ethyl 2-carboxy-3-hydroxy-α-cyanocinnamate, ethyl 3-carboxy-2-hydroxy-α-cyanocinnamate, ethyl 3-carboxy-4-hydroxy-α-cyanocinnamate, ethyl 4-carboxy-3-hydroxy-α-cyanocinnamate, ethyl 2-carboxy-4-hydroxy-α-cyanocinnamate, ethyl 4-carboxy-2-hydroxy-α-cyanocinnamate, ethyl 2-cyano-α-cyanocinnamate, ethyl 3-cyano-α-cyanocinnamate, ethyl 4-cyano-α-cyanocinnamate, ethyl 2-nitro-α-cyanocinnamate, ethyl 3-nitro-α-cyanocinnamate, ethyl 4-nitro-α-cyanocinnamate, ethyl 2-methoxy-α-cyanocinnamate, ethyl 3-methoxy-α-cyanocinnamate, 4-methoxy-α-cyanocinnamate, ethyl 2-ethoxy-α-cyanocinnamate, ethyl 3-ethoxy-α-cyanocinnamate, ethyl 4-ethoxy-α-cyanocinnamate, ethyl 2-dimethylamino-α-cyanocinnamate, ethyl 3-dimethylamino-α-cyanocinnamate, ethyl 4-dimethylamino-α-cyanocinnamate, ethyl 2-diethylamino-α-cyanocinnamate, ethyl 3-diethylamino-α-cyanocinnamate, ethyl 4-di ethyl amino-α-cyanocinnamate, n-propyl α-cyanocinnamate, n-propyl 2-methyl-α-cyanocinnamate, n-propyl 3-methyl-α-cyanocinnamate, n-propyl 4-methyl-α-cyanocinnamate, n-propyl 2-ethyl-α-cyanocinnamate, n-propyl 3-ethyl-α-cyanocinnamate, n-propyl 4-ethyl-α-cyanocinnamate, n-propyl 2-fluoro-α-cyanocinnamate, n-propyl 3-fluoro-α-cyanocinnamate, n-propyl 4-fluoro-α-cyanocinnamate, n-propyl 2-chloro-α-cyanocinnamate, n-propyl 3-chloro-α-cyanocinnamate, n-propyl 4-chloro-α-cyanocinnamate, n-propyl 2-bromo-α-cyanocinnamate, n-propyl 3-bromo-α-cyanocinnamate, n-propyl 4-bromo-α-cyanocinnamate, n-propyl 2-hydroxy-α-cyanocinnamate, n-propyl 3-hydroxy-α-cyanocinnamate, n-propyl 4-hydroxy-α-cyanocinnamate, n-propyl 2,3-dihydroxy-α-cyanocinnamate, n-propyl 3,4-dihydroxy-α-cyanocinnamate, n-propyl 2-carboxy-α-cyanocinnamate, n-propyl 3-carboxy-α-cyanocinnamate, n-propyl 4-carboxy-α-cyanocinnamate, n-propyl 2,3-dicarboxy-α-cyanocinnamate, n-propyl 3,4-dicarboxy-α-cyanocinnamate, n-propyl 2-carboxy-3-hydroxy-α-cyanocinnamate, n-propyl 3-carboxy-2-hydroxy-α-cyanocinnamate, n-propyl 3-carboxy-4-hydroxy-α-cyanocinnamate, n-propyl 4-carb oxy-3-hydroxy-α-cyanocinnamate, n-propyl 2-carboxy-4-hydroxy-α-cyanocinnamate, n-propyl 4-carboxy-2-hydroxy-α-cyanocinnamate, n-propyl 2-cyano-α-cyanocinnamate, n-propyl 3-cyano-α-cyanocinnamate, n-propyl 4-cyano-α-cyanocinnamate, n-propyl 2-nitro-α-cyanocinnamate, n-propyl 3-nitro-α-cyanocinnamate, n-propyl 4-nitro-α-cyanocinnamate, n-propyl 2-methoxy-α-cyanocinnamate, n-propyl 3-methoxy-α-cyanocinnamate, n-propyl 4-methoxy-α-cyanocinnamate, n-propyl 2-ethoxy-α-cyanocinnamate, n-propyl 3-ethoxy-α-cyanocinnamate, n-propyl 4-ethoxy-α-cyanocinnamate, n-propyl 2-dimethylamino-α-cyanocinnamate, n-propyl 3-dimethylamino-α-cyanocinnamate, n-propyl 4-dimethylamino-α-cyanocinnamate, n-propyl 2-diethylamino-α-cyanocinnamate, n-propyl 3-diethylamino-α-cyanocinnamate, n-propyl 4-diethylamino-α-cyanocinnamate, isopropyl α-cyanocinnamate, isopropyl 2-methyl-α-cyanocinnamate, isopropyl 3-methyl-α-cyanocinnamate, isopropyl 4-methyl-α-cyanocinnamate, isopropyl 2-ethyl-α-cyanocinnamate, isopropyl 3-ethyl-α-cyanocinnamate, isopropyl 4-ethyl-α-cyanocinnamate, isopropyl 2-fluoro-α-cyanocinnamate, isopropyl 3-fluoro-α-cyanocinnamate, isopropyl 4-fluoro-α-cyanocinnamate, isopropyl 2-chloro-α-cyanocinnamate, isopropyl 3-chloro-α-cyanocinnamate, isopropyl 4-chloro-α-cyanocinnamate, isopropyl 2-bromo-α-cyanocinnamate, isopropyl 3-bromo-α-cyanocinnamate, isopropyl 4-bromo-α-cyanocinnamate, isopropyl 2-hydroxy-α-cyanocinnamate, isopropyl 3-hydroxy-α-cyanocinnamate, isopropyl 4-hydroxy-α-cyanocinnamate, isopropyl 2,3-dihydroxy-α-cyanocinnamate, isopropyl 3,4-dihydroxy-α-cyanocinnamate, isopropyl 2-carboxy-α-cyanocinnamate, isopropyl 3-carboxy-α-cyanocinnamate, isopropyl 4-carboxy-α-cyanocinnamate, isopropyl 2,3-dicarboxy-α-cyanocinnamate, isopropyl 3,4-dicarboxy-α-cyanocinnamate, isopropyl 2-carboxy-3-hydroxy-α-cyanocinnamate, isopropyl 3-carboxy-2-hydroxy-α-cyanocinnamate, isopropyl 3-carboxy-4-hydroxy-α-cyanocinnamate, isopropyl 4-carboxy-3-hydroxy-α-cyanocinnamate, isopropyl 2-carboxy-4-hydroxy-α-cyanocinnamate, isopropyl 4-carboxy-2-hydroxy-α-cyanocinnamate, isopropyl 2-cyano-α-cyanocinnamate, isopropyl 3-cyano-α-cyanocinnamate, isopropyl 4-cyano-α-cyanocinnamate, isopropyl 2-nitro-α-cyanocinnamate, isopropyl 3-nitro-α-cyanocinnamate, isopropyl 4-nitro-α-cyanocinnamate, isopropyl 2-methoxy-α-cyanocinnamate, isopropyl 3-methoxy-α-cyanocinnamate, isopropyl 4-methoxy-α-cyanocinnamate, isopropyl 2-ethoxy-α-cyanocinnamate, isopropyl 3-ethoxy-α-cyanocinnamate, isopropyl 4-ethoxy-α-cyanocinnamate, isopropyl 2-dimethylamino-α-cyanocinnamate, isopropyl 3-dimethylamino-α-cyanocinnamate, isopropyl 4-dimethylamino-α-cyanocinnamate, isopropyl 2-diethylamino-α-cyanocinnamate, isopropyl 3-diethylamino-α-cyanocinnamate, isopropyl 4-diethylamino-α-cyanocinnamate, isobutyl α-cyanocinnamate, isobutyl 2-methyl-α-cyanocinnamate, isobutyl 3-methyl-α-cyanocinnamate, isobutyl 4-methyl-α-cyanocinnamate, isobutyl 2-ethyl-α-cyanocinnamate, isobutyl 3-ethyl-α-cyanocinnamate, isobutyl 4-ethyl-α-cyanocinnamate, isobutyl 2-fluoro-α-cyanocinnamate, isobutyl 3-fluoro-α-cyanocinnamate, isobutyl 4-fluoro-α-cyanocinnamate, isobutyl 2-chloro-α-cyanocinnamate, isobutyl 3-chloro-α-cyanocinnamate, isobutyl 4-chloro-α-cyanocinnamate, isobutyl 2-bromo-α-cyanocinnamate, isobutyl 3-bromo-α-cyanocinnamate, isobutyl 4-bromo-α-cyanocinnamate, isobutyl 2-hydroxy-α-cyanocinnamate, isobutyl 3-hydroxy-α-cyanocinnamate, isobutyl 4-hydroxy-α-cyanocinnamate, isobutyl 2,3-dihydroxy-α-cyanocinnamate, isobutyl 3,4-dihydroxy-α-cyanocinnamate, isobutyl 2-carboxy-α-cyanocinnamate, isobutyl 3-carboxy-α-cyanocinnamate, isobutyl 4-carboxy-α-cyanocinnamate, isobutyl 2,3-dicarboxy-α-cyanocinnamate, isobutyl 3,4-dicarboxy-α-cyanocinnamate, isobutyl 2-carboxy-3-hydroxy-α-cyanocinnamate, isobutyl 3-carboxy-2-hydroxy-α-cyanocinnamate, isobutyl 3-carboxy-4-hydroxy-α-cyanocinnamate, isobutyl 4-carboxy-3-hydroxy-α-cyanocinnamate, isobutyl 2-carboxy-4-hydroxy-α-cyanocinnamate, isobutyl 4-carboxy-2-hydroxy-α-cyanocinnamate, isobutyl 2-cyano-α-cyanocinnamate, isobutyl 3-cyano-α-cyanocinnamate, isobutyl 4-cyano-α-cyanocinnamate, isobutyl 2-nitro-α-cyanocinnamate, isobutyl 3-nitro-α-cyanocinnamate, isobutyl 4-nitro-α-cyanocinnamate, isobutyl 2-methoxy-α-cyanocinnamate, isobutyl 3-methoxy-α-cyanocinnamate, isobutyl 4-methoxy-α-cyanocinnamate, isobutyl 2-ethoxy-α-cyanocinnamate, isobutyl 3-ethoxy-α-cyanocinnamate, isobutyl 4-ethoxy-α-cyanocinnamate, isobutyl 2-dimethylamino-α-cyanocinnamate, isobutyl 3-dimethylamino-α-cyanocinnamate, isobutyl 4-dimethylamino-α-cyanocinnamate, isobutyl 2-diethylamino-α-cyanocinnamate, isobutyl 3-diethylamino-α-cyanocinnamate, isobutyl 4-diethylamino-α-cyanocinnamate, benzalmalononitrile, 2-methylbenzalmalononitrile, 3-methylbenzalmalononitrile, 4-methylbenzalmalononitrile, 2-ethylbenzalmalononitrile, 3-ethylbenzalmalononitrile, 4-ethylbenzalmalononitrile, 2-fluorobenzalmalononitrile, 3-fluorobenzalmalononitrile, 4-fluorobenzalmalononitrile, 2-chlorobenzalmalononitrile, 3-chlorobenzalmalononitrile, 4-chlorobenzalmalononitrile, 2-bromobenzalmalononitrile, 3-bromobenzalmalononitrile, 4-bromobenzalmalononitrile, 2-hydroxybenzalmalononitrile, 3-hydroxybenzalmalononitrile, 4-hydroxybenzalmalononitrile, 2,3-dihydroxybenzalmalononitrile, 3,4-dihydroxybenzalmalononitrile, 2-carboxybenzalmalononitrile, 3-carboxybenzalmalononitrile, 4-carboxybenzalmalononitrile, 2,3-dicarboxybenzalmalononitrile, 3,4-dicarboxybenzalmalononitrile, 2-carboxy-3-hydroxy-benzalmalononitrile, 3-carboxy-2-hydroxy-benzalmalononitrile, 3-carboxy-4-hydroxy-benzalmalononite, 4-carboxy-3-hydroxy-benzalmalononitrile, 2-carboxy-4-hydroxy-benzalmalononitrile, 4-carboxy-2-hydroxy-benzalmalononitrile, 2-cyanobenzalmalononitrile, 3-cyanobenzalmalononitrile, 4-cyanobenzalmalononitrile, 2-nitrobenzalmalononitrile, 3-nitrobenzalmalononitrile, 4-nitrobenzalmalononitrile, 2-methoxybenzalmalononitrile, 3-methoxybenzalmalononitrile, 4-methoxybenzalmalononitrile, 2-ethoxybenzalmalononitrile, 3-ethoxybenzalmalononitrile, 4-ethoxybenzalmalononitrile, 2-dimethylaminobenzalmalononitrile, 3-dimethylaminobenzalmalononitrile, 4-dimethylaminobenzalmalononitrile, 2-diethylaminobenzalmalononitrile, 3-diethylaminobenzalmalononitrile, 4-diethylaminobenzalmalononitrile, cinnamonitrile, 2-methylcinnamonitrile, 3-methylcinnamonitrile, 4-methylcinnamonitrile, 2-ethylcinnamonitrile, 3-ethyl cinnamonitrile, 4-ethylcinnamonitrile, 2-fluorocinnamonitrile, 3-fluorocinnamonitrile, 4-fluorocinnamonitrile, 2-chlorocinnamonitrile, 3-chlorocinnamonitrile, 4-chlorocinnamonitrile, 2-bromocinnamonitrile, 3-bromocinnamonitrile, 4-bromocinnamonitrile, 2-hydroxycinnamonitrile, 3-hydroxycinnamonitrile, 4-hydroxycinnamonitrile, 2-methoxycinnamonitrile, 3-methoxycinnamonitrile, 4-methoxycinnamonitrile, 2-ethoxycinnamonitrile, 3-ethoxycinnamonitrile, 4-ethoxycinnamonitrile, chalcone, 2-methylchalcone, 3-methylchalcone, 4-methylchalcone, 2-ethylchalcone, 3-ethylchalcone, 4-ethylchalcone, 2-hydroxychalcone, 3-hydroxychalcone, 4-hydroxychalcone, 2-methoxychalcone, 3-methoxychalcone, 4-methoxychalcone, 2-ethoxychalcone, 3-ethoxychalcone, 4-ethoxychalcone, dim ethyl benzylidenemalonate, diethyl benzylidenemalonate, di-n-propyl benzylidenemalonate, diisopropyl benzylidenemalonate, N,N-dimethylcinnamamide, N,N-diethylcinnamamide, N,N-di-n-propylcinnamamide, N,N-diisopropylcinnamamide, and the like. By polymerizing these monomers, polymers can be obtained without performing any post-reaction such as deprotection.

The polymer may contain another monomer residue unit unless the polymer exceeds the scope of the present invention. Examples of the other monomer residue unit include one or two or more selected from α-substituted styrene residue units such as an α-methylstyrene residue unit; (meth)acrylic acid residue units; (meth)acrylate ester residue units such as a methyl (meth)acrylate residue unit, an ethyl (meth)acrylate residue unit, and a butyl (meth)acrylate residue unit; an acrylonitrile residue unit; a methacrylonitrile residue unit; olefin residue units such as an ethylene residue unit and a propylene residue unit; and fumarate diester residue units such as a di-n-butyl fumarate residue unit and a bis (2-ethylhexyl) fumarate residue unit.

As a specific method for producing the copolymer of the present invention, it can be produced by any method as long as a copolymer including the residue unit A represented by the general formula (1) and the residue unit B represented by the general formula (2) is obtained and, for example, it can be produced by performing radical polymerization.

A known polymerization method can be adopted as the radical polymerization, and any of a bulk polymerization method, a solution polymerization method, a suspension polymerization method, a precipitation polymerization method, and an emulsion polymerization method can be adopted.

Examples of a polymerization initiator at the time of performing radical polymerization include organic peroxides such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate, and 2,5-dimethyl-2,5-di(2-ethylhexanoylperoxy)hexane; azo initiators such as 2,2'-azobis(2,4-dimethylvaleronitrile), 2,2'-azobis(2-butyronitrile), 2,2'-azobisisobutyronitrile, dimethyl-2'-azobisisobutyrate, 1,1'-azobis(cyclohexane-1-carbonitrile); and the like.

There are no particular limitation on the solvent that can be used when the solution polymerization method, the suspension polymerization method, the precipitation polymerization method, or the emulsion polymerization method is employed. Examples thereof include aromatic solvents such as benzene, toluene, and xylene; alcohol-based solvents such as methanol, ethanol, propanol, and butanol; cyclohexane; dioxane; tetrahydrofuran; acetone; methyl ethyl ketone; N,N-dimethylformamide; dimethyl sulfoxide; isopropyl acetate; water; and the like. Mixed solvents thereof may be also included.

In addition, the polymerization temperature at the time of performing radical polymerization can be appropriately set according to the decomposition temperature of the polymerization initiator. Since the control of the reaction is easy, in general, the reaction is preferably performed in the range of 30 to 150° C.

The copolymer of the present invention can be used as an optical film comprising the copolymer.

In the case where the copolymer of the present invention is used as an optical film, the light transmittance is preferably 80% or more, and more preferably 85% or more, because the characteristics of the image quality become good.

In the case where the copolymer of the present invention is used as an optical film, the haze (clouding degree) of the film is preferably 2% or less, and more preferably 1% or less, because the characteristics of the image quality become good.

In the case where the copolymer of the present invention is used as an optical film, it is preferably used as a retardation film, because it is excellent in retardation characteristics.

In general, when an optical film is used as a retardation film of a liquid crystal display or the like, it is required that the retardation characteristics do not change over a long period of time. The retardation film using the copolymer of the present invention is characterized in that the retardation characteristics do not change over a long period of time. That is, since it is excellent in retardation stability and can maintain high image quality, it can be suitably used as a retardation film of a liquid crystal display or the like.

The retardation film using the copolymer of the present invention exhibits retardation even when it is not stretched, so that, in the case where the refractive index in the fast axis direction in the film plane is nx, the refractive index in the film in-plane direction orthogonal to it is ny, and the refractive index in the thickness direction of the film is nz, the film is preferably used as a retardation film having a relationship among them of nx≈ny<nz, and more preferably used as a retardation film having a relationship among them of nx=ny<nz.

As a retardation film using the copolymer of the present invention, only the copolymer can be used, or a composition mixed with another polymer can also be used. At this time, the other polymer to be mixed may be a polymer having negative birefringence or a polymer having positive birefringence.

In the case where the copolymer of the present invention is used as a retardation film having negative birefringence, it becomes possible to reduce the film thickness. Therefore, the ratio of the absolute value of the out-of-plane retardation (Rth) measured at a wavelength of 550 nm shown by the following equation (a) to the film thickness is preferably 6.5 nm/film thickness (μm) or more, more preferably 8 nm/film thickness (μm) or more, and particularly preferably 10 nm/film thickness (μm) or more.

$$Rth=((nx+ny)/2-nz)\times d \qquad (a)$$

wherein d represents film thickness.

The method for producing the optical film of the present invention is not particularly limited, and examples thereof include methods such as a solution casting method and a melt casting method.

The solution casting method is a method of casting a solution containing the copolymer dissolved in a solvent (hereinafter referred to as a dope) on a supporting substrate and then removing the solvent by heating or the like to obtain a film. At that time, as a method of casting the dope on the support substrate, for example, a T-die method, a spin coater method, a doctor blade method, a bar coater method, a roll coater method, a lip coater method, or the like is used. Particularly, a method of continuously extruding the dope from a die onto a belt-shaped or drum-shaped supporting substrate is industrially most common. Examples of the supporting substrate to be used include a glass substrate, a metal substrate of stainless steel or ferro type, and a film of polyethylene terephthalate or the like. In the solution casting method, the solution viscosity of the dope is a very important factor at the time of forming a film having high transparency and being excellent in thickness accuracy and surface smoothness, and is preferably 10 to 20,000 cPs and more preferably 100 to 10,000 cPs.

The coating thickness of the copolymer at this time is preferably 1 to 200 μm after drying, more preferably 2 to 100 μm, and particularly preferably 3 to 50 m, because handling of the film is easy.

Moreover, the melt casting method is a molding method of melting the copolymer in an extruder, extruding it from a slit of a T-die into a film shape, and then pulling it while being cooled with a roll, air, or the like.

The retardation film using the copolymer of the present invention can be used after peeling it from the glass substrate or other optical film as a base material, and also used as a laminate with the glass substrate or other optical film as a base material. Further, the retardation film using the copolymer of the present invention may be stretched and used after film formation.

The retardation film using the copolymer of the present invention can be laminated with a polarizing plate and used as a circular or elliptical polarizing plate, and also can be laminated with a polarizer containing polyvinyl alcohol/iodine or the like to form a polarizing plate. Furthermore, the retardation films using the copolymer of the present invention can be laminated with each other or with another retardation film.

The retardation film using the copolymer of the present invention preferably contains an antioxidant in order to enhance the thermal stability at the film formation or of the retardation film itself. Examples of the antioxidant include hindered phenol-based antioxidants, phosphorus-based antioxidants, and other antioxidants. These antioxidants may be used alone or in combination. Since the antioxidant effect is synergistically improved, a hindered antioxidant and a phosphorus-based antioxidant are preferably used in combination, and in that case, for example, a phosphorus-based antioxidant is preferably used in an amount of 100 to 500 parts by weight with mixing together with 100 parts by weight of the hindered antioxidant. Moreover, the addition amount of the antioxidant is preferably 0.01 to 10 parts by weight, and more preferably 0.5 to 1 part by weight with respect to 100 parts by weight of the copolymer constituting the retardation film using the copolymer of the present invention, because excellent antioxidant action is exhibited.

Moreover, as an ultraviolet absorber, an ultraviolet absorber such as benzotriazole, benzophenone, triazine, or a benzoate may be blended as needed, for example.

The retardation film using the copolymer of the present invention can be blended with other polymers, surfactants, polymer electrolytes, conductive complexes, inorganic fillers, pigments, antistatic agents, anti-blocking agents, lubricants, and the like within the range not exceeding the gist of the present invention.

The copolymer of the present invention is suitable for a retardation film having a large refractive index in the thickness direction of the film and having excellent optical characteristics, which film is useful as a compensation film for contrast and viewing angle characteristics of liquid crystal displays, a retardation film for circular polarizing plates of organic EL displays, and an antireflection film.

The copolymer of the present invention can be suitably used as a resin composition containing a resin having positive intrinsic birefringence and an optical compensation film formed using the resin composition.

In the present invention, the resin having positive intrinsic birefringence is not particularly limited as long as an optical compensation film having excellent retardation characteristics is obtained by using the resin, and examples thereof include cellulose-based resins, polycarbonates, cyclic polyolefins, polyethylene, polypropylene, polyesters, polyimides, polyamides, polyurethanes, and the like. Since an optical compensation film having more excellent retardation characteristics can be obtained, a cellulose-based resin is preferable.

In the present invention, in the case where a cellulose-based resin is used as a resin having positive intrinsic birefringence, retardation characteristics and transparency are excellent, in-plane retardation Re is large, and further, stretching processability is excellent when the resin is formed into the optical compensation film, so that the resin is preferably a cellulose-based resin represented by the following general formula (6).

[Chem 11]

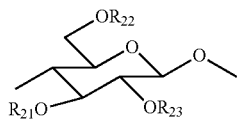

(6)

wherein $R_{21}$ to $R_{23}$ each independently represent hydrogen, a linear alkyl group having 1 to 12 carbon atoms, a branched alkyl group having 1 to 12 carbon atoms, a cyclic group having 3 to 14 carbon atoms, or an acyl group (—C(=O)$X_{33}$) (where $X_{33}$ represents a linear alkyl group having 1 to 12 carbon atoms, a branched alkyl group having 1 to 12 carbon atoms, or a cyclic group having 3 to 14 carbon atoms).

Here, the cellulose-based resin represented by the general formula (6) is a polymer in which β-glucose units are linearly polymerized and a part or all of the hydroxy groups at the 2-, 3-, and 6-positions of the glucose units are substituted.

Examples of the linear alkyl group having 1 to 12 carbon atoms in $R_{21}$ to $R_{23}$ include a methyl group, an ethyl group, an n-propyl group, an n-butyl group, an n-pentyl group, an n-hexyl group, and the like. Examples of the branched alkyl group having 1 to 12 carbon atoms include an isopropyl group, a sec-butyl group, a tert-butyl group, an isobutyl group, and the like. Examples of the cyclic group having 3 to 14 carbon atoms include a cyclopropyl group, a cyclobutyl group, a cyclohexyl group, a phenyl group, a naphthyl group, and the like.

Examples of the linear alkyl group having 1 to 12 carbon atoms in $X_{33}$ include a methyl group, an ethyl group, an n-propyl group, an n-butyl group, an n-pentyl group, an n-hexyl group, and the like. Examples of the branched alkyl group having 1 to 12 carbon atoms include an isopropyl group, a sec-butyl group, a tert-butyl group, an isobutyl group, and the like. Examples of the cyclic group having 3 to 14 carbon atoms include a cyclopropyl group, a cyclobutyl group, a cyclohexyl group, a phenyl group, a naphthyl group, and the like.

Examples of $R_{21}$ to $R_{23}$ in the general formula (6) of the present invention include a methyl group, an ethyl group, an n-propyl group, an n-butyl group, an isopropyl group, a sec-butyl group, a tert-butyl group, an isobutyl group, a cyclopropyl group, a cyclobutyl group, a cyclohexyl group, a phenyl group, a naphthyl group, an acetyl group, a propionyl group, a butyryl group, a pentanoyl group, a hexanoyl group, a heptanoyl group, an isobutyryl group, a tert-butyryl group, a cyclohexanoyl group, a benzoyl group, a naphthoyl group, and the like. Of these, since solubility and compatibility become more excellent, a methyl group, an ethyl group, a propyl group, an acetyl group, a propionyl group, and a butyryl group are preferable.

In the cellulose-based resin of the present invention, the degree of substitution in the substitution through the oxygen atom of the hydroxy group of the cellulose means the ratio of substitution of the hydroxy group of the cellulose (degree of substitution reaches 3 at 100% substitution) for each of the 2-, 3-, and 6-positions. In view of solubility, compatibility, and stretchability, the degree of substitution is preferably 1.5 to 3.0, and more preferably 1.8 to 2.8.

Specific examples of the cellulose-based resin of the present invention include methyl cellulose, ethyl cellulose, triacetyl cellulose, cellulose acetate, cellulose acetate butyrate, cellulose acetate propionate, and the like, and since a compensation film having more excellent retardation characteristics and transparency is obtained, ethyl cellulose, cellulose acetate butyrate, and cellulose acetate propionate are preferred.

Since the cellulose-based resin of the present invention becomes excellent in mechanical properties and excellent in molding processability at the time of film formation, the number-average molecular weight (Mn) in terms of standard polystyrene obtained from an elution curve measured by gel permeation chromatography (GPC) is preferably 1,000 to 1,000,000, and more preferably 5,000 to 200,000.

The resin composition of the present invention is obtained by blending the copolymer of the present invention and a resin having positive intrinsic birefringence, and when used as an optical compensation film, the resin composition is characterized in that the optical compensation film exhibits objective retardation characteristics. That is, since the copolymer of the present invention exhibits negative birefringence and the copolymer of the present invention and the resin having positive intrinsic birefringence exhibit excellent compatibility, when the resin composition according to the present invention, which is obtained by blending them, is used, it is possible to obtain an optical compensation film having practical transparency and excellent retardation characteristics.

The proportion of the copolymer of the present invention to the resin having positive intrinsic birefringence in the resin composition of the present invention is preferably 1 to 90% by weight of the copolymer of the present invention and 99 to 10% by weight of the resin having positive intrinsic birefringence, because it is suitable for controlling the retardation when the resin composition is formed into an optical compensation film. The proportion is more preferably 10 to 85% by weight of the copolymer of the present invention and 90 to 15% by weight of the resin having positive intrinsic birefringence, and particularly preferably 20 to 80% by weight of the copolymer of the present invention and 80 to 20% by weight of the resin having positive intrinsic birefringence.

As a method of blending, methods such as melt blending and solution blending methods can be used. The melt blending method is a method of production by melting and kneading a resin by heating. The solution blending method is a method of dissolving and blending a resin in a solvent. Solvents used for solution blending include, for example, chlorinated solvents such as methylene chloride and chloroform; aromatic solvents such as toluene and xylene; ketone solvents such as acetone, methyl ethyl ketone, methyl isobutyl ketone, cyclopentanone, and cyclohexanone; ester solvents such as ethyl acetate and butyl acetate; alcohol solvents such as methanol, ethanol, and propanol; ether solvents such as dioxane and tetrahydrofuran; dimethylformamide, N-methylpyrrolidone, and the like. The respective resins and additives can be also dissolved in a solvent and then blend, and the powders, pellets, or the like of respective resins can be also kneaded and then dissolved in a solvent.

The resin composition of the present invention may contain an antioxidant in order to improve the thermal stability at the time of forming an optical compensation film. Examples of the antioxidant include hindered phenol-based antioxidants, phosphorus-based antioxidants, sulfur-based antioxidants, lactone-based antioxidants, amine-based antioxidants, hydroxylamine-based antioxidants, vitamin E-based antioxidants, other antioxidants, and the like. These antioxidants may be used singly or two or more thereof may be used in combination.

The resin composition of the present invention may contain a hindered amine-based light stabilizer or an ultraviolet absorber in order to enhance the weather resistance at the time of formation into an optical compensation film. Examples of the ultraviolet absorber include benzotriazole, benzophenone, triazine, a benzoate, and the like.

To the resin composition of the present invention, a compound known as a so-called plasticizer may be added for the purpose of improving mechanical properties, imparting flexibility, imparting water absorption resistance, reducing water vapor transmittance, adjusting retardation, and the like when the resin composition is formed into an optical compensation film. Examples of the plasticizer include phosphate esters, carboxylate esters, and the like. In addition, acrylic polymers and the like are also used.

Examples of the phosphate esters include triphenyl phosphate, tricresyl phosphate, phenyl diphenyl phosphate, and the like.

Examples of the carboxylate esters include phthalate esters, citrate esters, fatty acid esters, glycerol esters, alkyl phthalyl alkyl glycolates, and the like. Examples of phthalate esters include dimethyl phthalate, diethyl phthalate, dicyclohexyl phthalate, dioctyl phthalate, diethylhexyl phthalate, and the like and examples of citrate esters include acetyl triethyl citrate, acetyl tributyl citrate, and the like. Also, examples of the fatty acid esters include butyl oleate, methyl acetyl ricinoleate, dibutyl sebacate, and the like, examples of the glycerol esters include triacetin, trimethylolpropane tribenzoate, the like, and examples of the alkyl phthalyl alkyl glycolates include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, propyl phthalyl ethyl glycolate, methyl phthalyl propyl glycolate, methyl phthalyl butyl glycolate, ethy phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, octyl phthalyl ethyl glycolate, and the like. These plasticizers may be used singly or two or more thereof may be used in combination.

The resin composition of the present invention may contain an additive having an aromatic hydrocarbon ring or an aromatic heterocycle, for the purpose of adjusting the retardation at the time of formation into an optical compensation film. The birefringence Δn represented by the following equation (A) of the additive to be used for the purpose of adjusting the retardation is not particularly limited, but is preferably 0.05 or more, more preferably 0.05 to 0.5, and particularly preferably 0.1 to 0.5, because the resin composition forms an optical compensation film having more excellent optical characteristics. The Δn of the additive can be determined by molecular orbital calculation.

$$\Delta n = nx - ny \quad (A)$$

wherein nx represents the refractive index in the slow axis direction of the additive molecule, and ny represents the refractive index in the fast axis direction of the additive molecule.

In the case where the resin composition of the present invention contains an additive having an aromatic hydrocarbon ring or an aromatic heterocycle, in the additive, the number of the aromatic hydrocarbon rings or the aromatic heterocycles in the molecule is not particularly limited, but is preferably 1 to 12, and more preferably 1 to 8, because the resin composition forms an optical compensation film having excellent optical characteristic. Examples of the aromatic hydrocarbon ring include 5-membered rings, 6-membered rings, 7-membered rings, or condensed rings composed of two or more aromatic rings and the like, and examples of the aromatic heterocycles include a furan ring, a thiophene ring, a pyrrole ring, an oxazole ring, a thiazole ring, an imidazole ring, a triazole ring, a pyridine ring, a pyrimidine ring, a pyrazine ring, a 1,3,5-triazine ring, and the like.

The aromatic hydrocarbon ring or the aromatic heterocycle may have a substituent, and examples of the substituent include a hydroxy group, an ether group, a carbonyl group, an ester group, a carboxylic acid residue, an amino group, an imino group, an amide group, an imide group, a cyano group, a nitro group, a sulfonyl group, a sulfonic acid residue, a phosphonyl group, a phosphonic acid residue, and the like.

Examples of the additive having an aromatic hydrocarbon ring or an aromatic heterocycle to be used in the present invention include phosphate ester-based compounds such as tricresyl phosphate, trixylenyl phosphate, triphenyl phosphate, 2-ethylhexyl diphenyl phosphate, cresyl diphenyl phosphate, and bisphenol A bis(diphenyl phosphate); phthalate ester-based compounds such as dimethyl phthalate, diethyl phthalate, dibutyl phthalate, dihexyl phthalate, di-normal octyl phthalate, 2-ethylhexyl phthalate, diisooctyl phthalate, dicapryl phthalate, dinonyl phthalate, diisononyl phthalate, didecyl phthalate, and diisodecyl phthalate; trimellitate ester compounds such as tributyl trimellitate, tri-normal hexyl trimellitate, tri(2-ethylhexyl) trimellitate, tri-normal octyl trimellitate, tri-isoctyl trimelylate, tri-isodecyl trimelylate; pyromellitate ester compounds such as tri(2-ethylhexyl) pyromellitate, tetrabutyl pyromellitate, tetra-normal hexyl pyromelitate, tetra(2-ethylhexyl) pyromelitate, tetra-normal octyl pyromelitate, tetra-isooctyl pyromelitate, and tetra-isodecyl pyromelitate; benzoate ester compounds such as ethyl benzoate, isopropyl benzoate, and ethyl paraoxybenzoate; salicylate ester compounds such as phenyl salicylate, p-octylphenyl salicylate, and p-tert-butylphenate salicylate; glycolate ester compounds such as methyl phthalyl ethyl glycolate, ethyl phthalyl ethyl glycolate, and butyl phthalyl butyl glycolate; benzotriazole-based compounds such as 2-(2'-hydroxy-5'-t-butylphenyl)benzotriazole and 2-(2'-hydroxy-3',5'-di-t-butylphenyl)benzotriazole; benzophenone-based compounds such as 2-hydroxy-4-methoxybenzophenone, 2,2'-dihydroxy-4-methoxybenzophenone, 2,4-dihydroxybenzophenone, 2,2',4,4'-tetrahydroxybenzophenone, and 2-hydroxy-4-methoxy-5-sulfobenzophenone, sulfonamide-based compounds such as N-benzenesulfonamide, triazine-based compounds such as 2,4-diphenyl-6-(2-hydroxy-4-methoxyphenyl)-1,3,5-triazine, 2,4-diphenyl-6-

(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, and the like. Since an optical compensation film having more excellent retardation characteristics can be obtained, tricresyl phosphate, 2-ethylhexyl diphenyl phosphate, 2-hydroxy-4-methoxybenzophenone, and 2,2',4,4'-tetrahydroxybenzophenone are preferable, and one of them can be used or two or more of them can be used in combination as needed.

In the case where the resin composition of the present invention contains an additive having an aromatic hydrocarbon ring or an aromatic heterocycle, from the viewpoint of optical characteristics and mechanical properties, it is preferable that the ratio of the additive having an aromatic hydrocarbon ring or an aromatic heterocycle is 0.01 to 30% by weight, more preferably 0.01 to 20% by weight, and particularly preferably 0.01 to 15% by weight.

The resin composition of the present invention may contain other polymers, surfactants, polymer electrolytes, conductive complexes, pigments, dyes, antistatic agents, antiblocking agents, lubricants, and the like within the range not exceeding the gist of the present invention.

The optical compensation film of the present invention preferably has a thickness of 5 to 200 μm, more preferably 5 to 150 μm, and particularly preferably 5 to 120 μm, from the viewpoint of film handleability and compatibility with thinning of optical members.

The optical compensation film of the present invention has a light transmittance of preferably 80% or more, and more preferably 85% or more, because the characteristics of the image quality become good.

The optical compensation film of the present invention has a film haze (clouding degree) of preferably 2% or less, and more preferably 1% or less, because the characteristics of the image quality become good.

The retardation characteristics of the optical compensation film of the present invention is such that the in-plane retardation (Re) represented by the following equation (b) is preferably 50 to 500 nm, more preferably 100 to 450 nm, and particularly preferably 100 to 400 nm and the Nz coefficient represented by the following equation (c) is preferably 0≤Nz≤1.0, more preferably 0.30≤Nz≤0.65, and particularly preferably 0.35≤Nz≤0.60. The retardation characteristics at this time are measured under the conditions of a measurement wavelength of 589 nm using a fully automatic birefringence meter (manufactured by AXOMETRICS, trade name: AxoScan).

These are retardation characteristics that are difficult to express in conventional optical compensation films.

$$Re=(nx-ny)\times d \tag{b}$$

$$Nz=(nx-nz)/(nx-ny) \tag{c}$$

wherein nx represents the refractive index in the stretching axis direction in the film plane, ny represents the refractive index in the direction perpendicular to the stretching axis in the film plane, nz represents the out-of-plane (thickness direction) refractive index of the film, and d represents film thickness.

As the wavelength dispersion characteristics of the optical compensation film of the present invention, for suppressing color shift, the ratio Re(450)/Re(550) of retardation at 450 nm to retardation at 550 nm is preferably 0.60<Re(450)/Re(550)<1.10, more preferably 0.70<Re(450)/Re (550)<1.02, and particularly preferably 0.75<Re(450)/Re(550)<1.00.

As a method for producing the optical compensation film of the present invention, any method may be used as long as production of the optical compensation film of the present invention is possible, but since an optical film excellent in optical characteristics, heat resistance, surface characteristics, and the like can be obtained, it is preferable to produce it by a solution casting method. Here, the solution casting method is a method of casting a resin solution (generally referred to as a dope) on a supporting substrate and evaporating the solvent by heating to obtain an optical film. As a method of casting, for example, a T-die method, a doctor blade method, a bar coater method, a roll coater method, a lip coater method, and the like are used, and industrially, a method of continuously extruding the dope from a die onto a belt-shaped or drum-shaped supporting substrate is generally used. Examples of the supporting substrate to be used include a glass substrate, a metal substrate of stainless steel or ferro type, and a plastic substrate of polyethylene terephthalate or the like. For industrially continuously forming a substrate highly excellent in surface characteristics and optical homogeneity, a metal substrate whose surface is mirror-finished is preferably used. The viscosity of the resin solution is a very important factor at the time of forming an optical compensation film having excellent thickness accuracy and surface smoothness in the solution casting method, and the viscosity of the resin solution depends on the concentration of the resin, molecular weight, and the type of solvent.

The viscosity of the resin solution at the time of producing the optical compensation film of the present invention can be adjusted by the molecular weight of the polymer, the concentration of the polymer, and the type of the solvent. The viscosity of the resin solution is not particularly limited, but is preferably 100 to 10000 cps, more preferably 300 to 5000 cps, and particularly preferably 500 to 3000 cps, for making the film coating easier.

Methods for producing the optical compensation film of the present invention include, for example, a method of dissolving a resin composition containing a resin having a residue unit represented by the general formula (1) and a resin having positive intrinsic birefringence into a solvent, casting the resulting resin solution onto a substrate, and peeling a film from the substrate after drying.

In the present invention, the out-of-plane retardation (Rth) can be controlled by the concentration of the resin contained in the resin composition, the molecular weight of the resin, the type of the solvent, and the drying temperature for film formation.

The optical compensation film of the present invention is preferably subjected to uniaxial stretching or unbalanced biaxial stretching for exhibiting the in-plane retardation (Re). As a method of stretching the optical compensation film, it is possible to use a longitudinal uniaxial stretching method by roll stretching, a transverse uniaxial stretching method by tenter stretching, an unbalanced sequential biaxial stretching method and an unbalanced simultaneous biaxial stretching method by combinations thereof, and the like. Further, in the present invention, the retardation characteristics can be expressed without using a special stretching method in which stretching is performed under the action of the shrinkage force of a heat-shrinkable film.

The thickness of the film at the time of stretching is preferably 10 to 200 μm, more preferably 30 to 150 μm, and particularly preferably 30 to 120 μm, from the viewpoint of easiness of the stretching process and suitability to thinning of the optical member.

The stretching temperature is not particularly limited, but is preferably 50 to 200° C., and more preferably 100 to 180° C., because good retardation characteristics are obtained.

The stretching ratio in the uniaxial stretching is preferably 1.05 to 3.5 times, and more preferably 1.1 to 3.0 times, because good retardation characteristics are obtained. The stretch ratio in unbalanced biaxial stretching is preferably 1.05 to 3.5 times, more preferably 1.1 to 3.0 times in the lengthwise direction, and is preferably 1.0 to 1.2 times, more preferably 1.0 to 1.1 times in the transverse direction, because good retardation characteristics are obtained. The in-plane retardation (Re) can be controlled by the stretching temperature and the stretching ratio.

The optical compensation film of the present invention can be laminated with a film containing another resin, if necessary. Examples of the other resin include polyether sulfones, polyarylates, polyethylene terephthalate, polynaphthalene terephthalate, polycarbonates, cyclic polyolefins, maleimide-based resins, fluororesins, polyimides, and the like. In addition, a hard coat layer or a gas barrier layer can be also laminated.

Effects of the Invention

The copolymer of the present invention is a copolymer suitable for an optical film excellent in retardation characteristics, and particularly suitable for an optical compensation film for liquid crystal display devices and organic EL.

EXAMPLES

Hereinafter, the present invention will be described by way of Examples, but the present invention is not limited to these Examples.

Incidentally, the various physical properties shown by Examples were measured by the following method.
<Composition of Copolymer>

It was determined from proton nuclear magnetic resonance ($^1$H-NMR) spectroscopy using a nuclear magnetic resonance measurement apparatus (manufactured by JEOL Ltd., trade name: JNM-ECZ400S/L1). Further, those which are difficult to determine by $^1$H-NMR spectroscopy were determined by CHN elemental analysis.
<Measurement of Number-Average Molecular Weight>

It was measured at 40° C. using tetrahydrofuran or N,N-dimethylformamide as a solvent and using a gel permeation chromatography (GPC) apparatus (manufactured by Tosoh Corporation, trade name: HLC8320GPC (equipped with a column of GMHHR-H)), and was determined as a value in terms of standard polystyrene or standard pullulans.
<Evaluation Method of Transparency>

The total light transmittance and haze of a film were measured using a haze meter (manufactured by Nippon Denshoku Industries Co., Ltd., trade name: NDH5000).
<Measurement of Refractive Index>

The measurement was performed using an Abbe refractometer (manufactured by Atago) in accordance with JIS K 7142 (1981).
<Measurement of Retardation and Three-Dimensional Refractive Index of Film>

Measurement was performed using a fully automatic birefringence meter (manufactured by Oji Scientific Instruments, trade name: KOBRA-WPR.

Example 1 (Synthesis of Cinnamonitrile/1-Vinylindole Copolymer)

In a glass ampoule having a volume of 50 mL were charged 5.0 g (0.039 mol) of cinnamonitrile, 5.6 g (0.039 mol) of 1-vinylindole, and 0.28 g (0.00065 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 5.1 g of a cinnamonitrile/1-vinylindole copolymer (yield: 48%).

The number-average molecular weight of the obtained cinnamonitrile/1-vinylindole copolymer was 14,000 in terms of standard polystyrene.

In addition, by $^1$H-NMR measurement, the copolymer composition was confirmed as follows: cinnamonitrile residue unit/1-vinylindole residue unit=34/66 (mol %) (residue unit A/residue unit B=0.52).

Example 2 (Synthesis of Cinnamonitrile/9-Vinylcarbazole Copolymer)

In a glass ampoule having a volume of 50 mL were charged 5.0 g (0.039 mol) of cinnamonitrile, 7.5 g (0.039 mol) of 9-vinylcarbazole, and 0.28 g (0.00065 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 8.0 g of a cinnamonitrile/9-vinylcarbazole copolymer (yield: 64%).

The number-average molecular weight of the obtained cinnamonitrile/9-vinylcarbazole copolymer was 25,000 in terms of standard polystyrene.

In addition, by $^1$H-NMR measurement, the copolymer composition was confirmed as follows: cinnamonitrile residue unit/9-vinylcarbazole residue unit=38/62 (mol %) (residue unit A/residue unit B=0.61).

Example 3 (Synthesis of Methyl α-Cyanocinnamate/9-Vinylcarbazole Copolymer)

In a glass ampoule having a volume of 50 mL were charged 5.0 g (0.027 mol) of methyl α-cyanocinnamate, 5.2 g (0.027 mol) of 9-vinylcarbazole, 0.19 g (0.00044 mol) of 2,5-dimethyl-2,5-di(2-ethylhexanoylperoxy)hexane that was a polymerization initiator, and 1.0 g of toluene. After nitrogen substitution and pressure reduction were repeated, the ampoule was melt-sealed in a reduced pressure state. The ampoule was placed in a thermostatic chamber at 62° C. and held for 24 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 6.9 g of a methyl α-cyanocinnamate/9-vinylcarbazole copolymer (yield: 68%).

The number-average molecular weight of the obtained methyl α-cyanocinnamate/9-vinylcarbazole copolymer was 33,000 in terms of standard polystyrene.

In addition, by ¹H-NMR measurement, the copolymer composition was confirmed as follows: methyl α-cyanocinnamate residue unit/9-vinylcarbazole residue unit=29/71 (mol %) (residue unit A/residue unit B=0.41).

Example 4 (Synthesis of Methyl α-Cyanocinnamate/N-Vinylsuccinimide Copolymer)

In a glass ampoule having a volume of 50 mL were charged 5.0 g (0.027 mol) of methyl α-cyanocinnamate, 3.4 g (0.027 mol) of N-vinylsuccinimide, and 0.19 g (0.00044 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of N,N-dimethylformamide. The polymer solution was added dropwise into 500 mL of methanol for precipitation, and then vacuum drying was performed at 60° C. for 10 hours to obtain 4.5 g of a methyl α-cyanocinnamate/N-vinylsuccinimide copolymer (yield: 54%).

The number-average molecular weight of the obtained methyl α-cyanocinnamate/N-vinylsuccinimide copolymer was 21,000 in terms of standard pullulan.

In addition, by ¹H-NMR measurement, the copolymer composition was confirmed as follows: methyl α-cyanocinnamate residue unit/N-vinylsuccinimide residue unit=42/58 (mol %) (residue unit A/residue unit B=0.72).

Example 5 (Synthesis of Ethyl α-Cyanocinnamate/N-Vinylphthalimide Copolymer)

In a glass ampoule having a volume of 50 mL were charged 5.0 g (0.025 mol) of ethyl α-cyanocinnamate, 4.3 g (0.025 mol) of N-vinylphthalimide, 0.18 g (0.00042 mol) of 2,5-dimethyl-2,5-di(2-ethylhexanoylperoxy)hexane that was a polymerization initiator, and 1.0 g of toluene. After nitrogen substitution and pressure reduction were repeated, the ampoule was melt-sealed in a reduced pressure state. The ampoule was placed in a thermostatic chamber at 62° C. and held for 2 hours to perform radical polymerization. After completion of the polymerization reaction, a polymerized product was taken out of the ampoule and dissolved in 25 g of N,N-dimethylformamide. The polymer solution was added dropwise into 500 mL of methanol for precipitation, and then vacuum drying was performed at 60° C. for 10 hours to obtain 6.7 g of an ethyl α-cyanocinnamate/N-vinylphthalimide copolymer (yield: 72%).

The number-average molecular weight of the obtained ethyl α-cyanocinnamate/N-vinylphthalimide copolymer was 25,000 in terms of standard pullulan.

In addition, by ¹H-NMR measurement, the copolymer composition was confirmed as follows: ethyl α-cyanocinnamate residue unit/N-vinylphthalimide residue unit=44/56 (mol %) (residue unit A/residue unit B=0.79).

Example 6 (Synthesis of Ethyl α-Cyanocinnamate/2-Vinylbenzofuran Copolymer)

In a glass ampoule having a volume of 50 mL were charged 5.0 g (0.025 mol) of ethyl α-cyanocinnamate, 3.6 g (0.025 mol) of 2-vinylbenzofuran, and 0.18 g (0.00042 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 3.9 g of an ethyl α-cyanocinnamate/2-vinylbenzofuran copolymer (yield: 45%).

The number-average molecular weight of the obtained ethyl α-cyanocinnamate/2-vinylbenzofuran copolymer was 17,000 in terms of standard polystyrene.

In addition, by ¹H-NMR measurement, the copolymer composition was confirmed as follows: ethyl α-cyanocinnamate residue unit/2-vinylbenzofuran residue unit=32/68 (mol %) (residue unit A/residue unit B=0.47).

Example 7 (Synthesis of n-Propyl α-Cyanocinnamate/2-Vinylquinoline Copolymer)

In a glass ampoule having a volume of 50 mL were charged 5.0 g (0.023 mol) of n-propyl α-cyanocinnamate, 3.6 g (0.023 mol) of 2-vinylquinoline, and 0.17 g (0.00039 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of n-hexane for precipitation, and then vacuum drying was performed at 60° C. for 10 hours to obtain 4.2 g of an n-propyl α-cyanocinnamate/2-vinylquinoline copolymer (yield: 49%).

The number-average molecular weight of the obtained n-propyl α-cyanocinnamate/2-vinylquinoline copolymer was 21,000 in terms of standard polystyrene.

In addition, by ¹H-NMR measurement, the copolymer composition was confirmed as follows: n-propyl α-cyanocinnamate residue unit/2-vinylquinoline residue unit=30/70 (mol %) (residue unit A/residue unit B=0.43).

Example 8 (Synthesis of Benzalmalononitrile/N-Vinylphthalimide Copolymer)

In a glass ampoule having a volume of 50 mL were charged 5.0 g (0.032 mol) of benzalmalononitrile, 5.5 g (0.032 mol) of N-vinylphthalimide, 0.23 g (0.00053 mol) of 2,5-dimethyl-2,5-di(2-ethylhexanoylperoxy)hexane that was a polymerization initiator, and 1.0 g of toluene. After nitrogen substitution and pressure reduction were repeated, the ampoule was melt-sealed in a reduced pressure state. The ampoule was placed in a thermostatic chamber at 62° C. and held for 24 hours to perform radical polymerization. After completion of the polymerization reaction, a polymerized product was taken out of the ampoule and dissolved in 25 g of N,N-dimethylformamide. The polymer solution was added dropwise into 500 mL of methanol for precipitation, and then vacuum drying was performed at 60° C. for 10 hours to obtain 7.6 g of a benzalmalononitrile/N-vinylphthalimide copolymer (yield: 72%).

The number-average molecular weight of the obtained benzalmalononitrile/N-vinylphthalimide copolymer was 24,000 in terms of standard pullulan.

In addition, by $^1$H-NMR measurement, the copolymer composition was confirmed as follows: benzalmalononitrile residue unit/N-vinylphthalimide residue unit=32/68 (mol %) (residue unit A/residue unit B=0.47).

Example 9 (Synthesis of Benzalmalononitrile/9-Vinylcarbazole Copolymer)

In a glass ampoule having a volume of 50 mL were charged 5.0 g (0.032 mol) of benzalmalononitrile, 6.2 g (0.032 mol) of 9-vinylcarbazole, 0.23 g (0.00053 mol) of 2,5-dimethyl-2,5-di(2-ethylhexanoylperoxy)hexane that was a polymerization initiator, and 1.2 g of toluene. After nitrogen substitution and pressure reduction were repeated, the ampoule was melt-sealed in a reduced pressure state. The ampoule was placed in a thermostatic chamber at 62° C. and held for 6 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 5.9 g of a benzalmalononitrile/9-vinylcarbazole copolymer (yield: 53%).

The number-average molecular weight of the obtained benzalmalononitrile/9-vinylcarbazole copolymer was 90,000 in terms of standard polystyrene.

In addition, by CHN elemental analysis, the copolymer composition was confirmed as follows: benzalmalononitrile residue unit/9-vinylcarbazole residue unit=43/57 (mol %) (residue unit A/residue unit B=0.75).

Example 10 (Synthesis of 4-Nitrobenzalmalononitrile/2-Vinylbenzofuran Copolymer)

In a glass ampoule having a volume of 50 mL were charged 5.0 g (0.025 mol) of 4-nitrobenzalmalononitrile, 3.6 g (0.025 mol) of 2-vinylbenzofuran, 0.18 g (0.00042 mol) of 2,5-dimethyl-2,5-di(2-ethylhexanoylperoxy)hexane that was a polymerization initiator, and 5.0 g of N,N-dimethylformamide. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 3.9 g of a 4-nitrobenzalmalononitrile/2-vinylbenzofuran copolymer (yield: 45%).

The number-average molecular weight of the obtained 4-nitrobenzalmalononitrile/2-vinylbenzofuran copolymer was 26,000 in terms of standard polystyrene.

In addition, by $^1$H-NMR measurement, the copolymer composition was confirmed as follows: 4-nitrobenzalmalononitrile residue unit/2-vinylbenzofuran residue unit=33/67 (mol %) (residue unit A/residue unit B=0.49).

Example 11 (Synthesis of N,N-Diethylcinnamamide/2-Vinylfuran Copolymer)

In a glass ampoule having a volume of 50 mL were charged 5.0 g (0.025 mol) of N,N-diethylcinnamamide, 2.4 g (0.025 mol) of 2-vinylfuran, and 0.18 g (0.00042 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 3.7 g of an N,N-diethylcinnamamide/2-vinylfuran copolymer (yield: 50%).

The number-average molecular weight of the obtained N,N-diethylcinnamamide/2-vinylfuran copolymer was 8,000 in terms of standard polystyrene.

In addition, by $^1$H-NMR measurement, the copolymer composition was confirmed as follows: N,N-diethylcinnamamide residue unit/2-vinylfuran residue unit=31/69 (mol %) (residue unit A/residue unit B=0.45).

Example 12 (Synthesis of Chalcone/2-Vinylquinoline Copolymer)

In a glass ampoule having a volume of 50 mL were charged 5.0 g (0.024 mol) of chalcone, 3.7 g (0.024 mol) of 2-vinylquinoline, and 0.17 g (0.00039 mol) of 2,5-dimethyl-2,5-di(2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of n-hexane for precipitation, and then vacuum drying was performed at 60° C. for 10 hours to obtain 4.1 g of a chalcone/2-vinylquinoline copolymer (yield: 47%).

The number-average molecular weight of the obtained chalcone/2-vinylquinoline copolymer was 9,000 in terms of standard polystyrene.

In addition, by $^1$H-NMR measurement, the copolymer composition was confirmed as follows: chalcone residue unit/2-vinylquinoline residue unit=29/71 (mol %) (residue unit A/residue unit B=0.41).

Example 13 (Synthesis of Methyl α-Cyanocinnamate/9-Vinylcarbazole Copolymer)

In a glass ampoule having a volume of 50 mL were charged 5.0 g (0.027 mol) of methyl α-cyanocinnamate, 5.2 g (0.027 mol) of 9-vinylcarbazole, 0.39 g (0.00091 mol) of 2,5-dimethyl-2,5-di(2-ethylhexanoylperoxy)hexane that was a polymerization initiator, and 1.0 g of toluene. After nitrogen substitution and pressure reduction were repeated, the ampoule was melt-sealed in a reduced pressure state. The ampoule was placed in a thermostatic chamber at 62° C. and held for 24 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 7.1 g of a methyl α-cyanocinnamate/9-vinylcarbazole copolymer (yield: 70%).

The number-average molecular weight of the obtained methyl α-cyanocinnamate/9-vinylcarbazole copolymer was 15,000 in terms of standard polystyrene.

In addition, by $^1$H-NMR measurement, the copolymer composition was confirmed as follows: methyl α-cyanocinnamate residue unit/9-vinylcarbazole residue unit=31/69 (mol %) (residue unit A/residue unit B=0.45).

Example 14 (Synthesis of Isobutyl 4-Hydroxy-α-Cyanocinnamate/9-Vinylcarbazole Copolymer)

In a glass ampoule having a volume of 50 mL were charged 5.0 g (0.020 mol) of isobutyl 4-hydroxy-α-cyanocinnamate, 3.9 g (0.020 mol) of 9-vinylcarbazole, 0.14 g (0.00033 mol) of 2,5-dimethyl-2,5-di(2-ethylhexanoylperoxy)hexane that was a polymerization initiator, and 8.0 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of a mixed solvent of methanol/water=80/20 (volume %/volume %) for precipitation, and then vacuum drying was performed at 60° C. for 10 hours to obtain 7.5 g of an isobutyl 4-hydroxy-α-cyanocinnamate/9-vinylcarbazole copolymer (yield: 84%).

The number-average molecular weight of the obtained isobutyl 4-hydroxy-α-cyanocinnamate/9-vinylcarbazole copolymer was 16,000 in terms of standard polystyrene.

In addition, by $^1$H-NMR measurement, the copolymer composition was confirmed as follows: isobutyl 4-hydroxy-α-cyanocinnamate residue unit/9-vinylcarbazole residue unit=46/54 (mol %) (residue unit A/residue unit B=0.85).

Example 15 (Synthesis of Ethyl α-Cyano-4-Hydroxycinnamate/9-Vinylcarbazole Copolymer)

In a glass ampoule having a volume of 50 mL were charged 5.0 g of ethyl α-cyano-4-hydroxycinnamate, 4.4 g of 9-vinylcarbazole, 8.5 g of tetrahydrofuran as a polymerization solvent, and 0.17 g of 2,5-dimethyl-2,5-di(2-ethylhexanoylperoxy)hexane that was a polymerization initiator. After nitrogen substitution was performed, the ampoule was melt-sealed in a reduced pressure state. The glass ampoule was placed in a thermostatic chamber at 62° C. and held for 48 hours to perform radical polymerization. After completion of the polymerization reaction, a polymerized product was taken out of the vessel and added dropwise into 500 mL of methanol for precipitation, and then vacuum drying was performed at 80° C. for 10 hours to obtain 7.7 g of an ethyl α-cyano-4-hydroxycinnamate/9-vinylcarbazole copolymer (yield: 82%).

The number-average molecular weight of the obtained ethyl α-cyano-4-hydroxycinnamate/9-vinylcarbazole copolymer was 22,000 in terms of standard polystyrene.

In addition, by $^1$H-NMR measurement, the copolymer composition was confirmed as follows: ethyl α-cyano-4-hydroxycinnamate residue unit/9-vinylcarbazole residue unit=42/58 (mol %) (residue unit A/residue unit B=0.72).

Example 16 (Synthesis of 4-Hydroxybenzalmalononitrile/2-Vinylnaphthalene Copolymer)

In a glass ampoule having a volume of 50 mL were charged 5.0 g of 4-hydroxybenzalmalononitrile, 4.5 g of 2-vinylnaphthalene, 10 g of tetrahydrofuran as a polymerization solvent, and 0.21 g of 2,5-dimethyl-2,5-di(2-ethylhexanoylperoxy)hexane that was a polymerization initiator. After nitrogen substitution was performed, the ampoule was melt-sealed in a reduced pressure state. The glass ampoule was placed in a thermostatic chamber at 62° C. and held for 48 hours to perform radical polymerization. After completion of the polymerization reaction, a polymerized product was taken out of the vessel and added dropwise into 500 mL of methanol for precipitation, and then vacuum drying was performed at 80° C. for 10 hours to obtain 6.2 g of a 4-hydroxybenzalmalononitrile/2-vinylnaphthalene copolymer (yield: 65%).

The number-average molecular weight of the obtained 4-hydroxybenzalmalononitrile/2-vinylnaphthalene copolymer was 12,000 in terms of standard polystyrene.

In addition, by $^1$H-NMR measurement, the copolymer composition was confirmed as follows: 4-hydroxybenzalmalononitrile residue unit/2-vinylnaphthalene residue unit=43/57 (mol %) (residue unit A/residue unit B=0.75).

Example 17 (Synthesis of 4-Carboxybenzalmalononitrile/N-Vinylphthalimide Copolymer)

In a glass ampoule having a volume of 50 mL were charged 5.3 g of 4-carboxybenzalmalononitrile, 4.7 g of N-vinylphthalimide, 12.5 g of N,N-dimethylformamide as a polymerization solvent, and 0.19 g of 2,5-dimethyl-2,5-di(2-ethylhexanoylperoxy)hexane that was a polymerization initiator. After nitrogen substitution was performed, the ampoule was melt-sealed in a reduced pressure state. The glass ampoule was placed in a thermostatic chamber at 62° C. and held for 48 hours to perform radical polymerization. After completion of the polymerization reaction, a polymerized product was taken out of the vessel and added dropwise into 200 mL of methanol for precipitation, and then vacuum drying was performed at 80° C. for 10 hours to obtain 4.5 g of a 4-carboxybenzalmalononitrile/N-vinylphthalimide copolymer (yield: 45%).

The number-average molecular weight of the obtained 4-carboxybenzalmalononitrile/N-vinylphthalimide copolymer was 13,000 in terms of standard pullulan.

In addition, by $^1$H-NMR measurement, the copolymer composition was confirmed as follows: 4-carboxybenzalmalononitrile residue unit/N-vinylphthalimide residue unit=35/65 (mol %) (residue unit A/residue unit B=0.54).

Synthesis Example 1 (Synthesis of Cinnamonitrile/Styrene Copolymer)

In a 50 mL glass ampoule were charged 5.0 g (0.039 mol) of cinnamonitrile, 4.1 g (0.039 mol) of styrene, and 0.28 g (0.00065 mol) of 2,5-dimethyl-2,5-di (2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 5.4 g of a cinnamonitrile/styrene copolymer (yield: 59%).

The number-average molecular weight of the obtained cinnamonitrile/styrene copolymer was 46,000 in terms of standard polystyrene.

In addition, by $^1$H-NMR measurement, the copolymer composition was confirmed as follows: cinnamonitrile residue unit/styrene residue unit=27/73 (mol %) (residue unit A/residue unit B=0.37).

Synthesis Example 2 (Synthesis of Ethyl α-Cyanocinnamate/Methyl Acrylate Copolymer)

In a 50 mL glass ampoule were charged 5.0 g (0.025 mol) of ethyl α-cyanocinnamate, 2.2 g (0.026 mol) of methyl acrylate, and 0.18 g (0.00042 mol) of 2,5-dimethyl-2,5-di (2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 2.5 g of an ethyl α-cyanocinnamate/methyl acrylate copolymer (yield: 35%).

The number-average molecular weight of the obtained ethyl α-cyanocinnamate/methyl acrylate copolymer was 13,000 in terms of standard polystyrene.

In addition, by $^1$H-NMR measurement, the copolymer composition was confirmed as follows: ethyl α-cyanocinnamate residue unit/methyl acrylate residue unit=11/89 (mol %) (residue unit A/residue unit B=0.12).

Synthesis Example 3 (Synthesis of Benzalmalononitrile/Styrene Copolymer)

In a 50 mL glass ampoule were charged 5.0 g (0.032 mol) of benzalmalononitrile, 3.3 g (0.032 mol) of styrene, and 0.23 g (0.00053 mol) of 2,5-dimethyl-2,5-di (2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 5.8 g of a benzalmalononitrile/styrene copolymer (yield: 70%).

The number-average molecular weight of the obtained benzalmalononitrile/styrene copolymer was 93,000 in terms of standard polystyrene.

In addition, by $^1$H-NMR measurement, the copolymer composition was confirmed as follows: benzalmalononitrile residue unit/styrene residue unit=36/64 (mol %) (residue unit A/residue unit B=0.56).

Synthesis Example 4 (Synthesis of Acrylonitrile/1-Vinylindole Copolymer)

In a 50 mL glass ampoule were charged 2.5 g (0.047 mol) of acrylonitrile, 6.7 g (0.047 mol) of 1-vinylindole, and 0.34 g (0.00079 mol) of 2,5-dimethyl-2,5-di (2-ethylhexanoylperoxy)hexane that was a polymerization initiator. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 4.9 g of an acrylonitrile/1-vinylindole copolymer (yield: 53%).

The number-average molecular weight of the obtained acrylonitrile/1-vinylindole copolymer was 12,000 in terms of standard polystyrene.

In addition, by $^1$H-NMR measurement, the copolymer composition was confirmed as follows: acrylonitrile residue unit/1-vinylindole residue unit=31/69 (mol %) (residue unit A/residue unit B=0.45).

Example 18

The cinnamonitrile/1-vinylindole copolymer obtained in Example 1 was dissolved in cyclopentanone to obtain a 35% by weight resin solution. The resin solution was cast on a glass substrate by means of a coater and dried at 60° C. for 60 minutes to obtain a 10.1 μm-thick film using the cinnamonitrile/1-vinylindole copolymer.

The obtained film had a total light transmittance of 87%, a haze of 0.6%, and a refractive index of 1.648.

The three-dimensional refractive index was as follows: nx=1.6421, ny=1.6421, and nz=1.6588, and the obtained film exhibited a large value of the refractive index in the thickness direction of the film, which is nx ny<nz. The out-of-plane retardation Rth was negatively as large as −169 nm. Further, the ratio of the absolute value of the out-of-plane retardation to the film thickness was 16.7 nm/film thickness (μm).

When the same film was measured one month later, the out-of-plane retardation was maintained, and thus the film was excellent in stability.

Example 19

The cinnamonitrile/9-vinylcarbazole copolymer obtained in Example 2 was dissolved in cyclopentanone to obtain a 30% by weight resin solution. The resin solution was cast on a glass substrate by means of a coater and dried at 60° C. for 60 minutes to obtain an 8.8 μm-thick film using the cinnamonitrile/9-vinylcarbazole copolymer.

The obtained film had a total light transmittance of 87%, a haze of 0.5%, and a refractive index of 1.655.

The three-dimensional refractive index was as follows: nx=1.6445, ny=1.6445, and nz=1.6774, and the obtained film exhibited a large value of the refractive index in the thickness direction of the film, which is nx-ny<nz. The out-of-plane retardation Rth was negatively as large as −290 nm. Further, the ratio of the absolute value of the out-of-plane retardation to the film thickness was 32.9 nm/film thickness (μm).

When the same film was measured one month later, the out-of-plane retardation was maintained, and thus the film was excellent in stability.

Example 20

The methyl α-cyanocinnamate/9-vinylcarbazole copolymer obtained in Example 3 was dissolved in cyclopentanone to obtain a 20% by weight resin solution. The resin solution was cast on a glass substrate by means of a coater and dried at 130° C. for 10 minutes to obtain a 12.2 μm-thick film using the methyl α-cyanocinnamate/9-vinylcarbazole copolymer.

The obtained film had a total light transmittance of 87%, a haze of 0.6%, and a refractive index of 1.653.

The three-dimensional refractive index was as follows: nx=1.6432, ny=1.6432, and nz=1.6740, and the obtained film exhibited a large value of the refractive index in the thickness direction of the film, which is nx-ny<nz. The out-of-plane retardation Rth was negatively as large as −376 nm. Further, the ratio of the absolute value of the out-of-plane retardation to the film thickness was 30.8 nm/film thickness (μm).

When the same film was measured one month later, the out-of-plane retardation was maintained, and thus the film was excellent in stability.

Example 21

The methyl α-cyanocinnamate/N-vinylsuccinimide copolymer obtained in Example 4 was dissolved in N,N-dimethylformamide to obtain a 30% by weight resin solution. The resin solution was cast on a glass substrate by means of a coater and vacuum-dried at 60° C. for 3 hours to obtain a 10.5 μm-thick film using the methyl α-cyanocinnamate/N-vinylsuccinimide copolymer.

The obtained film had a total light transmittance of 89%, a haze of 0.4%, and a refractive index of 1.575.

The three-dimensional refractive index was as follows: nx=1.5679, ny=1.5679, and nz=1.5881, and the obtained film exhibited a large value of the refractive index in the thickness direction of the film, which is nx-ny<nz. The out-of-plane retardation Rth was negatively as large as −212 nm. Further, the ratio of the absolute value of the out-of-plane retardation to the film thickness was 20.2 nm/film thickness (μm).

When the same film was measured one month later, the out-of-plane retardation was maintained, and thus the film was excellent in stability.

Example 22

The ethyl α-cyanocinnamate/N-vinylphthalimide copolymer obtained in Example 5 was dissolved in N,N-dimethylformamide to obtain a 20% by weight resin solution. The resin solution was cast on a glass substrate by means of a coater and vacuum-dried at 60° C. for 3 hours to obtain a 9.2 μm-thick film using the ethyl α-cyanocinnamate/N-vinylphthalimide copolymer.

The obtained film had a total light transmittance of 88%, a haze of 0.6%, and a refractive index of 1.613.

The three-dimensional refractive index was as follows: nx=1.6042, ny=1.6042, and nz=1.6310, and the obtained film exhibited a large value of the refractive index in the thickness direction of the film, which is nx-ny<nz. The out-of-plane retardation Rth was negatively as large as −247 nm. Further, the ratio of the absolute value of the out-of-plane retardation to the film thickness was 26.8 nm/film thickness (μm).

When the same film was measured one month later, the out-of-plane retardation was maintained, and thus the film was excellent in stability.

Example 23

The ethyl α-cyanocinnamate/2-vinylbenzofuran copolymer obtained in Example 6 was dissolved in toluene to obtain a 35% by weight resin solution. The resin solution was cast on a glass substrate by means of a coater and dried at 60° C. for 60 minutes to obtain an 8.8 μm-thick film using the ethyl α-cyanocinnamate/2-vinylbenzofuran copolymer.

The obtained film had a total light transmittance of 87%, a haze of 0.3%, and a refractive index of 1.634.

The three-dimensional refractive index was as follows: nx=1.6294, ny=1.6294, and nz=1.6438, and the obtained film exhibited a large value of the refractive index in the thickness direction of the film, which is nx ny<nz. The out-of-plane retardation Rth was negatively as large as −127 nm. Further, the ratio of the absolute value of the out-of-plane retardation to the film thickness was 14.4 nm/film thickness (μm).

When the same film was measured one month later, the out-of-plane retardation was maintained, and thus the film was excellent in stability.

Example 24

The n-propyl α-cyanocinnamate/2-vinylquinoline copolymer obtained in Example 7 was dissolved in cyclopentanone to obtain a 35% by weight resin solution. The resin solution was cast on a glass substrate by means of a coater and dried at 100° C. for 10 minutes to obtain a 11.0 μm-thick film using the n-propyl α-cyanocinnamate/2-vinylquinoline copolymer.

The obtained film had a total light transmittance of 88%, a haze of 0.3%, and a refractive index of 1.635.

The three-dimensional refractive index was as follows: nx=1.6291, ny=1.6291, and nz=1.6464, and the obtained film exhibited a large value of the refractive index in the thickness direction of the film, which is nx-ny<nz. The out-of-plane retardation Rth was negatively as large as −190 nm. Further, the ratio of the absolute value of the out-of-plane retardation to the film thickness was 17.3 nm/film thickness (μm).

When the same film was measured one month later, the out-of-plane retardation was maintained, and thus the film was excellent in stability.

Example 25

The benzalmalononitrile/N-vinylphthalimide copolymer obtained in Example 8 was dissolved in N,N-dimethylformamide to obtain a 20% by weight resin solution. The resin solution was cast on a glass substrate by means of a coater and vacuum-dried at 60° C. for 3 hours to obtain a 12.6 μm-thick film using the benzalmalononitrile/N-vinylphthalimide copolymer.

The obtained film had a total light transmittance of 87%, a haze of 0.5%, and a refractive index of 1.638.

The three-dimensional refractive index was as follows: nx=1.6301, ny=1.6301, and nz=1.6535, and the obtained film exhibited a large value of the refractive index in the thickness direction of the film, which is nx≈ny<nz. The out-of-plane retardation Rth was negatively as large as −295 nm. Further, the ratio of the absolute value of the out-of-plane retardation to the film thickness was 23.4 nm/film thickness (μm).

When the same film was measured one month later, the out-of-plane retardation was maintained, and thus the film was excellent in stability.

Example 26

The benzalmalononitrile/9-vinylcarbazole copolymer obtained in Example 9 was dissolved in tetrahydrofuran to obtain a 20% by weight resin solution. The resin solution was cast on a glass substrate by means of a coater and dried at 130° C. for 10 minutes to obtain a 11.8 μm-thick film using the benzalmalononitrile/9-vinylcarbazole copolymer.

The obtained film had a total light transmittance of 87%, a haze of 0.4%, and a refractive index of 1.652.

The three-dimensional refractive index was as follows: $nx=1.6410$, $ny=1.6410$, and $nz=1.6732$, and the obtained film exhibited a large value of the refractive index in the thickness direction of the film, which is nx ny<nz. The out-of-plane retardation Rth was negatively as large as −380 nm. Further, the ratio of the absolute value of the out-of-plane retardation to the film thickness was 32.2 nm/film thickness (μm).

When the same film was measured one month later, the out-of-plane retardation was maintained, and thus the film was excellent in stability.

Example 27

The 4-nitrobenzalmalononitrile/2-vinylbenzofuran copolymer obtained in Example 10 was dissolved in methyl ethyl ketone to obtain a 35% by weight resin solution. The resin solution was cast on a glass substrate by means of a coater and dried at 60° C. for 60 minutes to obtain a 9.8 μm-thick film using the 4-nitrobenzalmalononitrile/2-vinylbenzofuran copolymer.

The obtained film had a total light transmittance of 87%, a haze of 0.5%, and a refractive index of 1.642.

The three-dimensional refractive index was as follows: $nx=1.6357$, $ny=1.6357$, and $nz=1.6550$, and the obtained film exhibited a large value of the refractive index in the thickness direction of the film, which is nx-ny<nz. The out-of-plane retardation Rth was negatively as large as −189 nm. Further, the ratio of the absolute value of the out-of-plane retardation to the film thickness was 19.3 nm/film thickness (μm).

When the same film was measured one month later, the out-of-plane retardation was maintained, and thus the film was excellent in stability.

Example 28

The N,N-diethylcinnamamide/2-vinylfuran copolymer obtained in Example 11 was dissolved in cyclopentanone to obtain a 30% by weight resin solution. The resin solution was cast on a glass substrate by means of a coater and dried at 100° C. for 10 minutes to obtain a 12.2 μm-thick film using the N,N-diethylcinnamamide/2-vinylfuran copolymer.

The obtained film had a total light transmittance of 89%, a haze of 0.5%, and a refractive index of 1.577.

The three-dimensional refractive index was as follows: $nx=1.5741$, $ny=1.5741$, and $nz=1.5837$, and the obtained film exhibited a large value of the refractive index in the thickness direction of the film, which is nx-ny<nz. The out-of-plane retardation Rth was negatively as large as −117 nm. Further, the ratio of the absolute value of the out-of-plane retardation to the film thickness was 9.6 nm/film thickness (μm).

When the same film was measured one month later, the out-of-plane retardation was maintained, and thus the film was excellent in stability.

Example 29

The chalcone/2-vinylquinoline copolymer obtained in Example 12 was dissolved in cyclopentanone to obtain a 35% by weight resin solution. The resin solution was cast on a glass substrate by means of a coater and dried at 100° C. for 10 minutes to obtain a 7.9 μm-thick film using the chalcone/2-vinylquinoline copolymer.

The obtained film had a total light transmittance of 87%, a haze of 0.6%, and a refractive index of 1.651.

The three-dimensional refractive index was as follows: $nx=1.6476$, $ny=1.6476$, and $nz=1.6568$, and the obtained film exhibited a large value of the refractive index in the thickness direction of the film, which is nx-ny<nz. The out-of-plane retardation Rth was negatively as large as −73 nm. Further, the ratio of the absolute value of the out-of-plane retardation to the film thickness was 9.2 nm/film thickness (μm).

When the same film was measured one month later, the out-of-plane retardation was maintained, and thus the film was excellent in stability.

Example 30

The methyl α-cyanocinnamate/9-vinylcarbazole copolymer obtained in Example 13 was dissolved in cyclopentanone to obtain a 30% by weight resin solution. The resin solution was cast on a glass substrate by means of a coater and dried at 130° C. for 10 minutes to obtain a 11.9 μm-thick film using the methyl α-cyanocinnamate/9-vinylcarbazole copolymer.

The obtained film had a total light transmittance of 87%, a haze of 0.3%, and a refractive index of 1.650.

The three-dimensional refractive index was as follows: $nx=1.6431$, $ny=1.6431$, and $nz=1.6650$, and the obtained film exhibited a large value of the refractive index in the thickness direction of the film, which is nx ny<nz. The out-of-plane retardation Rth was negatively as large as −261 nm. Further, the ratio of the absolute value of the out-of-plane retardation to the film thickness was 21.9 nm/film thickness (μm).

When the same film was measured one month later, the out-of-plane retardation was maintained, and thus the film was excellent in stability.

Example 31

The isobutyl 4-hydroxy-α-cyanocinnamate/9-vinylcarbazole copolymer obtained in Example 14 was dissolved in ethyl acetate to obtain a 30% by weight resin solution. The resin solution was cast on a glass substrate by means of a coater and dried at 100° C. for 10 minutes to obtain a 12.4 μm-thick film using the isobutyl 4-hydroxy-α-cyanocinnamate/9-vinylcarbazole copolymer.

The obtained film had a total light transmittance of 88%, a haze of 0.5%, and a refractive index of 1.613.

The three-dimensional refractive index was as follows: $nx=1.6060$, $ny=1.6060$, and $nz=1.6270$, and the obtained film exhibited a large value of the refractive index in the thickness direction of the film, which is nx≈ny<nz. The out-of-plane retardation Rth was negatively as large as −260 nm. Further, the ratio of the absolute value of the out-of-plane retardation to the film thickness was 21.0 nm/film thickness (μm).

When the same film was measured one month later, the out-of-plane retardation was maintained, and thus the film was excellent in stability.

Example 32

The ethyl α-cyano-4-hydroxycinnamate/9-vinylcarbazole copolymer obtained in Example 15 was dissolved in tetrahydrofuran and the solution was cast on a glass substrate by means of a coater and vacuum-dried at 60° C. for 10 hours to obtain a 15.2 μm-thick film using the ethyl α-cyano-4-hydroxycinnamate/9-vinylcarbazole copolymer.

The obtained film had a total light transmittance of 87%, a haze of 0.4%, and a refractive index of 1.689.

The three-dimensional refractive index was as follows: nx=1.681, ny=1.681, and nz=1.704, and the obtained film exhibited a large value of the refractive index in the thickness direction of the film, which is nx≈ny<nz. The out-of-plane retardation Rth was negatively as large as −350 nm. Further, the ratio of the absolute value of the out-of-plane retardation to the film thickness was 23.0 nm/film thickness (μm).

Into 10 g of tetrahydrofuran were dissolved 0.5 g of the obtained ethyl α-cyano-4-hydroxycinnamate/9-vinylcarbazole copolymer and 0.5 g of polymethyl methacrylate (manufactured by Tokyo Chemical Industry Co., Ltd., number-average molecular weight: 270,000). The solution was applied on a glass substrate by means of a spin coater and vacuum-dried at 60° C. for 10 hours to form a good film having a haze of 0.7%, and therefore the ethyl α-cyano-4-hydroxycinnamate/9-vinylcarbazole copolymer was a polymer excellent in compatibility.

Example 33

Into 4 g of tetrahydrofuran were dissolved 0.5 g of the 4-hydroxybenzalmalononitrile/2-vinylnaphthalene copolymer obtained in Example 16 and 0.5 g of polyethylene glycol (manufactured by Tokyo Kasei Co., Ltd., number-average molecular weight: 3,000). The solution was applied on a glass substrate by spin coating and vacuum-dried at 60° C. for 10 hours to obtain a 12.4 μm-thick film using the 4-hydroxybenzalmalononitrile/2-vinylnaphthalene copolymer.

The obtained film had a total light transmittance of 86%, a haze of 0.4%, and a refractive index of 1.645.

The three-dimensional refractive index was as follows: nx=1.634, ny=1.633, and nz=1.668, and the obtained film exhibited a large value of the refractive index in the thickness direction of the film, which is nx-ny<nz. The out-of-plane retardation Rth was negatively as large as −425 nm. Further, the ratio of the absolute value of the out-of-plane retardation to the film thickness was 34.3 nm/film thickness (μm).

Into 9 g of cyclohexanone were dissolved 0.8 g of the obtained 4-hydroxybenzalmalononitrile/2-vinylnaphthalene copolymer and 0.2 g of polymethyl methacrylate (manufactured by Tokyo Chemical Industry Co., Ltd., number-average molecular weight: 270,000). The solution was applied on a glass substrate by means of a spin coater and vacuum-dried at 100° C. for 10 hours to form a good film having a haze of 0.8%, and therefore the 4-hydroxybenzalmalononitrile/2-vinylnaphthalene copolymer was a polymer excellent in compatibility.

Example 34

The 4-carboxybenzalmalononitrile/N-vinylphthalimide copolymer obtained in Example 17 was dissolved in N,N-dimethylformamide and the solution was applied on a glass substrate by spin coating and vacuum-dried at 60° C. for 180 minutes to obtain a 13.0 μm-thick film using the 4-carboxybenzalmalononitrile/N-vinylphthalimide copolymer.

The obtained film had a total light transmittance of 87%, a haze of 0.5%, and a refractive index of 1.633.

The three-dimensional refractive index was as follows: nx=1.626, ny=1.626, and nz=1.647, and the obtained film exhibited a large value of the refractive index in the thickness direction of the film, which is nx-ny<nz. The out-of-plane retardation Rth was negatively as large as −274 nm. Further, the ratio of the absolute value of the out-of-plane retardation to the film thickness was 21.1 nm/film thickness (μm).

Into 4 g of N,N-dimethylformamide were dissolved 0.7 g of the obtained 4-carboxybenzalmalononitrile/N-vinylphthalimide copolymer and 0.3 g of polyvinyl acetate (manufactured by Aldrich, number-average molecular weight: 53,000). The solution was applied on a glass substrate by means of a spin coater and vacuum-dried at 60° C. for 10 hours to form a good film having a haze of 0.8%, and therefore the 4-carboxybenzalmalononitrile/N-vinylphthalimide copolymer was a polymer excellent in compatibility.

Example 35 (Polymerization of 4-Carboxybenzalmalononitrile/1-Vinylindole Copolymer and Preparation of Optical Compensation Film Using Resin Composition Containing the Copolymer)

In a glass ampoule having a volume of 50 mL were charged 5.0 g of 4-carboxybenzalmalononitrile, 3.6 g of 1-vinylindole, 0.18 g of 2,5-dimethyl-2,5-di(2-ethylhexanoylperoxy)hexane that was a polymerization initiator, and 8.5 g of N,N-dimethylformamide. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 5.0 g of a 4-carboxybenzalmalononitrile/1-vinylindole copolymer (yield: 58%).

The number-average molecular weight of the obtained 4-carboxybenzalmalononitrile/1-vinylindole copolymer was 23,000 in terms of standard polystyrene.

In addition, by CHN elemental analysis, the copolymer composition was confirmed as follows: 4-carboxybenzalmalononitrile residue unit/1-vinylindole residue unit=33/67 (mol %) (residue unit A/residue unit B=0.49).

Then, 1.5 g of the obtained 4-carboxybenzalmalononitrile/1-vinylindole copolymer and 10 g of cellulose acetate butyrate as a resin having positive intrinsic birefringence (molecular weight Mn=72,000, acetyl group=15 mol %, butyryl group=70 mol %, total degree of substitution DS=2.55) were dissolved into a solution of toluene/methyl ethyl ketone=6/4 (weight ratio) to obtain a 15% by weight resin solution. The resin solution was cast on a polyethylene terephthalate film by means of a coater. After two-stage drying at a temperature of 40° C. and then at 15° C., a film having a width of 150 mm was obtained (ethyl cellulose: 87% by weight, 4-carboxybenzalmalononitrile/1-vinylindole copolymer: 13% by weight). The obtained film was cut into 50 mm square, and uniaxially stretched at 140° C. by 1.8 times (thickness after stretching: 80 μm).

The total light transmittance, haze, retardation characteristics, and wavelength dispersion characteristics of the obtained optical compensation film were measured. Table 1 shows the results.

TABLE 1

| | Total light transmittance (%) | Haze (%) | Re (nm) | Rth (nm) | Nz coefficient | Re(450)/Re(550) |
|---|---|---|---|---|---|---|
| Example 35 | 91 | 0.5 | 315 | −30 | 0.40 | 0.89 |
| Example 36 | 90 | 0.5 | 293 | 16 | 0.56 | 0.79 |
| Example 37 | 90 | 0.6 | 248 | 24 | 0.60 | 0.81 |
| Example 38 | 90 | 0.6 | 299 | −1 | 0.50 | 0.89 |
| Example 39 | 91 | 0.4 | 301 | 25 | 0.58 | 0.82 |
| Example 40 | 91 | 0.5 | 301 | −13 | 0.46 | 0.85 |
| Example 41 | 88 | 0.6 | 243 | −32 | 0.37 | 0.87 |

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Example 36 (Polymerization of Ethyl 4-Hydroxy-α-Cyanocinnamate/9-Vinylcarbazole Copolymer and Preparation of Optical Compensation Film Using Resin Composition Containing the Copolymer)

In a glass ampoule having a volume of 50 mL were charged 5.0 g of ethyl 4-hydroxy-α-cyanocinnamate, 4.4 g of 9-vinylcarbazole, 0.17 g of 2,5-dimethyl-2,5-di(2-ethylhexanoylperoxy)hexane that was a polymerization initiator, and 8.5 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 7.7 g of an ethyl 4-hydroxy-α-cyanocinnamate/9-vinylcarbazole copolymer (yield: 82%).

The number-average molecular weight of the obtained ethyl 4-hydroxy-α-cyanocinnamate/9-vinylcarbazole copolymer was 22,000 in terms of standard polystyrene.

In addition, by $^1$H-NMR measurement, the copolymer composition was confirmed as follows: ethyl 4-hydroxy-α-cyanocinnamate residue unit/9-vinylcarbazole residue unit=42/58 (mol %) (residue unit A/residue unit B=0.89).

Then, 1.5 g of the obtained ethyl 4-hydroxy-α-cyanocinnamate/9-vinylcarbazole copolymer and 10 g of ethyl cellulose as a resin having positive intrinsic birefringence (ETHOCEL standard 100 manufactured by Dow Chemical Company, molecular weight Mn=55,000, molecular weight Mw=176,000, Mw/Mn=3.2, total degree of substitution DS=2.5) were dissolved into a solution of toluene/ethyl acetate=4/6 (weight ratio) to obtain a 15 wt % resin solution, which was cast on a polyethylene terephthalate film by means of a coater. After two-stage drying at a temperature of 40° C. and then at 150° C., a film having a width of 150 mm was obtained (ethyl cellulose: 87% by weight, ethyl 4-hydroxy-α-cyanocinnamate/9-vinylcarbazole copolymer: 13% by weight). The obtained film was cut into 50 mm square, and uniaxially stretched at 145° C. by 1.5 times (thickness after stretching: 40 μm).

The total light transmittance, haze, retardation characteristics, and wavelength dispersion characteristics of the obtained optical compensation film were measured. Table 1 collectively shows the results.

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Example 37 (Polymerization of 4-Hydroxybenzalmalononitrile/2-Vinylnaphthalene Copolymer and Preparation of Optical Compensation Film Using Resin Composition Containing the Copolymer)

In a glass ampoule having a volume of 50 mL were charged 5.0 g of 4-hydroxybenzalmalononitrile, 4.5 g of 2-vinylnaphthalene, 0.21 g of 2,5-dimethyl-2,5-di(2-ethylhexanoylperoxy)hexane that was a polymerization initiator, and 10 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 6.2 g of a 4-hydroxybenzalmalononitrile/2-vinylnaphthalene copolymer (yield: 65%).

The number-average molecular weight of the obtained 4-hydroxybenzalmalononitrile/2-vinylnaphthalene copolymer was 12,000 in terms of standard polystyrene.

In addition, by CHN elemental analysis, the copolymer composition was confirmed as follows: 4-hydroxybenzalmalononitrile residue unit/2-vinylnaphthalene residue unit=43/57 (mol %) (residue unit A/residue unit B=0.75).

Then, 2.0 g of the obtained 4-hydroxybenzalmalononitrile/2-vinylnaphthalene copolymer and 10 g of ethyl cellulose as a resin having positive intrinsic birefringence (ETHOCEL standard 100 manufactured by Dow Chemical Company, molecular weight Mn=55,000, molecular weight Mw=176,000, Mw/Mn=3.2, total degree of substitution DS=2.5) were dissolved into a solution of toluene/ethyl acetate=4/6 (weight ratio) to obtain a 15% by weight resin solution. The resin solution was cast on a polyethylene terephthalate film by means of a coater. After two-stage drying at a temperature of 40° C. and then at 150° C., a film having a width of 150 mm was obtained (ethyl cellulose: 83% by weight, 4-hydroxybenzalmalononitrile/2-vinylnaphthalene copolymer: 17% by weight). The obtained film was cut into 50 mm square, and uniaxially stretched at 140° C. by 1.3 times (thickness after stretching: 40 μm).

The total light transmittance, haze, retardation characteristics, and wavelength dispersion characteristics of the obtained optical compensation film were measured. Table 1 collectively shows the results.

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Example 38 (Polymerization of Isobutyl 4-Hydroxy-α-Cyanocinnamate/N-Vinylsuccinimide Copolymer)

In a glass ampoule having a volume of 50 mL were charged 5.0 g of isobutyl 4-hydroxy-α-cyanocinnamate, 2.6 g of N-vinylsuccinimide, 0.15 g of 2,5-dimethyl-2,5-di(2-ethylhexanoylperoxy)hexane that was a polymerization initiator, and 8.5 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of N,N-dimethylformamide. The polymer solution was added dropwise into 500 mL of methanol for precipitation, and then vacuum drying was performed at 60° C. for 10 hours to obtain 5.5 g of an isobutyl 4-hydroxy-α-cyanocinnamate/N-vinylsuccinimide copolymer (yield: 73%).

The number-average molecular weight of the obtained isobutyl 4-hydroxy-α-cyanocinnamate/N-vinylsuccinimide copolymer was 16,000 in terms of standard pullulan.

In addition, by $^1$H-NMR measurement, the copolymer composition was confirmed as follows: isobutyl 4-hydroxy-α-cyanocinnamate residue unit/N-vinylsuccinimide residue unit=46/54 (mol %) (residue unit A/residue unit B=0.85).

Then, 2.0 g of the obtained isobutyl 4-hydroxy-α-cyanocinnamate/N-vinylsuccinimide copolymer and 10 g of cellulose acetate propionate as a resin having positive intrinsic birefringence (molecular weight Mn=75,000, acetyl group=5 mol %, propionyl group=80 mol %, total degree of substitution DS=2.55) were dissolved into a solution of toluene/methyl ethyl ketone=6/4 (weight ratio) to obtain a 15% by weight resin solution. The resin solution was cast on a polyethylene terephthalate film by means of a coater. After two-stage drying at a temperature of 40° C. and then at 150° C., a film having a width of 150 mm was obtained (ethyl cellulose: 83% by weight, isobutyl 4-hydroxy-α-cyanocinnamate/N-vinylsuccinimide copolymer: 17% by weight). The obtained film was cut into 50 mm square, and uniaxially stretched at 140° C. by 1.7 times (thickness after stretching: 60 μm).

The total light transmittance, haze, retardation characteristics, and wavelength dispersion characteristics of the obtained optical compensation film were measured. Table 1 collectively shows the results.

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Example 39 (Polymerization of Ethyl 3,4-Dihydroxy-α-Cyanocinnamate/N-Vinylphthalimide Copolymer)

In a glass ampoule having a volume of 50 mL were charged 5.0 g of ethyl 3,4-dihydroxy-α-cyanocinnamate, 3.7 g of N-vinylphthalimide, 0.15 g of 2,5-dimethyl-2,5-di(2-ethylhexanoylperoxy)hexane that was a polymerization initiator, and 8.5 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of N,N-dimethylformamide. The polymer solution was added dropwise into 500 mL of methanol for precipitation, and then vacuum drying was performed at 60° C. for 10 hours to obtain 6.4 g of an ethyl 3,4-dihydroxy-α-cyanocinnamate/N-vinylphthalimide copolymer (yield: 73%).

The number-average molecular weight of the obtained ethyl 3,4-dihydroxy-α-cyanocinnamate/N-vinylphthalimide copolymer was 21,000 in terms of standard pullulan.

In addition, by $^1$H-NMR measurement, the copolymer composition was confirmed as follows: ethyl 3,4-dihydroxy-α-cyanocinnamate residue unit/N-vinylphthalimide residue unit=41/59 (mol %) (residue unit A/residue unit B=0.69).

Then, 1.5 g of the obtained ethyl 3,4-dihydroxy-α-cyanocinnamate/N-vinylphthalimide copolymer and 10 g of ethyl cellulose as a resin having positive intrinsic birefringence (ETHOCEL standard 100 manufactured by Dow Chemical Company, molecular weight Mn=55,000, molecular weight Mw=176,000, Mw/Mn=3.2, total degree of substitution DS=2.5) were dissolved into a solution of toluene/ethyl acetate=6/4 (weight ratio) to obtain a 15% by weight resin solution. The resin solution was cast on a polyethylene terephthalate film by means of a coater. After two-stage drying at a temperature of 40° C. and then at 150° C., a film having a width of 150 mm was obtained (ethyl cellulose: 87% by weight, ethyl 3,4-dihydroxy-α-cyanocinnamate/N-vinylphthalimide copolymer: 13% by weight). The obtained film was cut into 50 mm square, and uniaxially stretched at 145° C. by 1.5 times (thickness after stretching: 40 μm).

The total light transmittance, haze, retardation characteristics, and wavelength dispersion characteristics of the obtained optical compensation film were measured. Table 1 collectively shows the results.

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Example 40 (Polymerization of 4-Carboxy-3-Hydroxybenzalmalononitrile/2-Vinylfuran Copolymer)

In a glass ampoule having a volume of 75 mL were charged 15 g of 4-carboxy-3-hydroxybenzalmalononitrile, 6.6 g of 2-vinylfuran, 0.50 g of 2,5-dimethyl-2,5-di(2-ethylhexanoylperoxy)hexane that was a polymerization initiator, and 30 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 75 g of tetrahydrofuran. The polymer solution was added dropwise into 1,500 mL of methanol for precipitation, and then vacuum drying was performed at 60° C. for 10 hours to obtain 12.6 g of a 4-carboxy-3-hydroxybenzalmalononitrile/2-vinylfuran copolymer (yield: 58%).

The number-average molecular weight of the obtained 4-carboxy-3-hydroxybenzalmalononitrile/2-vinylfuran copolymer was 15,000 in terms of standard polystyrene.

In addition, by CHN elemental analysis, the copolymer composition was confirmed as follows: 4-carboxy-3-hydroxybenzalmalononitrile residue unit/2-vinylfuran residue unit=36/64 (mol %) (residue unit A/residue unit B=0.56).

Then, 2.0 g of the obtained 4-carboxy-3-hydroxybenzalmalononitrile/2-vinylfuran copolymer and 10 g of ethyl cellulose as a resin having positive intrinsic birefringence (ETHOCEL standard 100 manufactured by Dow Chemical Company, molecular weight Mn=55,000, molecular weight Mw=176,000, Mw/Mn=3.2, total degree of substitution DS=2.5) were dissolved into a solution of toluene/ethyl acetate=6/4 (weight ratio) to obtain a 15% by weight resin solution. The resin solution was cast on a polyethylene terephthalate film by means of a coater. After two-stage drying at a temperature of 40° C. and then at 150° C., a film having a width of 150 mm was obtained (ethyl cellulose: 83% by weight, 4-carboxy-3-hydroxybenzalmalononitrile/2-vinylfuran copolymer: 17% by weight). The obtained film was cut into 50 mm square, and uniaxially stretched at 140° C. by 1.2 times (thickness after stretching: 40 μm).

The total light transmittance, haze, retardation characteristics, and wavelength dispersion characteristics of the obtained optical compensation film were measured. Table 1 collectively shows the results.

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Example 41 (Polymerization of Isobutyl 4-Hydroxy-α-Cyanocinnamate/9-Vinylcarbazole Copolymer)

In a glass ampoule having a volume of 50 mL were charged 5.0 g of isobutyl 4-hydroxy-α-cyanocinnamate, 3.9 g of 9-vinylcarbazole, 0.14 g of 2,5-dimethyl-2,5-di(2-ethylhexanoylperoxy)hexane that was a polymerization initiator, and 8.0 g of tetrahydrofuran. After nitrogen substitution and pressure reduction were repeated, the ampoule was melt-sealed in a reduced pressure state. The ampoule was placed in a thermostatic chamber at 62° C. and held for 48 hours to perform radical polymerization. After completion of the polymerization reaction, a polymerized product was taken out of the ampoule and dissolved in 25 g of tetrahydrofuran. The polymer solution was added dropwise into 500 mL of methanol for precipitation, and then vacuum drying was performed at 60° C. for 10 hours to obtain 7.5 g of an isobutyl 4-hydroxy-α-cyanocinnamate/9-vinylcarbazole copolymer (yield: 85%).

The number-average molecular weight of the obtained isobutyl 4-hydroxy-α-cyanocinnamate/9-vinylcarbazole copolymer was 12,000 in terms of standard polystyrene.

In addition, by CHN elemental analysis, the copolymer composition was confirmed as follows: isobutyl 4-hydroxy-α-cyanocinnamate residue unit/9-vinylcarbazole residue unit=46/54 (mol %) (residue unit A/residue unit B=0.85).

Then, 2.0 g of the obtained isobutyl 4-hydroxy-α-cyanocinnamate/9-vinylcarbazole copolymer and 10 g of ethyl cellulose as a resin having positive intrinsic birefringence (ETHOCEL standard 100 manufactured by Dow Chemical Company, molecular weight Mn=55,000, molecular weight Mw=176,000, Mw/Mn=3.2, total degree of substitution DS=2.5) were dissolved into a solution of toluene/ethyl acetate=6/4 (weight ratio) to obtain a 15% by weight resin solution. The resin solution was cast on a polyethylene terephthalate film by means of a coater. After two-stage drying at a temperature of 40° C. and then at 150° C., a film having a width of 150 mm was obtained (ethyl cellulose: 83% by weight, isobutyl 4-hydroxy-α-cyanocinnamate/9-vinylcarbazole copolymer: 17% by weight). The obtained film was cut into 50 mm square, and uniaxially stretched at 150° C. by 1.5 times (thickness after stretching: 40 μm).

The total light transmittance, haze, retardation characteristics, and wavelength dispersion characteristics of the obtained optical compensation film were measured. Table 1 collectively shows the results.

The obtained optical compensation film had high light transmittance, excellent transparency, small haze, and objective optical characteristics of the in-plane retardation (Re), the wavelength dispersion characteristics (Re (450)/Re (550)), and the Nz coefficient.

Comparative Example 1

The cinnamonitrile/styrene copolymer obtained in Synthesis Example 1 was dissolved in methyl ethyl ketone to obtain a 30% by weight resin solution. The resin solution was cast on a glass substrate by means of a coater and dried at 60° C. for 60 minutes to obtain a 12.5 μm-thick film.

The obtained film had a total light transmittance of 88%, a haze of 0.5%, and a refractive index of 1.604.

The three-dimensional refractive index was as follows: nx=1.6021, ny=1.6021, and nz=1.6065, and the obtained film exhibited a large value of the refractive index in the thickness direction of the film, which is nx=ny<nz, but the out-of-plane retardation Rth was as small as −55 nm and the ratio of the absolute value of the out-of-plane retardation to the film thickness was also as small as 4.4 nm/film thickness (μm).

From these results, the obtained film had negative birefringence and a large refractive index in the thickness direction, but the out-of-plane retardation was small and retardation characteristics were poor in a thin film state.

Comparative Example 2

The ethyl α-cyanocinnamate/methyl acrylate copolymer obtained in Synthesis Example 2 was dissolved in cyclopentanone to obtain a 30% by weight resin solution. The resin solution was cast on a glass substrate by means of a coater and dried at 100° C. for 10 minutes to obtain a 9.5 μm-thick film.

The obtained film had a total light transmittance of 88%, a haze of 0.3%, and a refractive index of 1.597.

The three-dimensional refractive index was as follows: nx=1.5951, ny=1.5951, and nz=1.6001, and the obtained film exhibited a large value of the refractive index in the thickness direction of the film, which is nx=ny<nz, but the out-of-plane retardation Rth was as small as −48 nm and the ratio of the absolute value of the out-of-plane retardation to the film thickness was also as small as 5.0 nm/film thickness (μm).

From these results, the obtained film had negative birefringence and a large refractive index in the thickness direction, but the out-of-plane retardation was small and retardation characteristics were poor in a thin film state.

Comparative Example 3

The benzalmalononitrile/styrene copolymer obtained in Synthesis Example 3 was dissolved in methyl ethyl ketone to obtain a 20% by weight resin solution. The resin solution was cast on a glass substrate by means of a coater and dried at 100° C. for 10 minutes to obtain a 9.1 m-thick film.

The obtained film had a total light transmittance of 88%, a haze of 0.5%, and a refractive index of 1.623.

The three-dimensional refractive index was as follows: nx=1.6213, ny=1.6213, and nz=1.6270, and the obtained film exhibited a large value of the refractive index in the thickness direction of the film, which is nx=ny<nz, but the out-of-plane retardation Rth was as small as −52 nm and the ratio of the absolute value of the out-of-plane retardation to the film thickness was also as small as 5.7 nm/film thickness (μm).

From these results, the obtained film had negative birefringence and a large refractive index in the thickness direction, but the out-of-plane retardation was small and retardation characteristics were poor in a thin film state.

Comparative Example 4

The acrylonitrile/1-vinylindole copolymer obtained in Synthesis Example 4 was dissolved in cyclopentanone to obtain a 30% by weight resin solution. The resin solution was cast on a glass substrate by means of a coater and dried at 100° C. for 10 minutes to obtain an 8.3 μm-thick film.

The obtained film had a total light transmittance of 87%, a haze of 0.4%, and a refractive index of 1.630.

The three-dimensional refractive index was as follows: nx=1.6291, ny=1.6291, and nz=1.6331, and the obtained film exhibited a large value of the refractive index in the thickness direction of the film, which is nx=ny<nz, but the out-of-plane retardation Rth was as small as −33 nm and the ratio of the absolute value of the out-of-plane retardation to the film thickness was also as small as 4.0 nm/film thickness (μm).

From these results, the obtained film had negative birefringence and a large refractive index in the thickness direction, but the out-of-plane retardation was small and retardation characteristics were poor in a thin film state.

Comparative Example 5

Poly(9-vinylcarbazole) (number-average molecular weight: 264,000, manufactured by Tokyo Kasei Co., Ltd.) was dissolved in cyclopentanone to obtain a 15% by weight resin solution. The resin solution was cast on a glass substrate by means of a coater and dried at 100° C. for 10 minutes to obtain a 13.2 μm-thick film using the poly(9-vinylcarbazole).

The obtained film had a total light transmittance of 87%, a haze of 0.6%, and a refractive index of 1.685.

The three-dimensional refractive index was as follows: nx=1.6785, ny=1.6785, and nz=1.6990, and the obtained film exhibited a large value of the refractive index in the thickness direction of the film, which is nx=ny<nz. The out-of-plane retardation Rth was negatively as large as −271 nm. Further, the ratio of the absolute value of the out-of-plane retardation to the film thickness was 20.5 nm/film thickness (μm).

From these results, the obtained film had negative birefringence and a large refractive index in the thickness direction. Further, the out-of-plane retardation was negatively large and the film had high retardation even in a thin film state. However, when the same film was again measured after 5 days, the three-dimensional refractive index was as follows: nx=1.6849, ny=1.6849, and nz=1.6866, and thus the film exhibited a large value of the refractive index in the thickness direction of the film, which is nx=ny<nz. However, the out-of-plane retardation Rth and the ratio of the absolute value of the out-of-plane retardation to the film thickness were greatly decreased to −22 nm and 1.7 nm/film thickness (μm), respectively, so that the film was not suitable for a retardation film because of its poor stability.

The entire contents of the description, claims, and abstract of Japanese Patent Application No. 2016-237864 filed on Dec. 7, 2016, Japanese Patent Application No. 2017-137230 filed on Jul. 13, 2017, Japanese Patent Application No. 2017-137231 filed on Jul. 13, 2017, Japanese Patent Application No. 2017-222844 filed on Nov. 20, 2017, and Japanese Patent Application No. 2017-223986 filed on Nov. 21, 2017 are incorporated herein by reference and incorporated as a disclosure of the description of the present invention.

The invention claimed is:

1. A copolymer, comprising:
a residue unit A of formula (1); and
a residue unit B of formula (2):

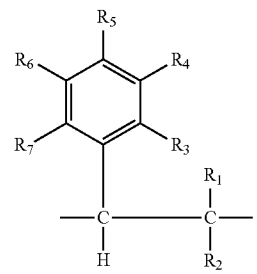

wherein $R_1$ and $R_2$ each independently represent hydrogen provided that the case where $R_1$ and $R_2$ are both hydrogen is excluded, a cyano group, an ester group (—C(=O)O$X_1$), an amide group (—C(=O)N($X_2$)($X_3$)), or an acyl group (—C(=O)$X_4$), where $X_1$ to $X_3$ each independently represent a linear alkyl group having 1 to 12 carbon atoms, a branched alkyl group having 1 to 12 carbon atoms, or a cyclic alkyl group having 3 to 6 carbon atoms, and $X_4$ represents a linear alkyl group having 1 to 12 carbon atoms, a branched alkyl group having 1 to 12 carbon atoms, or a cyclic group having 3 to 14 carbon atoms;

$R_3$ to $R_7$ each independently represent hydrogen, a linear alkyl group having 1 to 12 carbon atoms, a branched alkyl group having 1 to 12 carbon atoms, a cyclic group having 3 to 14 carbon atoms, a halogen, a hydroxy group, a carboxy group, a nitro group, a cyano group, an alkoxy group (—O$X_5$), an ester group (—C(=O)O$X_6$), an amide group (—C(=O)N($X_7$)($X_8$)), an acyl group (—C(=O)$X_9$), an amino group (—N($X_{10}$)($X_{11}$)), or a sulfonyl group (—SOO$X_{12}$), where $X_5$ to $X_8$ each independently represent a linear alkyl group having 1 to 12 carbon atoms, a branched alkyl group having 1 to 12 carbon atoms, or a cyclic alkyl group having 3 to 6 carbon atoms, and $X_9$ to $X_{12}$ each independently represent hydrogen, a linear alkyl group having 1 to 12 carbon atoms, a branched alkyl group having 1 to 12 carbon atoms, or a cyclic alkyl group having 3 to 6 carbon atoms;

at least one of $R_3$ to $R_7$ is a hydroxy group; and
adjacent substituents among $R_3$ to $R_7$ may form a fused ring structure each other,

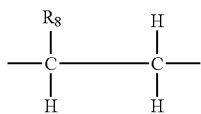

(2)

wherein $R_8$ represents an m-membered heterocyclic residue including one or more heteroatoms or a 5-membered or 6-membered ring residue containing no heteroatom, and m represents an integer of 5 to 10; and the m-membered heterocyclic residue, the 5-membered ring residue, and the 6-membered ring residue may form a fused ring structure with another cyclic structure.

2. The copolymer according to claim 1, wherein $R_1$ is selected from the group consisting of a cyano group, an ester group, an amide group, and an acyl group.

3. The copolymer according to claim 1, wherein $R_2$ is a cyano group.

4. The copolymer according to claim 1, wherein $R_8$ is a 5-membered heterocyclic residue or a 6-membered heterocyclic residue including at least one nitrogen atom or oxygen atom as a heteroatom, and the 5-membered heterocyclic residue and the 6-membered heterocyclic residue may form a fused ring structure with another cyclic structure.

5. The copolymer according to claim 1, wherein the residue unit A of the formula (1) is at least one selected from the group consisting of an α-cyanocinnamate ester residue unit, a benzalmalononitrile residue unit, a nitrobenzalmalononitrile residue unit, a cinnamonitrile residue unit, a chalcone residue unit, an alkoxychalcone residue unit, a benzylidenemalonate diester residue unit, and an N,N-dialkylcinnamamide residue unit.

6. The copolymer according to claim 1,
wherein the residue unit B is a residue unit of formula (3) and/or a residue unit of formula (4):

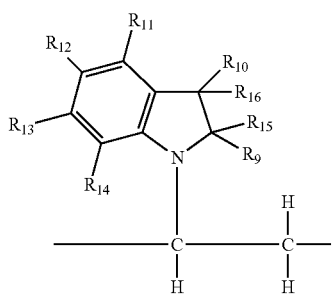

(3)

wherein $R_9$ to $R_{16}$ each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group ($-OX_{13}$), an ester group ($-C(=O)OX_{14}$ or $-CO(=O)-X_{15}$), an amide group ($-C(=O)N(X_{16})(X_{17})$ or $-NX_{18}C(=O)X_{19}$), an acyl group ($-C(=O)X_{20}$), or an amino group ($-N(X_{21})(X_{22})$), where $X_{13}$ to $X_{15}$ each independently represent a linear alkyl group having 1 to 12 carbon atoms, a branched alkyl group having 1 to 12 carbon atoms, or a cyclic group having 3 to 14 carbon atoms, $X_{16}$ to $X_{22}$ each independently represent hydrogen, a linear alkyl group having 1 to 12 carbon atoms, a branched alkyl group having 1 to 12 carbon atoms, or a cyclic group having 3 to 14 carbon atoms;

adjacent substituents among $R_9$ to $R_{16}$ may form a fused ring structure each other; and $R_9$ and $R_{15}$, and, $R_{10}$ and $R_{16}$ may consist of the same atoms and may form a ring structure,

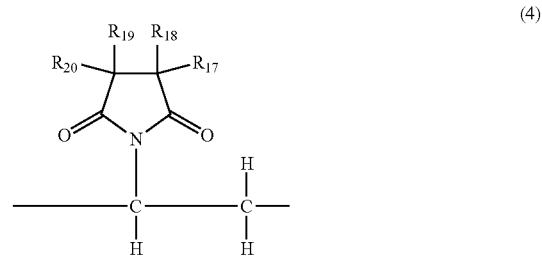

(4)

wherein $R_{17}$ to $R_{20}$ each independently represent hydrogen, a halogen, a linear alkyl group having 1 to 12 carbon atoms, a branched alkyl group having 1 to 12 carbon atoms, a cyclic group having 3 to 14 carbon atoms, a cyano group, a nitro group, a hydroxy group, a carboxy group, a thiol group, an alkoxy group ($-OX_{23}$), an ester group ($-C(=O)OX_{24}$ or $-CO(=O)-X_{25}$), an amide group ($-C(=O)N(X_{26})(X_{27})$ or $-NX_{28}C(=O)X_{29}$), an acyl group ($-C(=O)X_{30}$), or an amino group ($-N(X_{31})(X_{32})$), where $X_{23}$ to $X_{25}$ each independently represent a linear alkyl group having 1 to 12 carbon atoms, a branched alkyl group having 1 to 12 carbon atoms, or a cyclic group having 3 to 14 carbon atoms, $X_{26}$ to $X_{32}$ each independently represent hydrogen, a linear alkyl group having 1 to 12 carbon atoms, a branched alkyl group having 1 to 12 carbon atoms, or a cyclic group having 3 to 14 carbon atoms;

adjacent substituents among $R_{17}$ to $R_{20}$ may form a fused ring structure each other; and $R_{17}$ and $R_{18}$, and, $R_{19}$ and $R_{20}$ may consist of the same atoms and may form a ring structure.

7. The copolymer according to claim 1, wherein a molar ratio AB of the residue unit A of the formula (1) to the residue unit B of the formula (2) falls within the range of 0.05 to 6.

8. The copolymer according to claim 6, wherein the copolymer has a number-average molecular weight of 3,000 to 500,000 in terms of standard polystyrene when the residue unit B is a residue unit B of other than the formula (4) or in terms of standard pullulan when the residue unit B is a residue unit of the formula (4).

9. A process for producing the copolymer of claim 1, comprising:

conducting polymerization of a monomer of formula (5):

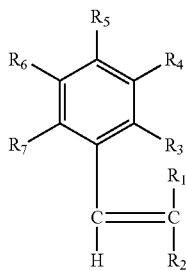

(5)

wherein $R_1$ and $R_2$ each independently represent hydrogen, provided that the case where $R_1$ and $R_2$ are both hydrogen is excluded, a cyano group, an ester group (—C(=O)O$X_1$), an amide group (—C(=O)N($X_2$)($X_3$)), or an acyl group (—C(=O)$X_4$), where $X_1$ to $X_3$ each independently represent a linear alkyl group having 1 to 12 carbon atoms, a branched alkyl group having 1 to 12 carbon atoms, or a cyclic alkyl group having 3 to 6 carbon atoms, and $X_4$ represents a linear alkyl group having 1 to 12 carbon atoms, a branched alkyl group having 1 to 12 carbon atoms, or a cyclic group having 3 to 14 carbon atoms;

$R_3$ to $R_7$ each independently represent hydrogen, a linear alkyl group having 1 to 12 carbon atoms, a branched alkyl group having 1 to 12 carbon atoms, a cyclic group having 3 to 14 carbon atoms, a halogen, a hydroxy group, a carboxy group, a nitro group, a cyano group, an alkoxy group (—O$X_5$), an ester group (—C(=O)O$X_6$), an amide group (—C(=O)N($X_7$)($X_8$)), an acyl group (—C(=O)$X_9$), an amino group (—N($X_{10}$)($X_{11}$)), or a sulfonic acid group (—SOO$X_{12}$), where $X_5$ to $X_8$ each independently represent a linear alkyl group having 1 to 12 carbon atoms, a branched alkyl group having 1 to 12 carbon atoms, or a cyclic alkyl group having 3 to 6 carbon atoms, $X_9$ to $X_{12}$ each independently represent hydrogen, a linear alkyl group having 1 to 12 carbon atoms, a branched alkyl group having 1 to 12 carbon atoms, or a cyclic alkyl group having 3 to 6 carbon atoms;

at least one of $R_3$ to $R_7$ is a hydroxy group; and adjacent substituents among $R_3$ to $R_7$ may form a fused ring structure each other.

10. An optical film, comprising:
the copolymer of claim 1.

11. A retardation film, comprising:
the optical film of claim 10,
wherein the retardation film satisfies nx≅ny<nz,
where nx is a refractive index in a fast axis direction in a film plane, ny is a refractive index in a direction orthogonal to the fast axis direction in the film plane, and nz is a refractive index in a thickness direction of the film.

12. A resin composition, comprising:
the copolymer of claim 11; and
a resin having positive intrinsic birefringence.

13. An optical compensation film, comprising:
the resin composition of claim 12,
wherein an in-plane retardation (Re) of formula (b) is 50 to 500 nm;
an Nz coefficient of formula (c) is 0≤Nz≤1.0; and
a ratio Re(450)/Re(550) of the in-plane retardation (Re) at a light wavelength of 450 nm to the in-plane retardation (Re) at a light wavelength of 550 nm is 0.60<Re(450)/Re(550)<1.10:

$$Re=(nx-ny)\times d \quad (b)$$

$$Nz=(nx-nz)/(nx-ny) \quad (c)$$

wherein nx represents a refractive index in a stretching axis direction in the film plane, ny represents a refractive index in a direction perpendicular to the stretching axis in the film plane, nz represents a refractive index of a thickness direction of the film, and d represents film thickness.

14. The copolymer according to claim 1, wherein the residue unit B of the formula (2) is 9-vinylcarbazole residue units.

* * * * *